(12) United States Patent
Hashimoto et al.

(10) Patent No.: US 11,541,523 B2
(45) Date of Patent: Jan. 3, 2023

(54) DRILLING TOOL

(71) Applicant: KOKI HOLDINGS CO., LTD., Tokyo (JP)

(72) Inventors: Hideyuki Hashimoto, Hitachinaka (JP); Yuki Takahashi, Hitachinaka (JP); Hironori Mashiko, Hitachinaka (JP); Yuta Noguchi, Hitachinaka (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 120 days.

(21) Appl. No.: 17/058,744

(22) PCT Filed: Apr. 26, 2019

(86) PCT No.: PCT/JP2019/017901
§ 371 (c)(1),
(2) Date: Nov. 25, 2020

(87) PCT Pub. No.: WO2019/225295
PCT Pub. Date: Nov. 28, 2019

(65) Prior Publication Data
US 2021/0205974 A1 Jul. 8, 2021

(30) Foreign Application Priority Data
May 25, 2018 (JP) .............................. JP2018-101085

(51) Int. Cl.
*B25D 16/00* (2006.01)
*B28D 1/14* (2006.01)

(52) U.S. Cl.
CPC ............. *B25D 16/006* (2013.01); *B28D 1/14* (2013.01); *B25D 2216/0023* (2013.01);
(Continued)

(58) Field of Classification Search
CPC .......... B25D 16/006; B25D 2216/0023; B25D 2216/0084; B25D 2250/201;
(Continued)

(56) References Cited

U.S. PATENT DOCUMENTS 4,307,325 A * 12/1981 Saar ...................... H02P 25/145
388/934
6,044,918 A * 4/2000 Noser .................... B25D 16/00
173/180

(Continued)

FOREIGN PATENT DOCUMENTS

DE 102016210219 A1 12/2017
JP 2007007852 A 1/2007
(Continued)

OTHER PUBLICATIONS

Office Action dated Dec. 7, 2021 in corresponding Japanese patent application No. 2020-521134.
(Continued)

*Primary Examiner* — Anna K Kinsaul
*Assistant Examiner* — Himchan Song
(74) *Attorney, Agent, or Firm* — NovoTechIP International PLLC

(57) ABSTRACT

A drilling tool includes: a drive source; a bit attachment portion to which an end bit is attachable; a power transmission portion configured to apply a motive force to the end bit attached to the bit attachment portion; an operation portion switchable between an ON-state and an OFF-state by a manual operation and configured to receive a setting operation for setting a stop condition; and a controller configured to set the stop condition based on the setting operation, and to start driving of the drive source in response to a first switching operation for switching the operation portion from the OFF-state to the ON-state. In a state where the stop (Continued)

condition is set, even when the operation portion is in the ON-state, the controller stops driving of the drive source in response to the stop condition being met while the drive source is being driven.

13 Claims, 25 Drawing Sheets

(52) U.S. Cl.
CPC ............... *B25D 2216/0084* (2013.01); *B25D 2250/201* (2013.01); *B25D 2250/255* (2013.01)

(58) Field of Classification Search
CPC ........ B25D 2250/255; B25D 2250/055; B28D 1/14; B25F 5/003
See application file for complete search history.

(56) References Cited

U.S. PATENT DOCUMENTS

| | | | | |
|---|---|---|---|---|
| 9,950,417 | B2* | 4/2018 | Ito | ........................... B25F 5/021 |
| 2007/0035311 | A1* | 2/2007 | Wuersch | ................ B25D 17/00 |
| | | | | 324/637 |
| 2011/0284255 | A1* | 11/2011 | Ookubo | ................. H02P 23/03 |
| | | | | 173/117 |
| 2012/0169256 | A1* | 7/2012 | Suda | .................... B25D 16/003 |
| | | | | 318/17 |
| 2013/0062086 | A1* | 3/2013 | Ito | ...................... B25B 23/1475 |
| | | | | 173/1 |
| 2016/0136801 | A1* | 5/2016 | Furusawa | ............... B25F 5/026 |
| | | | | 173/162.2 |
| 2016/0184904 | A1* | 6/2016 | McGrane | ............... A47G 1/205 |
| | | | | 408/112 |
| 2020/0223038 | A1* | 7/2020 | Araki | ...................... B25B 23/18 |

FOREIGN PATENT DOCUMENTS

| | | | | |
|---|---|---|---|---|
| JP | 2008126532 | A | 6/2008 | |
| JP | 2010173053 | A | 8/2010 | |
| JP | 2011131366 | A | 7/2011 | |
| JP | 2012076178 | A | 4/2012 | |
| JP | 2016087703 | A | 5/2016 | |
| WO | WO-2012043287 | A1 * | 4/2012 | ........... B23B 49/006 |

OTHER PUBLICATIONS

International Search Report and Written Opinion dated Sep. 7, 2019 by the International Searching Authority (Japan Patent Office) in PCT Application PCT/JP2019/017901 (English Translation of the ISR).
International Preliminary Report on Patentability dated Dec. 1, 2020 in corresponding PCT/JP2019/017901 (English Translation).
Supplementary European Search Report dated Jul. 23, 2021 in corresponding European patent application No. 1980785.1.
Office Action dated May 17, 2022 in corresponding Japanese patent application No. 2020-521134.
Office Action dated May 10, 2022 in corresponding Japanese patent application No. 2020-521134.

* cited by examiner

FIG. 7

|  | FIRST NORMAL SPEED MODE | FIRST LOW SPEED MODE | SECOND NORMAL SPEED MODE | SECOND LOW SPEED MODE |
|---|---|---|---|---|
| FIRST LED | OFF | OFF | OFF | OFF |
| SECOND LED | ON | OFF | FLASHING | OFF |
| THIRD LED | OFF | ON | OFF | FLASHING |
|  | THIRD NORMAL SPEED MODE | THIRD LOW SPEED MODE | FOURTH NORMAL SPEED MODE | FOURTH LOW SPEED MODE |
| FIRST LED | ON | ON | ON | ON |
| SECOND LED | ON | OFF | FLASHING | OFF |
| THIRD LED | OFF | ON | OFF | FLASHING |

FIG. 8

| IDENTIFIED MODE | MODE OF CHANGE DESTINATION |
|---|---|
| FIRST NORMAL SPEED MODE | FIRST LOW SPEED MODE |
| FIRST LOW SPEED MODE | SECOND NORMAL SPEED MODE |
| SECOND NORMAL SPEED MODE | SECOND LOW SPEED MODE |
| SECOND LOW SPEED MODE | FIRST NORMAL SPEED MODE |
| THIRD NORMAL SPEED MODE | THIRD LOW SPEED MODE |
| THIRD LOW SPEED MODE | FOURTH NORMAL SPEED MODE |
| FOURTH NORMAL SPEED MODE | FOURTH LOW SPEED MODE |
| FOURTH LOW SPEED MODE | THIRD NORMAL SPEED MODE |

FIG. 9

| IDENTIFIED MODE | MODE OF CHANGE DESTINATION |
|---|---|
| FIRST NORMAL SPEED MODE | THIRD NORMAL SPEED MODE |
| THIRD NORMAL SPEED MODE | FIRST NORMAL SPEED MODE |
| FIRST LOW SPEED MODE | THIRD LOW SPEED MODE |
| THIRD LOW SPEED MODE | FIRST LOW SPEED MODE |
| SECOND NORMAL SPEED MODE | FOURTH NORMAL SPEED MODE |
| FOURTH NORMAL SPEED MODE | SECOND NORMAL SPEED MODE |
| SECOND LOW SPEED MODE | FOURTH LOW SPEED MODE |
| FOURTH LOW SPEED MODE | SECOND LOW SPEED MODE |

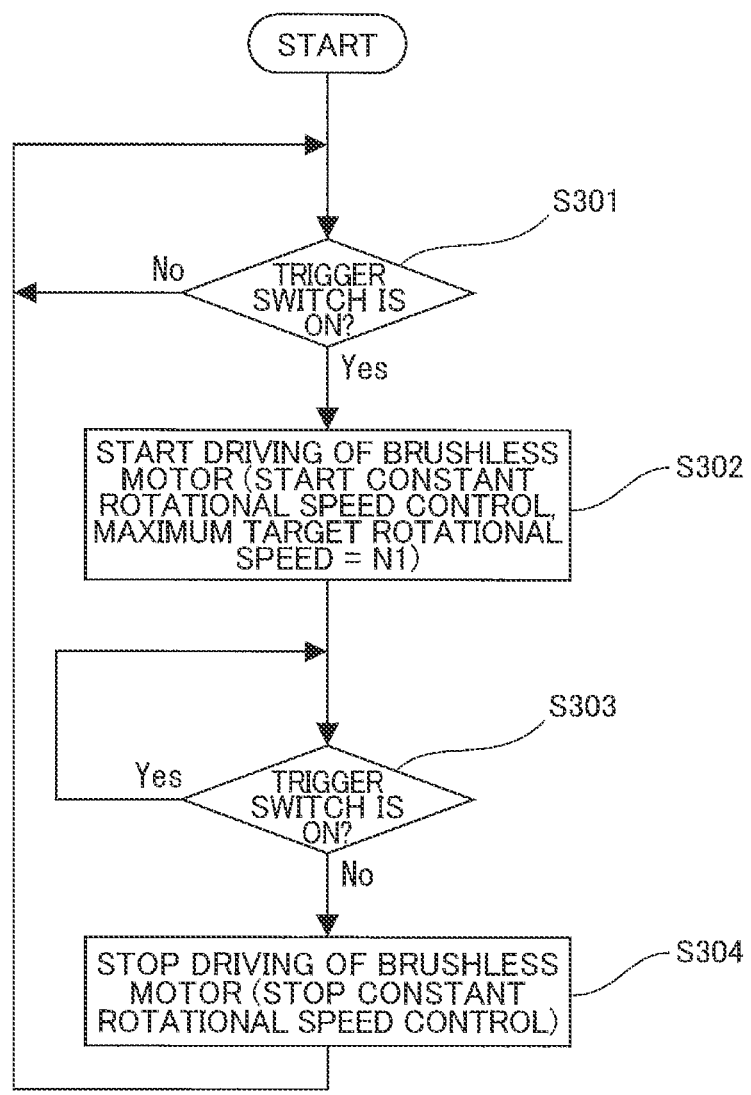

DRILLING TOOL

TECHNICAL FIELD

The present invention relates to a drilling tool.

BACKGROUND ART

There are known drilling tools that perform drilling operations to form drill holes in a workpiece (concrete, steel, or wood, for example), crushing operations for crushing a workpiece, and the like. In drilling operations performed with such a drilling tool, it may be necessary to form a plurality of drill holes in a workpiece while ensuring that the depth of the drill holes is uniform. However, conventional drilling tools cannot easily form drill holes at a desired depth in such drilling operations and have poor usability for drilling operations requiring a plurality of drill holes to be formed in a workpiece at a uniform depth.

Patent Literature 1 proposes a drilling tool for resolving the problem described above. The drilling tool described in Patent Literature 1 has a motor as the drive source, a control unit that controls the motor, and a distance sensor. The control unit of this drilling tool calculates the drilling depth based on the distance separating the body of the drilling tool and the workpiece measured by the distance sensor and halts the motor when this drilling depth reaches a depth preset by the user. Accordingly, by presetting a desired depth, the user can form drill holes at the desired depth.

CITATION LIST

Patent Literature

[PLT 1] Japanese Patent Application Publication No. 2012-076178

SUMMARY OF INVENTION

Technical Problem

Normally, drilling operations performed by a drilling tool generate strong vibrations that act on the body of the drilling tool and produce a large amount of dust from the workpiece. Consequently, with the drilling tool described in Patent Literature 1, which calculates drilling depth based on the measurement results of a distance sensor, these vibrations and dust may cause the distance sensor to produce inaccurate measurements, preventing the control unit from calculating drilling depth with accuracy. Accordingly, when forming a plurality of drill holes in a workpiece using the drilling tool described in Patent Literature 1, it has been difficult to form the plurality of drill holes at a uniform depth and the depths of the drill holes formed in the workpiece tend to have variations. Further, the power tool described in Patent Literature 1 requires wiring and the like for connecting the control unit to the distance sensor, making construction of the tool more complex. Additionally, manufacturing costs are higher due to the separate cost of providing the distance sensor.

Therefore, it is an object of the present invention to provide a drilling tool that has a low cost and a simple construction and can easily forming a plurality of drill holes at a uniform depth.

Solution to Problem

In order to attain the above and other objects, the present disclosure provides a drilling tool including: a drive source for generating a drive force; a bit attachment portion to which an end bit is attachable; a power transmission portion configured to apply a motive force the end bit attached to the bit attachment portion by receiving the drive force; a setting operation receiving portion configured to receive a setting operation, the setting operation being an operation for setting a stop condition to stop the drive source; an operation portion switchable between an ON-state and an OFF-state by a manual operation; and a controller capable of controlling the drive source. The controller is configured to perform: a setting process to set the stop condition based on the setting operation received by the setting operation receiving portion; a driving start process to start driving of the drive source; and a driving stop process to stop driving of the drive source. The controller performs the driving start process in response to a first switching operation. The first switching operation is an operation to switch the operation portion from the OFF-state to the ON-state. The controller performs the driving stop process in response to a second switching operation. The second switching operation is an operation to switch the operation portion from the ON-state to the OFF-state. In a state where the stop condition is set, even when the operation portion is in the ON-state, the controller performs the driving stop process in response to the stop condition being met while the drive source is being driven.

With the configuration described above, in a state where a stop condition is set through a setting operation, when an operation is performed to switch the operation portion from the OFF state to the ON state and to maintain the operation portion in the ON state, the drive source is automatically stopped when the stop condition is met after the drive source is driven. That is, in a state where a stop condition is set, as long as there is no drastic change in the work environment (the workpiece or work content), a drilling operation performed once according to the above actions can be replicated by repeating the above actions. Accordingly, the depth of drill holes formed in a workpiece can be made uniform by performing drilling operations through the above actions. Further, the control described above is achieved through the functions of the controller and does not require a special sensor, complex wiring, or the like. Therefore, a drilling tool having this configuration can easily form a plurality of drill holes at a uniform depth through a simple construction and at a low cost.

In the above configuration, it is preferable: that the controller is provided with a plurality of modes as a control mode for controlling the drive source, the plurality of modes including at least a first mode and a second mode; that the controller is configured to further perform a mode setting process to selectively set one of the plurality of modes as the control mode; that under the first mode, the controller performs the setting process in response to the setting operation being received by the operation portion; and that under the second mode, the controller does not perform the setting process.

With this construction, the controller has the first mode for performing the setting process when the setting operation receiving portion has received the setting operation, and the second mode for not performing the setting process. Hence, the user can select between operations for forming a plurality of drill holes at a uniform depth, and operations for forming a plurality of drill holes at desired depths that are individually different from each other, thereby improving work flexibility.

In the above configuration, it is preferable: that the operation portion doubles as the setting operation receiving portion; that the setting operation is an operation performed on the operation portion; that the controller is configured to further perform an acquiring process to acquire stop condition information based on the setting operation; and that in the setting process, the controller sets the stop condition using the stop condition information acquired in the acquiring process.

With this construction, the number of parts that the user operates can be reduced since the operation portion and the setting operation receiving portion are the same member. Accordingly, user operations are not complex, thereby improving usability. Further, since the number of parts can be reduced, the drilling tool can be manufactured with a simpler construction and at a lower cost.

In the above configuration, it is preferable: that the setting operation is an initial series of operations from the first switching operation to the second switching operation in the first mode; that in the acquiring process, the controller acquires a setting operation interval as the stop condition information, the setting operation interval being a time interval from the first switching operation to the second switching operation that are performed in the setting operation; and that in the setting process, the controller sets the stop condition to a condition that the setting operation interval elapses from the first switching operation.

With this configuration, the stop condition is set using the setting operation interval. Accordingly, the user can perform operations more intuitively and can replicate a drilling operation performed during the setting operation more accurately than when using a distance sensor and the like.

In the above configuration, it is preferable: that the setting operation is an initial series of operations from the first switching operation to the second switching operation in the first mode; that in the acquiring process, the controller acquires drive information as the stop condition information, the drive information being information related to driving of the drive source during a time interval from the first switching operation to the second switching operation that are performed in the setting operation; and that in the setting process, the controller sets the stop condition using the drive information acquired in the acquiring process.

With this configuration, the drive information is used for setting the stop condition. Accordingly, a drilling operation performed for the setting operation can be replicated more accurately than when using a distance sensor and the like.

In the above configuration, it is preferable: that the setting operation is a series of operations from the first switching operation to the second switching operation that meets a setting operation condition; that in the acquiring process, the controller acquires a setting operation interval as the stop condition information, the setting operation interval being a time interval from the first switching operation to the second switching operation that are performed in the setting operation; and that in the setting process, the controller sets the stop condition to a condition that the setting operation interval elapses from the first switching operation.

With this configuration, the stop condition is set in the acquiring process based only on operations that satisfy the setting operation condition, thereby preventing the stop condition from being set based on operations not intended to be used for setting the stop condition (aligning of the end bit and the like). Accordingly, this configuration can further improve usability.

In the above configuration, it is preferable that the setting operation condition is met when a time interval from the first switching operation to the second switching operation in the series of operations is greater than a lower limit interval.

In the above configuration, it is preferable: that the drilling tool further includes a current detecting portion for detecting electric current flowing to the drive source; that the setting operation is a series of operations from the first switching operation to the second switching operation when the electric current reaches an electric current threshold during the series of operations; that in the acquiring process, the controller acquires a second setting operation interval as the stop condition information, the second setting operation interval being a time interval from a timing at which the electric current reaches the electric current threshold in the setting operation to the second switching operation in the setting operation; and that in the setting process, the controller sets the stop condition to a condition that the second setting operation interval elapses from a timing at which the electric current reaches the electric current threshold after the first switching operation.

In the above configuration, it is preferable: that the setting operation is a series of operations from the first switching operation to the second switching operation when an operation amount of the operation portion becomes greater than or equal to an operation amount threshold during the series of operations; that in the acquiring process, the controller acquires a second setting operation interval as the stop condition information, the second setting operation interval being a time interval from a timing at which the operation amount becomes greater than or equal to the operation amount threshold in the setting operation to the second switching operation in the setting operation; and that in the setting process, the controller sets the stop condition to a condition that the second setting operation interval elapses from a timing at which the operation amount becomes greater than or equal to the operation amount threshold.

In the above configuration, it is preferable that the controller is configured to further perform a speed setting process to selectively set one of a plurality of speeds as a drive speed of the drive source.

In the above configuration, it is preferable that the controller is configured to further perform: a set speed drive control to drive the drive source at a speed set in the speed setting process; and a soft start control to increase the drive speed of the drive source up to a speed set in the speed setting process over a prescribed period of time from a start timing of driving of the drive source and to drive the drive source at the set speed after the drive speed reaches the set speed.

In the above configuration, it is preferable: that the drilling tool further includes a selector switch operable by a manual operation for changing the drive speed and the control mode; that in response to a short push operation being received by the selector switch, the controller performs a speed changing process to switch the drive speed among the plurality of speeds and to set a speed of a switching destination as the drive speed; and that in response to a long push operation being received by the selector switch, the controller performs the mode setting process to switch the control mode among the plurality of modes and to set a mode of a switching destination as the control mode.

With this configuration, the operation part that changes the drive speed is shared as the operation part for changing the control mode, thereby simplifying the construction of the drilling tool and improving usability.

In the above configuration, it is preferable that the drilling tool further includes an indicator portion configured to indicate the mode set as the control mode.

In the above configuration, it is preferable: that the drilling tool further includes: a nonvolatile storage medium for storing the mode set as the control mode in the mode setting process; and a power supply circuit configured to perform power supply to the controller; that the controller starts up when the power supply from the power supply circuit is started and shuts down when the power supply from the power supply circuit is interrupted; and that in response to the power supply being resumed after the power supply is interrupted, the controller performs the mode setting process to set the control mode to the mode stored as the control mode in the nonvolatile storage medium.

With this configuration, when the power supply to the controller is resumed after being cut off, the control mode is automatically set to the mode set prior to the power supply being cut off. Accordingly, a user that frequently uses a desired control mode need not reset the control mode to the desired mode each time the power supply to the drilling tool is turned off and on. Further, if the power supply to the drilling tool is cut off due to a power failure or the like and is subsequently turned back on after restoration of power, the control mode is automatically set to the mode in effect prior to the power failure. Accordingly, the user need not reset the control mode to the mode set prior to the power outage. Hence, this configuration further improves convenience and usability.

In the above configuration, it is preferable: that the power transmission portion is configured to apply, to the end bit attached to the bit attachment portion, a striking force and a rotational force as the motive force; and that the drilling tool further includes a switching portion for switching a power transmission state of the power transmission portion among: a rotational force transmission state in which the power transmission portion is capable of applying only the rotational force to the end bit attached to the bit attachment portion; a striking force transmission state in which the power transmission portion is capable of applying only the striking force to the end bit attached to the bit attachment portion; and a rotational striking force transmission state in which the power transmission portion is capable of applying both the rotational force and the striking force to the end bit attached to the bit attachment portion.

Advantageous Effects of Invention

The present invention described above can provide a drilling tool having a low cost and a simple construction and capable of easily forming a plurality of drill holes at a uniform depth.

BRIEF DESCRIPTION OF DRAWINGS

FIG. 7 is a view illustrating a lighting pattern table used in the control mode setting and indicating process performed in the hammer drill according to the first embodiment of the present invention.

FIG. 8 is a view illustrating a first setting table used in the control mode setting and indicating process performed in the hammer drill according to the first embodiment of the present invention.

FIG. 9 is a view illustrating a second setting table used in the control mode setting and indicating process performed in the hammer drill according to the first embodiment of the present invention.

FIG. 10 is a flowchart illustrating drive control of a brushless motor under a first normal speed mode in the hammer drill according to the first embodiment of the present invention.

DESCRIPTION OF EMBODIMENTS

A hammer drill 1 will be described while referring to FIGS. 1 through 15. The hammer drill 1 is an example of the drilling tool according to a first embodiment of the present invention. The terms "top," "bottom," "front," and "rear" indicated in FIG. 1 define the upward direction, downward direction, forward direction, and rearward direction relative to the hammer drill 1. Additionally, "right" and "left" define the rightward direction and leftward direction when viewing the hammer drill 1 from the rear.

Figure 1:
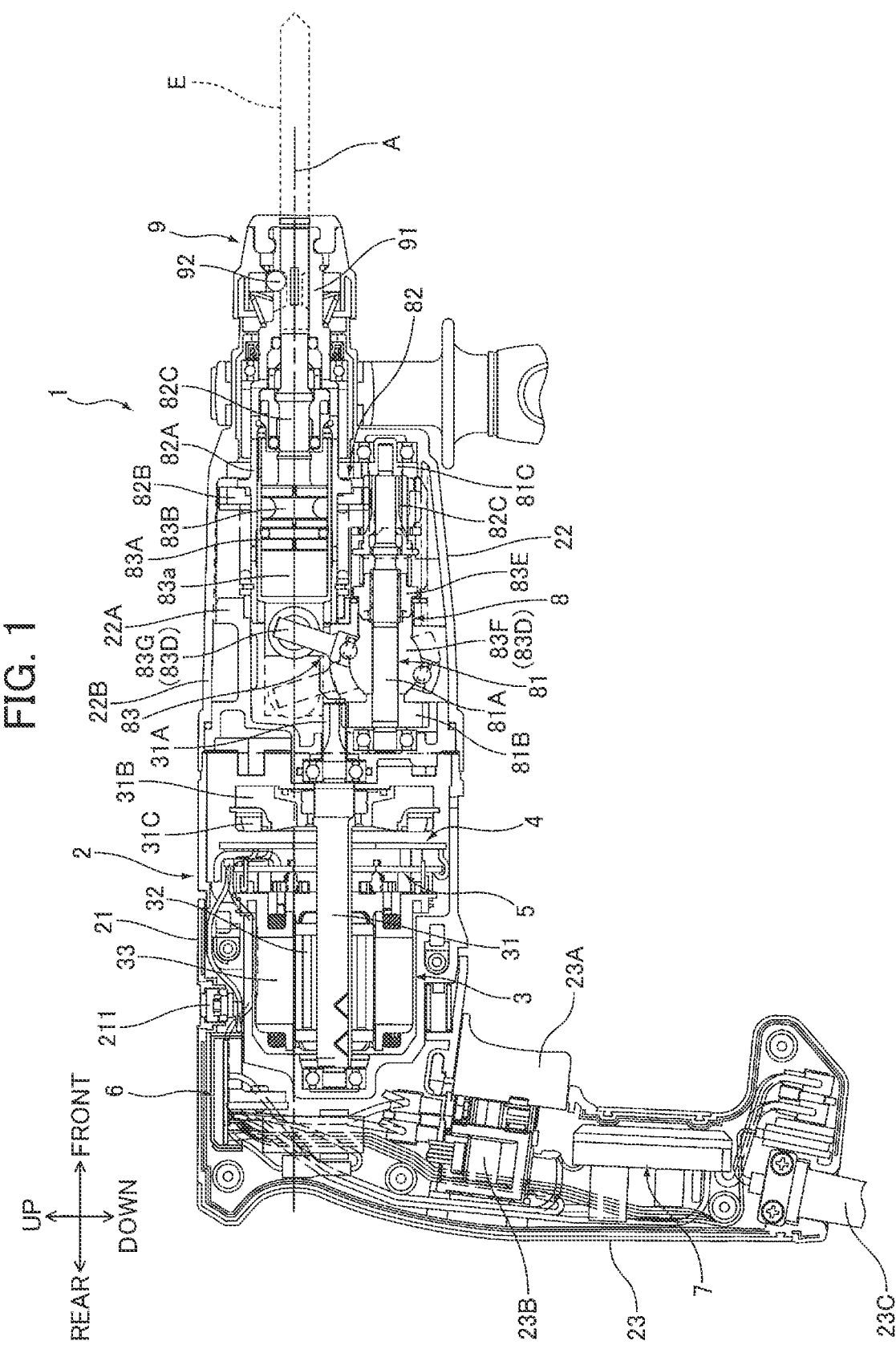
FIG. 1 is a vertical cross-sectional view illustrating the internal structure of a hammer drill according to a first embodiment of the present invention.

The hammer drill 1 shown in FIG. 1 is an electric drilling tool used in work to form drill holes (drilling operations) in a workpiece (concrete, steel, or wood, for example), work to crush a workpiece (crushing operations), and the like. The hammer drill 1 in the present embodiment is provided with three modes as a power transmission mode and eight modes as a control mode. The power transmission modes and control modes will be described later in greater detail.

As shown in FIG. 1, the hammer drill 1 includes a housing 2, a brushless motor 3, a control board 4 on which a controller 46 (FIG. 5) is mounted, an inverter circuit board 5, a rectifying/smoothing circuit board section 6, a filter circuit board section 7, a power transmission portion 8, and a bit attachment portion 9.

The housing 2 is the portion forming the outer shell of the hammer drill 1. The housing 2 includes a motor housing 21, a gear housing 22, and a handle housing 23.

Figure 2:
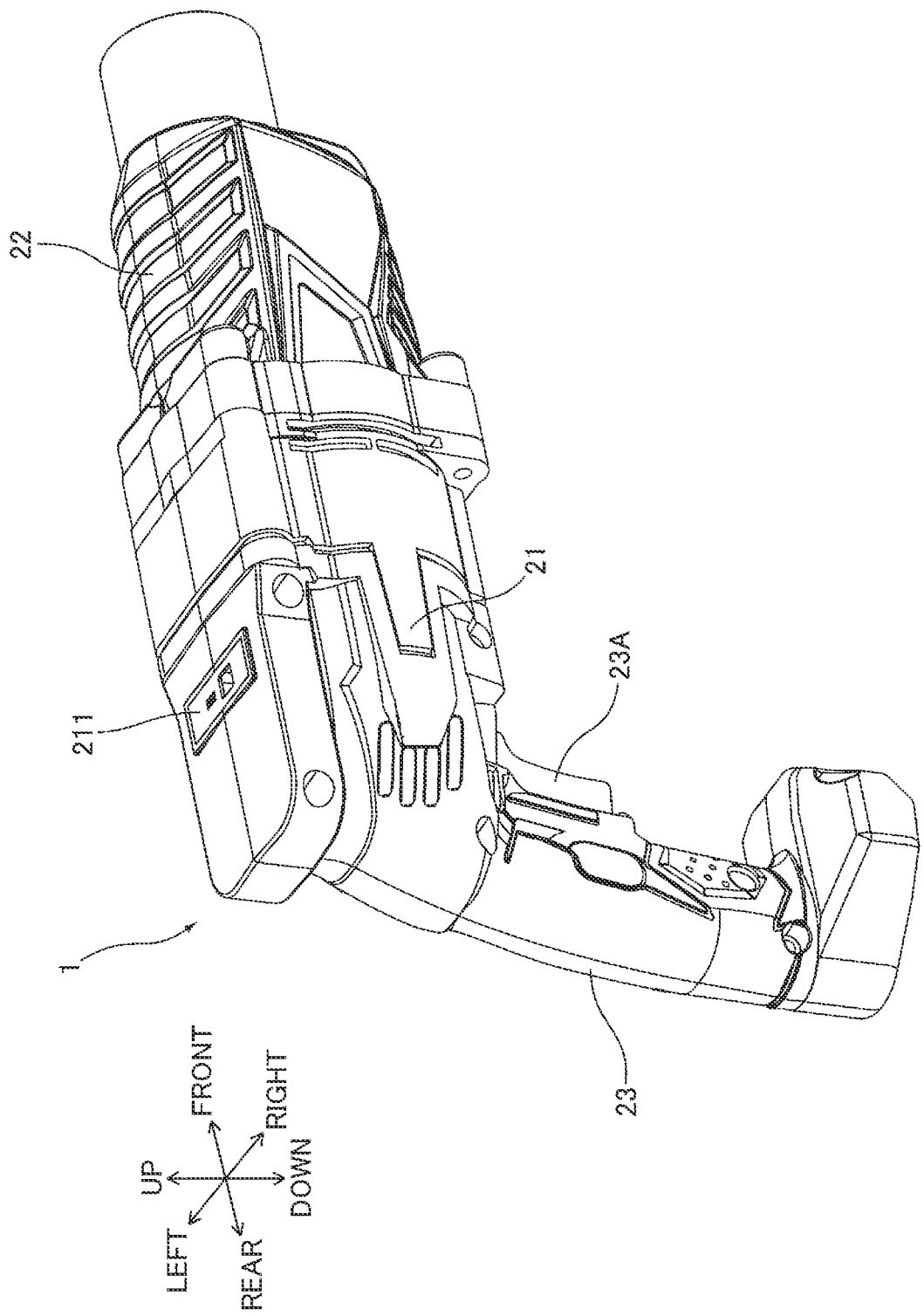
FIG. 2 is a perspective view illustrating the appearance of the hammer drill according to the first embodiment of the present invention.

The motor housing 21 is a part formed of a resin that is shaped as a cylinder extending in the front-rear direction. The motor housing 21 accommodates the brushless motor 3, control board 4, inverter circuit board 5, and rectifying/smoothing circuit board section 6. As shown in FIG. 2, a first indication setting part 211 is also provided on the top portion of the motor housing 21 for changing (setting) the control mode and for notifying of (indicating) the mode set as the control mode.

Figure 3:
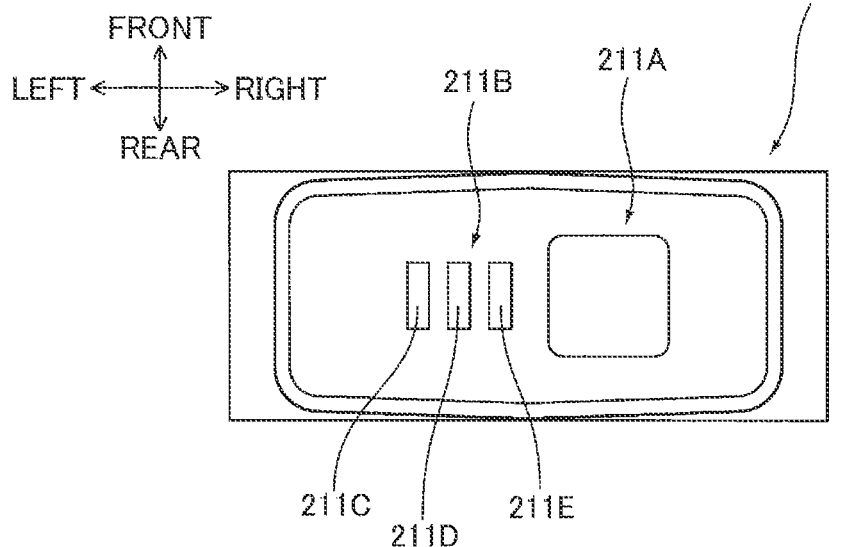
FIG. 3 is a plan view illustrating a first indication setting part of the hammer drill according to the first embodiment of the present invention.

As shown in FIG. 3, the first indication setting part 211 includes a selector switch 211A, and an indicator portion 211B.

The selector switch 211A is a tactile switch for changing (setting) the control mode. The selector switch 211A is connected to the controller 46. While the user presses the selector switch 211A, the selector switch 211A continually outputs a push signal to the controller 46 indicating that the selector switch 211A is being operated. When the user releases pressure on the selector switch 211A, the selector switch 211A stops outputting the push signal.

The indicator portion 211B includes a first LED 211C, a second LED 211D, and a third LED 211E. The indicator portion 211B is configured to indicate the selected control mode according to lighted patterns formed by these three LEDs. The first LED 211C, second LED 211D, and third LED 211E are all connected to the controller 46, and the controller 46 controls what LEDs are on, flashing, and off. By operating the first indication setting part 211, the user can set (select) a desired mode from among the eight modes to be the control mode. Changing control modes with the first indication setting part 211 and the like will be described later.

As shown in FIG. 1, the gear housing 22 is connected to the front portion of the motor housing 21. The gear housing 22 includes a gear case 22A, and a case cover 22B.

Figure 4:
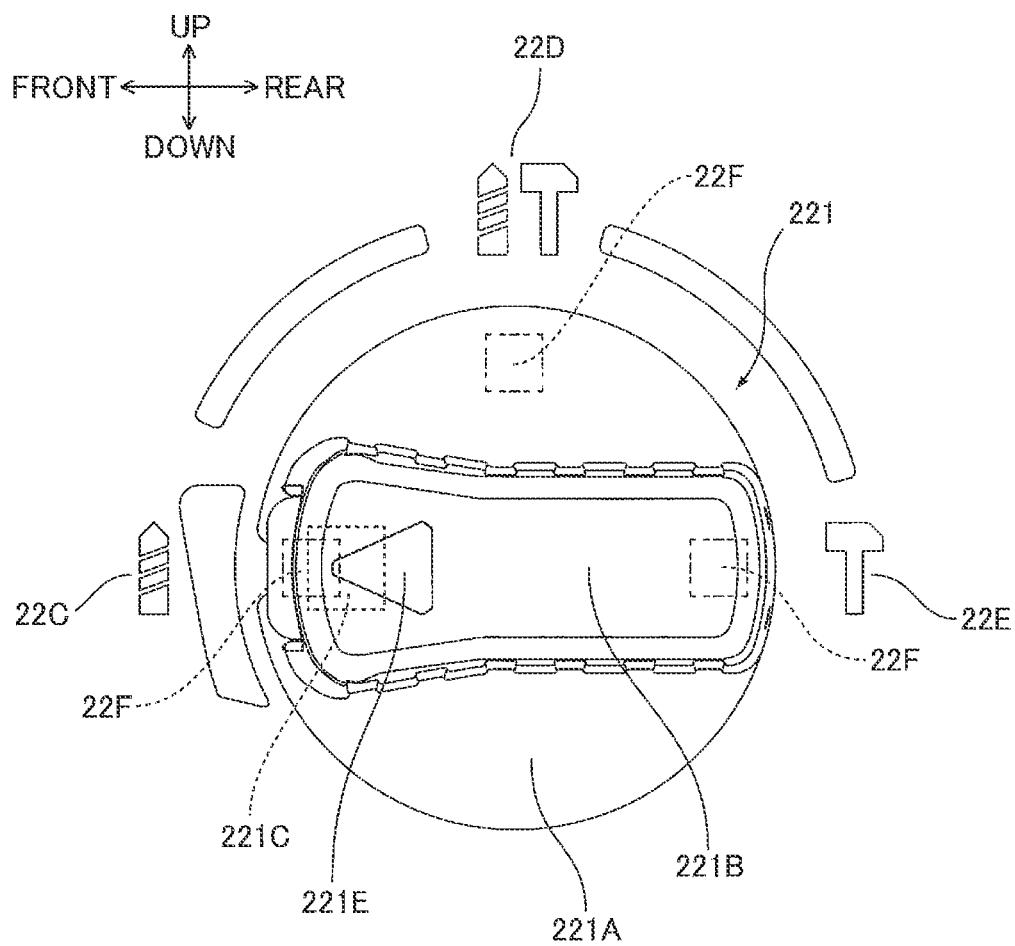
FIG. 4 is a plan view illustrating a second indication setting part of the hammer drill according to the first embodiment of the present invention.

The gear case 22A is a metal case formed in a cylindrical shape that extends forward from the front portion of the motor housing 21. The gear case 22A accommodates the power transmission portion 8. The case cover 22B is a cover formed of resin. The case cover 22B covers the outer surface of the gear case 22A. As shown in FIG. 4, a second indication setting part 221 is provided on the left side surface of the case cover 22B for changing the power transmission mode (i.e., for setting the power transmission mode) and for notifying of (indicating) the mode selected as the power transmission mode. By operating the second indication setting part 221, the user can select a desired mode from the three modes as the power transmission mode.

The second indication setting part 221 is positioned in the lower-front portion of the gear housing 22 on the left side surface thereof. The second indication setting part 221 includes a disc part 221A, a knob part 221B, a magnet 221C, and a switching pin (not shown). The second indication setting part 221 is an example of the "switching portion" in the present invention.

The disc part 221A is a plate-like member with a general circular shape in a left side view. The disc part 221A is provided to be rotatable relative to the gear housing 22.

The knob part 221B is a portion that the user operates when setting (selecting) the power transmission mode. The knob part 221B is formed in a general rectangular parallelepiped shape that extends in the front-rear direction in the state of FIG. 4. The knob part 221B is configured to be rotatable together with the disc part 221A.

An arrow 221E that is visible to the user is formed on an end portion of the knob part 221B. On the left side surface of the gear housing 22 are formed a first mark 22C, a second mark 22D, and a third mark 22E that correspond to the three selectable power transmission modes.

The magnet 221C is disposed inside the end portion of the knob part 221B for detecting the mode selected as the power transmission mode. Three Hall elements 22F are also disposed on the left side surface of the gear housing 22 at approximately 90° intervals along the circumferential direction of the disc part 221A. The Hall elements 22F detect the magnetic field of the magnet 221C. When the magnet 221C is positioned opposite one of the three Hall elements 22F, the Hall element 22F opposing the magnet 221C outputs a signal to the controller 46.

The switching pin is a part that protrudes rightward from the right portion of the second indication setting part 221. The switching pin is in contact with a first clutch member 82C (described later) and a second clutch member 83E (described later) of the power transmission portion 8. The switching pin is configured to move, by the rotation of the disc part 221A and knob part 221B, the first clutch member 82C (described later) and second clutch member 83E (described later) of the power transmission portion 8 in the front-rear direction relative to an intermediate shaft 81A (described later). The power transmission mode is changed by this switching pin moving the first clutch member 82C and second clutch member 83E.

The user can select a desired mode from among the three power transmission modes by confirming the first mark 22C, second mark 22D, and third mark 22E and rotating the knob part 221B until the arrow 221E points to a mark corresponding to the desired power transmission mode. Further, the controller 46 can detect (determine) the user-selected power transmission mode based on a signal outputted by the Hall element 22F that opposes the magnet 221C.

The handle housing 23 is formed of a resin in a general cylindrical shape that extends downward from the lower rear portion of the motor housing 21. The handle housing 23 is the portion that the user grips during operations. A trigger switch 23A and an operation detection part 23B are provided in the handle housing 23. A power cord 23C also extends from the bottom end portion of the handle housing 23. The filter circuit board section 7 is accommodated inside the handle housing 23.

The trigger switch 23A is configured to be switchable between an ON state and an OFF state through a manual operation. The trigger switch 23A is urged forward by an urging member and is movable rearward from the state in FIG. 1 (when not operated by the user) at most a prescribed amount L (a prescribed distance L1). The prescribed amount L1 is the maximum operation amount (the maximum operation distance) for the trigger switch 23A. The trigger switch 23A is an example of the "setting operation receiving portion" in the present invention and also is an example of the "operation portion" in the present invention.

The trigger switch 23A of the present embodiment is in the OFF state in the state of FIG. 1 and is in the ON state when moved rearward at least a prescribed amount L2 (a prescribed distance L2) from the state of FIG. 1 by a pulling operation or the like performed by the user. In other words, the trigger switch 23A is in the OFF state when the amount that the user operates the trigger switch 23A from the state of FIG. 1 (hereinafter simply called the operation amount) is less than the prescribed amount L2 and is in the ON state when the operation amount is greater than or equal to the prescribed amount L2. In the present embodiment, the prescribed distance L1 (i.e., the maximum operation distance) is 10 mm, and the prescribed distance L2 is 3 mm. While 3 mm in the present embodiment, the prescribed distance L2 is not limited to 3 mm but may be 0 mm. In other words, the trigger switch 23A may be configured to enter the ON state after moving rearward even slightly from the state shown in FIG. 1.

The operation detection part 23B is provided inside the handle housing 23 to the rear of the trigger switch 23A. The operation detection part 23B is configured to detect the operating state of the trigger switch 23A (whether the ON state or the OFF state) and the operation amount.

The operation detection part 23B is connected to the controller 46 and outputs a signal to the controller 46 indicating the operating state of the trigger switch 23A. Specifically, the operation detection part 23B continuously outputs an ON state signal to the controller 46 indicating that the trigger switch 23A is in the ON state and indicating the operation amount of the trigger switch 23A while the trigger switch 23A is in the ON state. On the other hand, the operation detection part 23B continuously outputs an OFF state signal to the controller 46 indicating that the trigger switch 23A is in the OFF state while the trigger switch 23A is in the OFF state. In the present embodiment, the ON state signal is a voltage signal having a voltage value that corresponds to the operation amount and that is greater than or equal to a prescribed voltage value, and the OFF state signal is a voltage signal less than the prescribed voltage value (including a voltage signal of 0 V).

The extended end of the power cord 23C includes a plug part that can be connected to an external power supply P (a household outlet or a portable generator, for example). The external power supply P is the power source for the brushless motor 3, the controller 46, and the like. While the plug part of the power cord 23C is connected to the external power supply P, the external power supply P is connected to the filter circuit board section 7. In the present embodiment, the external power supply P is a commercial AC power supply having a root-mean-square value of 100 V.

The brushless motor 3 is accommodated in the motor housing 21. The brushless motor 3 includes a rotational shaft 31, a rotor 32, and a stator 33. The brushless motor 3 is a three-phase brushless DC motor and is the drive source for driving an end bit E attached to the bit attachment portion 9 (i.e., the drive source of the hammer drill 1). The brushless motor 3 is an example of the "drive source" in the present invention.

The rotational shaft 31 extends in the front-rear direction. The rotational shaft 31 is rotatably supported in the motor housing 21. A pinion 31A and a fan 31B are provided on the rotational shaft 31. The pinion 31A is disposed on the front end of the rotational shaft 31 so as to rotate together with the rotational shaft 31. The pinion 31A is meshingly engaged with the power transmission portion 8. The fan 31B is provided on the front portion of the rotational shaft 31 so as to rotate together with the rotational shaft 31. The fan 31B is positioned to the rear of the pinion 31A. A plurality of sensor magnets 31C is mounted on the rear portion of the fan 31B. The sensor magnets 31C are used for detecting the rotational speed and rotated position of the rotational shaft 31 (the rotor 32).

Figure 5:
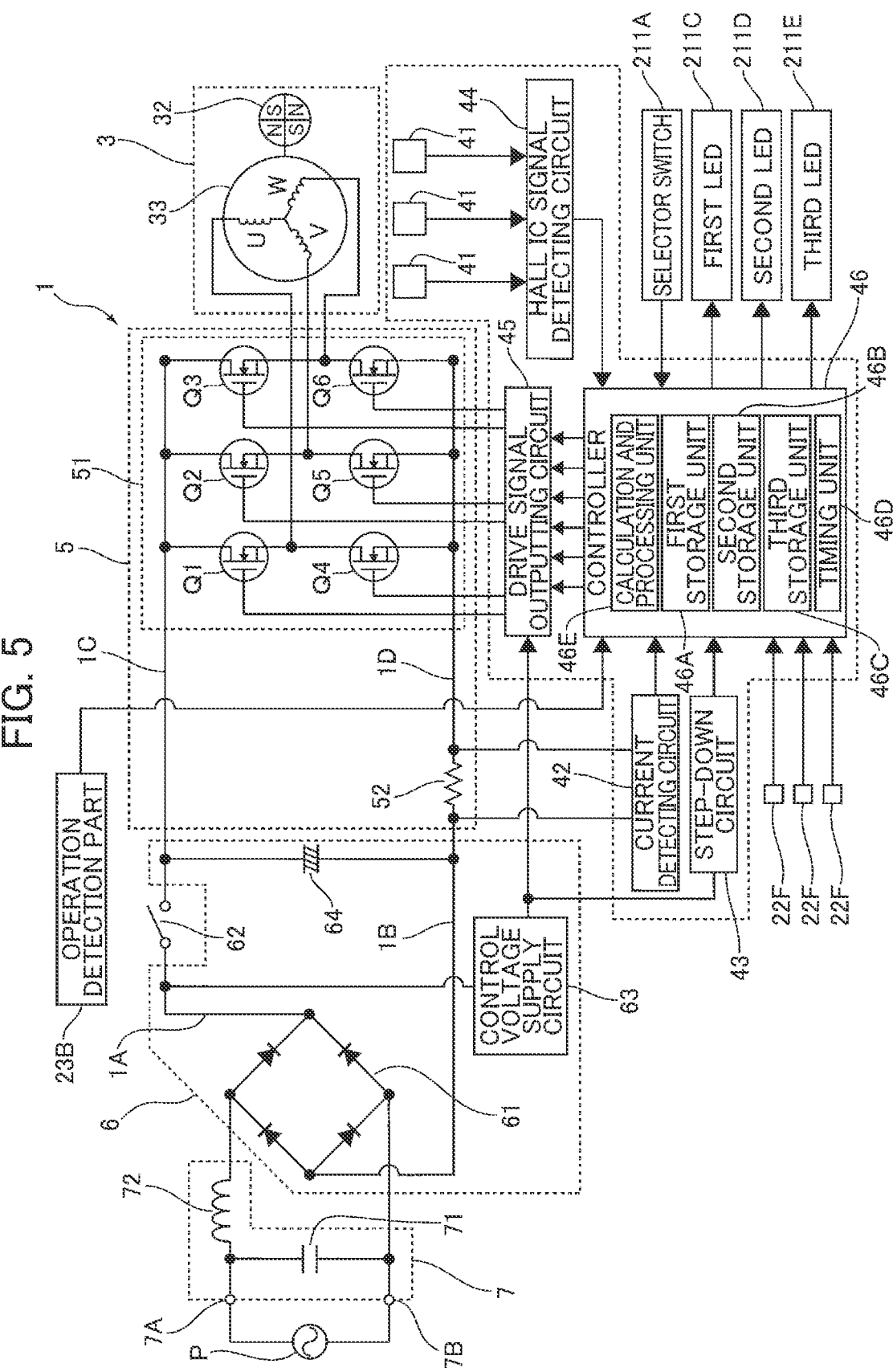
FIG. 5 is a block diagram illustrating the electrical structure of the hammer drill according to the first embodiment of the present invention.

The rotor 32 has a plurality of permanent magnets. The rotor 32 is coaxially fixed to the rotational shaft 31 so as to rotate coaxially and together with the rotational shaft 31. The stator 33 has a general cylindrical shape that is elongated in the front-rear direction. The stator 33 is disposed to surround the circumferential surface of the rotor 32. The stator 33 has three phase windings U, V, and W that are star-connected (FIG. 5).

The control board 4 has a general annular shape in a front side view. The control board 4 is disposed rearward of the fan 31B with the rotational shaft 31 inserted therethrough. Three Hall ICs 41 (FIG. 5) and the controller 46 are mounted on the front surface of the control board 4. The Hall ICs 41 are mounted in the lower portion on the front surface and the controller 46 in the upper portion. In addition to the three Hall ICs 41 and the controller 46, a current detecting circuit 42, a step-down circuit 43, a Hall IC signal detecting circuit 44, a drive signal outputting circuit 45, and the like are mounted on the control board 4, as shown in FIG. 5. These circuits will be described in detail later.

The three Hall ICs 41 are arranged on the front surface of the control board 4 at intervals of approximately 60° along the circumferential direction of the rotational shaft 31 so as to oppose the plurality of sensor magnets 31C mounted on the fan 31B. Each Hall IC 41 outputs a signal to the Hall IC signal detecting circuit 44 conforming to the magnetic pole of the sensor magnet 31C that is facing the Hall IC 41. In the present embodiment, each Hall IC 41 outputs a high signal when the magnetic pole of the sensor magnet 31C that is facing the Hall IC 41 is the S pole and a low signal when the magnetic pole is the N pole. Signals outputted by the three Hall ICs 41 are used to detect (identify) the rotated position of the rotor 32.

As shown in FIG. 1, the inverter circuit board 5 has a general annular shape in a front side view. The inverter circuit board 5 is disposed rearward of the control board 4 and frontward of the stator 33 of the brushless motor 3 while the rotational shaft 31 is inserted therethrough. An inverter circuit 51 and a shunt resistor 52 (FIG. 5) are mounted on the front surface of the inverter circuit board 5. The inverter circuit 51 includes six switching elements Q1-Q6. The six switching elements Q1-Q6 are arranged on the front surface of the inverter circuit board 5 at intervals of approximately 60° along the circumferential direction of the rotational shaft 31.

The rectifying/smoothing circuit board section 6 is accommodated in the upper-rear section inside the motor housing 21. The rectifying/smoothing circuit board section 6 includes a circuit board (not shown); a rectifier circuit 61, a power line switch 62, and a control voltage supply circuit 63 (FIG. 5) that are mounted on the circuit board; and a smoothing capacitor 64 that is connected to the circuit board.

The filter circuit board section 7 is accommodated in the bottom section inside the handle housing 23. The filter circuit board section 7 includes a circuit board (not shown); and a capacitor 71 and a choke coil 72 that are mounted on the circuit board.

The power transmission portion 8 is configured to receive a drive force (a rotational force) generated by the brushless motor 3 and to apply (transmit) at least one of a striking force and rotational force to an end bit E attached to the bit attachment portion 9. The power transmission portion 8 includes an intermediate shaft part 81, a rotational force transmission part 82, and a striking force transmission part 83.

Changes in the power transmission mode described above are implemented by the power transmission portion 8 in the present embodiment. Specifically, the power transmission portion 8 can set (switch) the power transmission mode among three modes: a rotating mode, a striking mode, and a rotating and striking mode. The rotating mode is a power transmission state in which only the rotational force can be transmitted to the end bit E attached to the bit attachment portion 9. The striking mode is a power transmission state in which only the striking force can be transmitted to the end bit E. The rotating and striking mode is a power transmission state in which both the rotational force and the striking force can be transmitted to the end bit E.

The intermediate shaft part 81 is the portion that receives the rotational force of the rotational shaft 31 of the brushless motor 3. The intermediate shaft part 81 includes an intermediate shaft 81A, a gear part 81B, and a pinion sleeve 81C.

The intermediate shaft 81A extends in the front-rear direction. The intermediate shaft 81A is rotatably supported by the gear housing 22 in the lower section inside the gear housing 22.

The gear part 81B is disposed on the rear portion of the intermediate shaft 81A so as to rotate together with the intermediate shaft 81A. The gear part 81B is meshingly engaged with the pinion 31A of the rotational shaft 31.

The pinion sleeve 81C has a general bottomed cylindrical shape that extends in the front-rear direction and opens rearward. The pinion sleeve 81C is disposed on the front end portion of the intermediate shaft 81A so as to rotate coaxially and integrally with the intermediate shaft 81A. A gear part is formed along the inner circumferential portion in the rear part of the pinion sleeve 81C. The front end portion of the intermediate shaft 81A is press-fit into the pinion sleeve 81C so as to be fixed therein. The front end portion of the intermediate shaft 81A is rotatably supported via the pinion sleeve 81C by a ball bearing provided in the lower-front section of the gear housing 22.

The rotational force transmission part 82 is configured to receive a rotational force from the intermediate shaft part 81 (the intermediate shaft 81A) and to apply (transmit) the rotational force to the end bit E attached to the bit attachment portion 9. The rotational force transmission part 82 has a cylinder 82A, an annular part 82B, and a first clutch member 82C.

The cylinder 82A is formed in a general cylindrical shape and extends in the front-rear direction. The cylinder 82A is supported in the top section inside the gear housing 22 so as to be rotatable about an axis A indicated in FIG. 1. An engaging part is formed in the approximate front-rear center around the outer circumferential portion of the cylinder 82A. The engaging part protrudes radially outward from the cylinder 82A and can engage with the annular part 82B.

The annular part 82B has a general annular shape in a front side view and entirely surrounds the outer circumferential surface of the cylinder 82A. The annular part 82B is movable in the front-rear direction and rotatable relative to the cylinder 82A. A gear part is formed around the entire circumference of the annular part 82B. An engagement part is formed on the front portion of the inner circumferential part of the annular part 82B and can engage with the engaging part of the cylinder 82A.

Further, the annular part 82B is urged forward by a spring so that the engagement part of the annular part 82B becomes engaged with the engaging part of the cylinder 82A. The annular part 82B is configured to rotate together with the cylinder 82A while the annular part 82B is engaged with the cylinder 82A through the urging force of the spring. If the torque of the rotating annular part 82B reaches or exceeds a prescribed value, the annular part 82B retracts rearward against the urging force of the spring, disengaging the engagement part of the annular part 82B from the engaging part of the cylinder 82A so that the annular part 82B rotates (spins idly) relative to the cylinder 82A.

The first clutch member 82C is formed in a general cylindrical shape that extends in the front-rear direction. The first clutch member 82C is provided on the intermediate shaft 81A. The first clutch member 82C is movable a fixed amount in the front-rear direction relative to the intermediate shaft 81A and rotatable relative to the intermediate shaft 81A. In addition, a gear part is formed around the entire first clutch member 82C in the circumferential direction thereof. The gear part is engaged with the gear part of the annular part 82B. The first clutch member 82C is also configured to move in the front-rear direction between a forward position and a rearward position in response to user operations on the second indication setting part 221.

When the first clutch member 82C is in the forward position, the front portion of the gear part on the first clutch member 82C is engaged with the gear part formed on the inner circumferential portion of the pinion sleeve 81C. When the intermediate shaft 81A rotates in this state, the rotational force of the intermediate shaft 81A is transmitted to the first clutch member 82C via the pinion sleeve 81C, and the first clutch member 82C and intermediate shaft 81A rotates together. As a result, the annular part 82B engaged with the gear part of the first clutch member 82C rotates together with the cylinder 82A engaged with the annular part 82B and the rotational force is applied (transmitted) to the end bit E attached to the bit attachment portion 9.

On the other hand, when the first clutch member 82C is in the rearward position, the gear part on the first clutch member 82C is disengaged from the gear part on the pinion sleeve 81C. When the intermediate shaft 81A rotates in this state, the rotational force of the intermediate shaft 81A is not transmitted to the first clutch member 82C and the first clutch member 82C does not rotate together with the intermediate shaft 81A. As a result, the rotational force of the intermediate shaft 81A is not transmitted to the annular part 82B and the cylinder 82A, and a rotational force is not applied (transmitted) to the end bit E attached to the bit attachment portion 9.

The striking force transmission part 83 is configured to receive a rotational force from the intermediate shaft part 81 (the intermediate shaft 81A) and to apply (transmit) a striking force to the end bit E attached to the bit attachment portion 9. The striking force transmission part 83 includes a piston 83A, a striking element 83B, an intermediate element 83C, a motion converting mechanism 83D, and a second clutch member 83E.

The piston 83A has a general bottomed cylindrical shape that extends in the front-rear direction and opens frontward. The piston 83A is disposed in the cylinder 82A so as to be slidable in the front-rear direction.

The striking element 83B is slidably disposed in the piston 83A. An air chamber 83a is formed to the rear of the striking element 83B. The intermediate element 83C is disposed in the cylinder 82A forward of the striking element 83B and is slidable in the front-rear direction. The front end of the striking element 83B can contact the rear end of the intermediate element 83C, and the front end of the intermediate element 83C can contact the rear end of the end bit E attached to the bit attachment portion 9.

The motion converting mechanism 83D converts the rotary motion of the intermediate shaft 81A to reciprocating motion. The motion converting mechanism 83D includes a cam ball member 83F and an arm member 83G.

The cam ball member 83F is disposed on the intermediate shaft 81A so as to be rotatable relative to the intermediate shaft 81A. The cam ball member 83F has a cam ball part and a cylinder part. The cam ball part has a general spherical shape. A groove is formed along the entire circumference of this spherical part. The cylinder part has a cylindrical shape and extends in the front-rear direction. The cylinder part extends forward from the front portion of the cam ball part. An engaging part that can engage with the second clutch member 83E is formed on the front portion of the cylinder part.

The arm member 83G has a ring part and an arm part. The ring part has an annular shape that surrounds the cam ball part and is engaged with the cam ball part through two balls disposed in the groove formed in the cam ball part. The arm part extends upward from the ring part and the extended end of the arm part is connected to the rear end portion of the piston 83A.

When the cam ball member 83F in the motion converting mechanism 83D is rotated by the intermediate shaft 81A, the cam ball member 83F pivots the arm member 83G forward and backward, causing the top portion of the arm member 83G to reciprocate in the front-rear direction. Through this configuration, rotary motion of the intermediate shaft 81A is converted to reciprocating motion.

The second clutch member 83E has a general cylindrical shape and extends in the front-rear direction. The second clutch member 83E is disposed on the intermediate shaft 81A. Spline grooves that extend in the front-rear direction are formed in the inner circumferential surface of the second clutch member 83E. The second clutch member 83E is movable a fixed amount in the front-rear direction relative to the intermediate shaft 81A but incapable of rotating relative to the intermediate shaft 81A. An engagement part is formed on the rear portion of the second clutch member 83E. The engagement part can engage with the engaging part formed on the cylinder part of the cam ball member 83F. The second clutch member 83E is also configured to move in the front-rear direction between a forward position and a rearward position in response to user operations on the second indication setting part 221.

While the second clutch member 83E is in the rearward position, the engagement part of the second clutch member 83E is engaged with the engaging part formed on the cylinder part of the cam ball member 83F, and the second clutch member 83E and cam ball member 83F are rotatable together. When the intermediate shaft 81A is rotated in this state, the intermediate shaft 81A, second clutch member 83E, and cam ball member 83F rotate together and the arm member 83G pivots forward and rearward, causing the piston 83A to reciprocate in the front-rear direction. Through this reciprocating motion of the piston 83A, the air chamber 83a is compressed and expanded and functions as an air spring, so that the striking element 83B is reciprocated in the front-rear direction and intermittently strikes the rear end of the intermediate element 83C. Through this action, a striking force is applied (transmitted) to the end bit E attached to the bit attachment portion 9 through the intermediate element 83C.

On the other hand, when the second clutch member 83E is in the forward position, the engagement part of the second clutch member 83E is disengaged from the engaging part of the cam ball member 83F. When the intermediate shaft 81A is rotated in this state, the rotational force of the intermediate shaft 81A is not transmitted to the cam ball member 83F, and the cam ball member 83F does not rotate together with the intermediate shaft 8A. As a result, the piston 83A is not reciprocated, and a striking force is not applied (transmitted) to the end bit E attached to the bit attachment portion 9.

Here, user settings for the power transmission mode will be described. When the user sets the arrow 221E to indicate the first mark 22C (the state in FIG. 4) by operating the knob part 221B of the second indication setting part 221, the switching pin of the second indication setting part 221 places the first clutch member 82C and second clutch member 83E in their forward positions, thereby setting the power transmission mode to the rotating mode. In other words, the power transmission state is such that only a rotational force is applied (transmitted) to the end bit E attached to the bit attachment portion 9.

If the user further rotates the knob part 221B approximately 90° clockwise from the state in which the rotating mode is set (the state in FIG. 4) to a state in which the arrow 221E indicates the second mark 22D, the switching pin places the first clutch member 82C in the forward position and places the second clutch member 83E in the rearward position, thereby setting the power transmission mode to the rotating and striking mode. In other words, the power transmission state is such that a rotational force and a striking force are applied (transmitted) to the end bit E attached to the bit attachment portion 9.

If the user further rotates the knob part 221B approximately 90 clockwise from the state in which the rotating and striking mode is set to a state in which the arrow 221E indicates the third mark 22E, the switching pin places the first clutch member 82C and second clutch member 83E in their rearward positions, thereby setting the power transmission mode to the striking mode. In other words, the power transmission state is such that only a striking force is applied (transmitted) to the end bit E attached to the bit attachment portion 9.

The bit attachment portion 9 is provided on the front end portion of the gear housing 22. The bit attachment portion 9 has an end bit retaining part 91 for detachably holding the end bit E, and a ball member 92.

The end bit retaining part 91 has a cylindrical shape and extends forward from the front end of the cylinder 82A. The end bit retaining part 91 is formed integrally with the cylinder 82A. An elongate hole is formed in the end bit retaining part 91. The elongate hole extends in the front-rear direction and penetrates the end bit retaining part 91 vertically.

The ball member 92 is provided to be movable between a protruded state in which a portion of the ball member 92 protrudes through the elongate hole formed in the end bit retaining part 91 into a space defined by the inner circumferential surface of the end bit retaining part 91, and a retracted state in which the portion is retracted from this space.

When the end bit E is inserted into the end bit retaining part 91, the ball member 92 is in the protruded state and a portion of the ball member 92 is accommodated in a groove formed in the end bit E, thereby retaining the end bit E in the end bit retaining part 91. That is, the end bit E is attached to the bit attachment portion 9. On the other hand, by performing a prescribed operation on the bit attachment portion 9, the user can place the ball member 92 in the retracted state, so that the end bit E becomes removable from the bit attachment portion 9. Through this operation, the end bit E can be removed from the bit attachment portion 9.

When the cylinder 82A is rotated, the end bit retaining part 91 and ball member 92 rotate together with the cylinder 82A, applying (transmitting) a rotational force to the end bit E attached to the bit attachment portion 9. Further, if the user presses the end bit E attached to the bit attachment portion 9 against a workpiece (a material to be drilled or crushed) and the piston 83A is reciprocated while the rear end of the end bit E is in contact with the intermediate element 83C, the striking element 83B applies (transmits) an intermittent striking force to the end bit E via the intermediate element 83C.

Next, the electrical structure of the hammer drill 1 will be described with reference to FIG. 5. As described above, the hammer drill 1 includes the filter circuit board section 7, rectifying/smoothing circuit board section 6, inverter circuit board 5, and control board 4.

As shown in FIG. 5, the filter circuit board section 7 includes a first terminal 7A, a second terminal 7B, the capacitor 71, and the choke coil 72.

The first terminal 7A and second terminal 7B are terminals to which the AC voltage of the external power supply P is applied while the plug part of the power cord 23C is connected to the external power supply P. The capacitor 71 and choke coil 72 are filter components for reducing noise.

The rectifying/smoothing circuit board section 6 includes the rectifier circuit 61, power line switch 62, control voltage supply circuit 63, and smoothing capacitor 64.

The rectifier circuit 61 is a diode bridge circuit having four diodes. The rectifier circuit 61 performs full-wave rectification of AC voltage outputted from the external power supply P through the filter circuit board section 7. A first positive line 1A is connected to the output-side positive terminal of the rectifier circuit 61, and a first negative line 1B is connected to the output-side negative terminal of the rectifier circuit 61.

The power line switch 62 is switched between an open state and a closed state in mechanical interlocking with the operating state of the trigger switch 23A. One end of the power line switch 62 is connected to the first positive line 1A, and a second positive line 1C is connected to the other end of the power line switch 62. When the trigger switch 23A is in the ON state, the power line switch 62 is in the closed state and conducts electricity between the first positive line A and second positive line IC. In this state, power can be supplied to the brushless motor 3. On the other hand, if the trigger switch 23A is in the OFF state, the power line switch 62 is in the closed state and does not conduct electricity between the first positive line 1A and second positive line 1C. In this state, power cannot be supplied to the brushless motor 3.

The control voltage supply circuit 63 is a constant voltage outputting circuit connected to the first positive line 1A. The control voltage supply circuit 63 steps down and stabilizes the voltage applied to the first positive line 1A (the voltage for driving the brushless motor 3) and outputs the resulting voltage. The control voltage supply circuit 63 outputs the stepped down and stabilized voltage to the step-down circuit 43 and drive signal outputting circuit 45. In the present embodiment, the voltage outputted by the control voltage supply circuit 63 is approximately 15 V.

The smoothing capacitor 64 is a polarized electrolytic capacitor that smooths the full-wave rectified voltage outputted from the rectifier circuit 61 (fluctuating DC voltage). The smoothing capacitor 64 is connected between the second positive line 1C and the first negative line 1B.

The inverter circuit 51 and shunt resistor 52 are mounted on the inverter circuit board 5. The shunt resistor 52 is used for detecting electric current flowing to the brushless motor 3. One end of the shunt resistor 52 is connected to the first negative line 1B and the other end is connected to a second negative line ID.

The inverter circuit 51 supplies power from the external power supply P to the brushless motor 3. The inverter circuit 51 includes the six switching elements Q1-Q6. The second positive line 1C is connected to the input-side positive terminal of the inverter circuit 51, and the second negative line 1D is connected to the input-side negative terminal of the inverter circuit 51. In other words, the input-side positive terminal of the inverter circuit 51 is connected to the output-side positive terminal of the rectifier circuit 61 via the first positive line 1A and second positive line 1C, and the input-side negative terminal of the inverter circuit 51 is connected to the output-side negative terminal of the rectifier circuit 61 via the first negative line 1B and second negative line 1D.

The six switching elements Q1-Q6 of the inverter circuit 51 are metal oxide semiconductor field effect transistors (MOSFETs) connected in a three-phase bridge format. The gate of each switching element is connected to the drive signal outputting circuit 45, and the drain or source of each switching element is connected to one of the windings U, V, and W of the brushless motor 3. The switching elements Q1-Q6 execute switching operations based on drive signals outputted from the drive signal outputting circuit 45 in order to rotate the rotor 32 in a prescribed rotating direction. While the switching elements Q1-Q6 are MOSFETs in the present embodiment, the switching elements Q1-Q6 may be insulated gate bipolar transistors (IGBTs) or other switching elements and are not limited to MOSFETs.

Mounted on the control board 4 are the current detecting circuit 42, step-down circuit 43, Hall IC signal detecting circuit 44, drive signal outputting circuit 45, controller 46, and three Hall ICs 41.

The current detecting circuit 42 detects the electric current flowing to the brushless motor 3. The current detecting circuit 42 is connected to both ends of the shunt resistor 52. The current detecting circuit 42 calculates the value of electric current flowing to the brushless motor 3 by acquiring the value of voltage drop across the shunt resistor 52, and outputs an electric current value signal to the controller 46 indicating the calculated electric current value. The current detecting circuit 42 is an example of the "current detecting portion" in the present invention.

The step-down circuit 43 steps down the voltage outputted from the control voltage supply circuit 63 to the voltage for driving the controller 46 (approximately 5 V in the present embodiment) and outputs this voltage to the controller 46. The step-down circuit 43 is an example of the "power supply circuit" in the present invention.

The Hall IC signal detecting circuit 44 receives signals outputted from the three Hall ICs 41, identifies the rotated position of the rotor 32 based on these signals, and outputs a rotated position signal to the controller 46 indicating the identified rotated position. The controller 46 uses the rotated position signals to calculate the rotational speed of the rotor 32, the number of rotations of the rotor 32, and the like.

The drive signal outputting circuit 45 outputs a drive signal to each gate of the six switching elements Q1-Q6 based on control signals outputted from the controller 46. Here, the drive signal outputting circuit 45 outputs the voltage inputted from the control voltage supply circuit 63 as the drive signal to each gate of the switching elements Q1-Q6.

The controller 46 controls overall operations of the hammer drill 1. The controller 46 includes a first storage unit 46A, a second storage unit 46B, a third storage unit 46C, a timing unit 46D, and a calculation and processing unit 46E. In the present embodiment, the controller 46 is a microcomputer. The controller 46 is an example of the "controller" in the present invention.

The first storage unit 46A is a nonvolatile storage medium (ROM). The first storage unit 46A stores process programs for controlling overall operations of the hammer drill 1, various data and threshold values used for such control, and the like. The second storage unit 46B is a volatile storage medium (RAM) for temporarily storing various data used in the control. The third storage unit 46C is a nonvolatile storage medium (EEPROM, flash memory, or the like) for storing various data used in the control. The third storage unit 46C stores control mode setting information specifying the mode set as the control mode, and stop condition information used for setting a stop condition described later. The timing unit 46D is a timer that counts or measures time (periods of time). The third storage unit 46C is an example of the "storage medium" in the present invention.

The calculation and processing unit 46E is a central processing unit (CPU) that performs arithmetic processes according to the process programs stored in the first storage unit 46A. By performing arithmetic processes with the calculation and processing unit 46E according to the process programs, the controller 46 controls overall operations of the hammer drill 1. In other words, by executing the process programs, the controller 46 control overall operations of the hammer drill 1.

For overall operational control of the hammer drill 1, the controller 46 can execute rotational drive control, constant rotational speed control (constant speed control), soft start control, auto-stop control, a control mode setting and indicating process, drive control of the brushless motor 3 based on the mode set as the control mode, and a stop information deletion process. The controller 46 can perform drive control of the brushless motor 3 in the eight control modes. The eight modes are a first normal speed mode, a second normal speed mode, a third normal speed mode, a fourth normal speed mode, a first low speed mode, a second low speed mode, a third low speed mode, and a fourth low speed mode.

Rotational drive control is basic control for driving the rotor 32 of the brushless motor 3 to rotate in a prescribed rotating direction and is performed by outputting control signals to the drive signal outputting circuit 45. Specifically, the controller 46 forms controls signal for alternately switching what elements among the six switching elements Q1-Q6 are conductive (in an ON state) based on the rotated position signal outputted from the Hall IC signal detecting circuit 44 and outputs the control signals to the drive signal outputting circuit 45, whereby electricity is alternately conducted to a prescribed winding among the stator windings U, V, and W so that the rotor 32 is driven to rotate in a prescribed rotating direction. In rotational drive control, the controller 46 outputs pulse width modulation signals (PWM signals) as the control signals for driving (switching to an ON state) the switching elements Q4-Q6 connected to the second negative line 1D.

Constant rotational speed control (constant speed control) is control for rotating the rotor 32 at a target rotational speed (rpm) while performing rotational drive control. The controller 46 performs constant rotational speed control by executing feedback control for modifying the duty cycle of the PWM signals (control signals) in order that the rotational speed of the rotor 32 becomes the target rotational speed. The constant rotational speed control is an example of the "set speed drive control" in the present invention.

In constant rotational speed control, the target rotational speed is set dynamically according to the operation amount of the trigger switch 23A (i.e., the voltage value of the ON state signal outputted from the operation detection part 23B). Accordingly, when the user modifies the operation amount while constant rotational speed control is being executed, the target rotational speed changes and the rotational speed of the rotor 32 is changed to follow changes in the target rotational speed. Further, the target rotational speed is set to a larger value as the operation amount becomes larger and is set to a maximum value when the operation amount is maximum. Note that the target rotational speed set when the operation amount is maximum differs according to the control mode. Hereinafter, the target rotational speed set when the operation amount is maximum will be called the "maximum target rotational speed."

Soft start control is control performed while executing rotational drive control to increase the rotational speed of the rotor 32 from an initial rotational speed to a final rotational speed over a prescribed period of time T1 from the start timing for driving the brushless motor 3. The controller 46 performs soft start control by executing feedback control to bring the rotational speed of the rotor 32 to the target rotational speed while increasing the target rotational speed from the initial rotational speed to the final rotational speed at a prescribed rate of increase [rpm/s]. The initial rotational speed and final rotational speed in soft start control are set according to the control mode. Further, while the period of time T1 is 5 seconds in the present embodiment, the period of time T1 may be set to any time between 2 and 10 seconds. Even in this case, the effect of soft start control can be realized.

Auto-stop control is control for stopping the brushless motor 3 even though the trigger switch 23A is in the ON state if a stop condition for halting driving of the brushless motor 3 has been set and the stop condition is met while driving the brushless motor 3. A stop condition is set when the trigger switch 23A receives a specific operation. Stop condition information acquired based on this specific operation is used for the stop condition. Note that the specific operation for setting a stop condition differs according to the control mode. Hereinafter, the specific operation for setting a stop condition will be called the "setting operation."

The control mode setting and indicating process is a control process for setting the control mode to one of the above-described eight modes according to a user operation on the selector switch 211A and for setting a lighting pattern in the indicator portion 211B to a pattern corresponding to the mode set as the control mode.

Here, the control mode setting and indicating process will be described in detail with reference to the flowchart in FIG. 6. The controller 46 starts the control mode setting and indicating process immediately after startup and continues this process until shutdown. The controller 46 is started up when the plug part of the power cord 23C is connected to the external power supply P and a drive voltage from the step-down circuit 43 is applied to the controller 46. The controller 46 is shut down when application of the drive voltage is halted. In other words, the controller 46 starts up when the power supply from the step-down circuit 43 is started and shuts down when the power supply from the step-down circuit 43 is interrupted.

Figure 6:
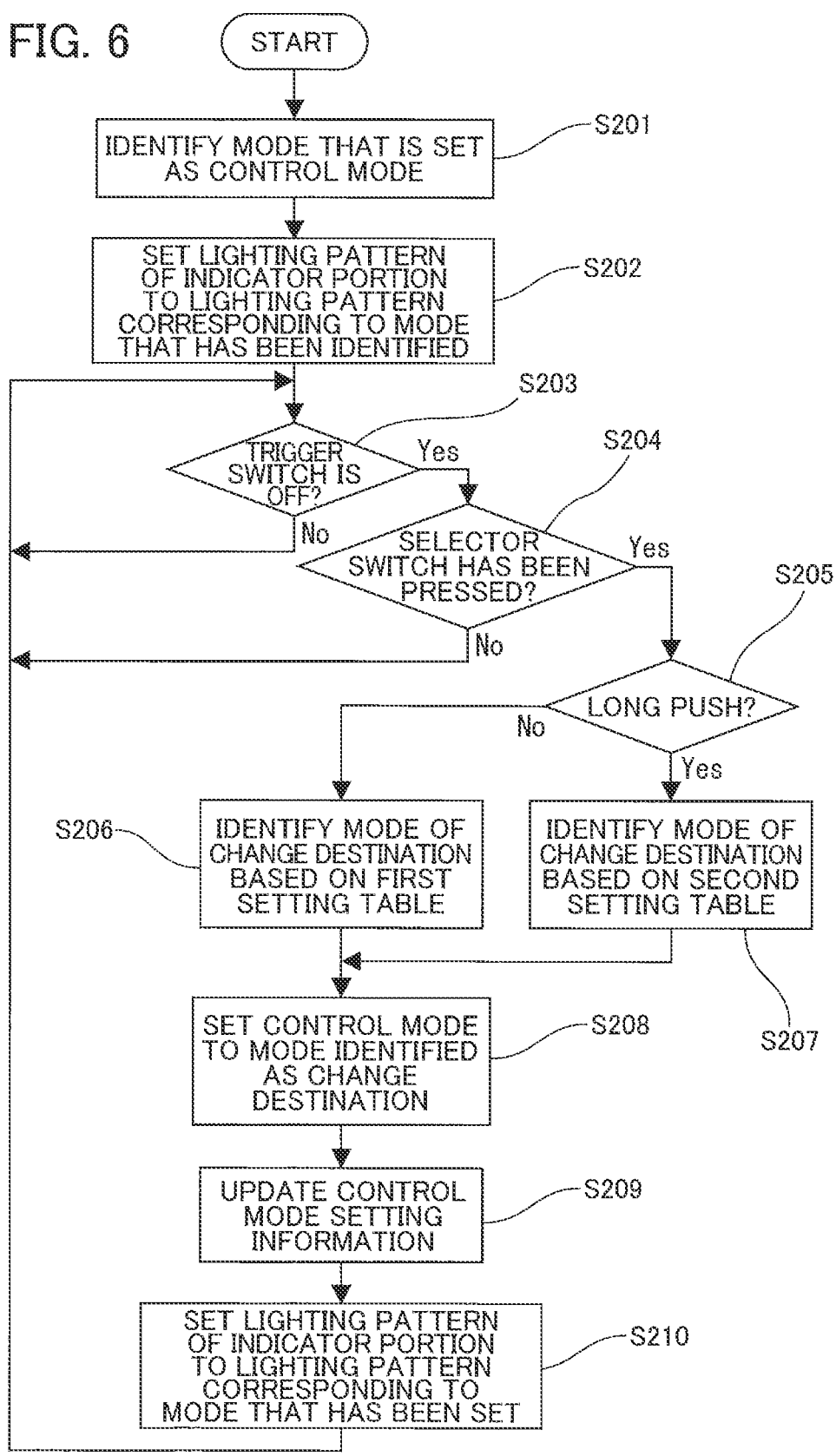
FIG. 6 is a flowchart illustrating a control mode setting and indicating process in the hammer drill according to the first embodiment of the present invention.

As illustrated in FIG. 6, when the control mode setting and indicating process is started, in S201 the controller 46 identifies the mode that is currently set as the control mode (i.e., identifies the mode set as the control mode at the timing of executing S201). The controller 46 identifies the mode indicated by the control mode setting information stored in the third storage unit 46C as the mode set as the control mode at the timing of executing S201.

Note that information specifying the first normal speed mode is stored in the third storage unit 46C as the control mode setting information when the hammer drill 1 is shipped (the control mode is set to the first normal speed mode when the hammer drill 1 is shipped), and information specifying one of the eight modes described above is stored as the control mode setting information in S209 described later in the control mode setting and indicating process. Accordingly, any time after the hammer drill 1 has been shipped, information specifying one of these eight modes is already stored in the third storage unit 46C as the control mode setting information.

After identifying in S201 the mode that is currently set as the control mode, in S202 the controller 46 sets the lighting pattern of the indicator portion 211B to a lighting pattern corresponding to the mode identified in S201 (i.e., the mode already set as the control mode at the time of the execution of S201). Specifically, the controller 46 uses a lighting pattern table shown in FIG. 7 to identify the lighting pattern that corresponds to the mode identified in S201 and sets the state of each first LED 211C, second LED 211D, and third LED 211E to one of the states ON, OFF, and FLASHING according to the identified lighting pattern. For example, if the mode identified in S201 is the second low speed mode, the controller 46 sets the first LED 211C and second LED 211D to the OFF state and the third LED 211E to the FLASHING state. Alternatively, if the mode identified in S201 is the fourth normal speed mode, for example, the controller 46 sets the first LED 211C to the ON state, the second LED 211D to the FLASHING state, and the third LED 211E to the OFF state. The controller 46 sets the three LEDs to ON, FLASHING, and OFF by individually outputting prescribed voltage signals to the three LEDs.

After setting the lighting pattern for the indicator portion 211B in S202 as the lighting pattern corresponding to the mode identified in S201, in S203 the controller 46 determines whether the trigger switch 23A is in the OFF state. The controller 46 performs this determination by determining whether the signal inputted from the trigger switch 23A is an OFF state signal or an ON state signal. The controller 46 determines that the trigger switch 23A is in the OFF state when an OFF state signal has been inputted and determines that the trigger switch 23A is not in the OFF state (i.e., is in the ON state) when an ON state signal has been inputted.

If the controller 46 determines in S203 that the trigger switch 23A is not in the OFF state (S203: NO), the controller 46 repeats the determination in S203. In other words, the controller 46 waits while repeatedly performing the determination in S203 until the trigger switch 23A is in the OFF state.

On the other hand, if the controller 46 determines in S203 that the trigger switch 23A is in the OFF state (S203: YES), in S204 the controller 46 determines whether the user has pressed the selector switch 211A. The controller 46 makes this determination based on whether a push signal has been inputted from the selector switch 211A. The controller 46 determines that the selector switch 211A has been pressed when a push signal has been inputted and that the selector switch 211A has not been pressed when a push signal has not been inputted.

If the controller 46 determines in S204 that the selector switch 211A has not been pressed (S204: NO), the controller 46 returns to S203. In other words, if the trigger switch 23A is in the OFF state but the selector switch 211A has not been pressed, the controller 46 repeatedly performs the determinations in S203 and S204 to monitor pressing operations on the selector switch 211A.

However, if the controller 46 determines in S204 that the selector switch 211A has been pressed (S204: YES), in S205 the controller 46 determines whether the push operation detected in S204 is a long push (a long push operation). The controller 46 makes this determination by determining whether the duration of the push operation is greater than or equal to a prescribed interval T2 based on the push signal outputted from the selector switch 211A. The controller 46 determines that the push operation is a long push when the duration of the push operation is greater than or equal to the prescribed interval T2 and determines that the push operation is not a long push, i.e., a short push (a short push operation), when the duration of the push operation is less than the prescribed interval T2. This duration of the push operation is measured using the timing unit 46D.

If the controller 46 determines in S205 that the push operation detected in S204 is not a long push (S205: NO), in S206 the controller 46 references a first setting table shown in FIG. 8 to identify the mode of the change destination corresponding to the mode identified in S201. For example, if the mode identified in S201 is the second low speed mode, the controller 46 identifies the first normal speed mode as the change destination. Alternatively, if the mode identified in S201 is the fourth normal speed mode, for example, the controller 46 identifies the fourth low speed mode as the change destination.

However, if the controller 46 determines in S205 that the push operation detected in S204 is a long push (S205: YES), in S207 the controller 46 references a second setting table shown in FIG. 9 to identify the mode of the change destination corresponding to the mode identified in S201. For example, if the mode identified in S201 is the third normal speed mode, the controller 46 identifies the first normal speed mode as the change destination. Alternatively, if the mode identified in S201 is the second low speed mode, for example, the controller 46 identifies the fourth low speed mode as the change destination.

After identifying the mode of the change destination in S206 or S207, in S208 the controller 46 sets the control mode to the mode identified as the change destination in S206 or S207. For example, if the mode identified in S207 as the change destination is the second normal speed mode, the controller 46 sets the control mode to the second normal speed mode.

After setting the control mode in S208 to the mode identified as the change destination in S206 or S207, in S209 the controller 46 updates the control mode setting information stored in the third storage unit 46C.

The controller 46 updates the control mode setting information by rewriting (overwriting) the information that is stored in the third storage unit 46C as the control mode setting information at the start timing for executing S209 (i.e., information specifying the mode that is set as the control mode at the timing of executing S201) with information specifying the mode set as the control mode in S208 (i.e., the mode that is set as the control mode at the start timing for executing S209). In other words, the controller 46 deletes the information that is stored in the third storage unit 46C as the control mode setting information at the start timing for executing S209 and stores information specifying the mode set in S208 as the control mode in the third storage unit 46C as the control mode setting information.

For example, if the mode that is set as the control mode at the timing of executing S201 is the first normal speed mode and the mode identified as the change destination in S207 is the third normal speed mode, the information that is stored as the control mode setting information at the start timing for executing S209 is information indicating the first normal speed mode. In this case, in S209 the controller 46 rewrites the information specifying the first normal speed mode that is stored in the third storage unit 46C as the control mode setting information to information specifying the third normal speed mode. In other words, in S209 the controller 46 deletes the information specifying the first normal speed mode that is stored in the third storage unit 46C as the control mode setting information and stores information specifying the third normal speed mode in the third storage unit 46C as the control mode setting information.

After updating the control mode setting information stored in the third storage unit 46C in S209, in S210 the controller 46 sets the lighting pattern for the indicator portion 211B to the lighting pattern corresponding to the mode that is set as the control mode in S208 (i.e., corresponding to the mode already set as the control mode when S210 is executed). Subsequently, the controller 46 returns to S203 to determine again whether the trigger switch 23A is in the OFF state and repeats the process in S203-S210.

With the hammer drill 1 that executes the control mode setting and indicating process described above, the user can change the control mode, provided that the trigger switch 23A is in the OFF state. Further, each time the user presses the selector switch 211A with a short push, the control mode is repeatedly changed in the order of first normal speed mode, first low speed mode, second normal speed mode, and second low speed mode or in the order of third normal speed mode, third low speed mode, fourth normal speed mode, and fourth low speed mode. Additionally, each time the user presses the selector switch 211A with a long push, the control mode is repeatedly changed between the first normal speed mode and the third normal speed mode, between the first low speed mode and the third low speed mode, between the second normal speed mode and the fourth normal speed mode, or between the second low speed mode and fourth low speed mode.

Next, the above eight modes that can be set as the control mode will be described with reference to FIGS. 10 through 16.

To begin with, the first normal speed mode and the first low speed mode will be described. The first normal speed mode and the first low speed mode are modes for driving the brushless motor 3 under constant rotational speed control. The maximum target rotational speed under constant rotational speed control executed in the first normal speed mode is a rotational speed N1, while the maximum target rotational speed under constant rotational speed control executed in the first low speed mode is a rotational speed N2, which is slower than the rotational speed N1. In the present embodiment, the rotational speed N1 is 23,000 rpm, and the rotational speed N2 is 15,000 rpm. Each of the first normal speed mode and the first low speed mode is an example of the "second mode" in the present invention.

Here, drive control of the brushless motor 3 performed by the controller 46 in the first normal speed mode will be described with reference to the flowchart in FIG. 10. Note that drive control in the first low speed mode and drive control in the first normal speed mode differ only in the maximum target rotational speed and are identical in all other aspects of control. Therefore, a detailed description of drive control in the first low speed mode has been omitted.

In the following description, a switching operation for switching the trigger switch 23A from the OFF state to the ON state will be called a "trigger-on operation," and a switching operation for switching the trigger switch 23A from the ON state to the OFF state will be called a "trigger-off operation." In addition, a series of operations for switching the trigger switch 23A from the OFF state to the ON state and subsequently from the ON state to the OFF state, i.e., the series of operations from a trigger-on operation to a trigger-off operation following the trigger-on operation will be called a "trigger-on/off operation." The trigger-on operation is an example of the "first switching operation." The trigger-off operation is an example of the "second switching operation." The trigger-on/off operation is an example of the "series of operations."

When the first normal speed mode is set as the control mode in the control mode setting and indicating process, the controller 46 starts drive control for the brushless motor 3 in the first normal speed mode. After initiating drive control in the first normal speed mode, in S301 of FIG. 10 the controller 46 determines whether the trigger switch 23A is in the ON state. The controller 46 makes this determination based on the signal outputted from the operation detection part 23B. Specifically, when the ON state signal is outputted from the operation detection part 23B, the controller 46 determines that the trigger switch 23A is in the ON state. When the OFF state signal is outputted from the operation detection part 23B, the controller 46 determines that the trigger switch 23A is in the OFF state.

When the controller 46 determines in S301 that the trigger switch 23A is not in the ON state (S301: NO), the controller 46 returns to S301 and again determines whether the trigger switch 23A is in the ON state. In other words, the controller 46 waits while repeatedly making the determination in S301 until a trigger-on operation has been performed.

When the controller 46 determines in S301 that the trigger switch 23A is in the ON state, i.e., when a trigger-on operation has been detected (S301: YES), in S302 the controller 46 begins constant rotational speed control and starts driving the brushless motor 3.

After starting to drive the brushless motor 3 in S302, in S303 the controller 46 determines whether the trigger switch 23A is in the ON state. If the controller 46 determines in S303 that the trigger switch 23A is in the ON state (303: YES), the controller 46 repeats this determination. In other words, after starting to drive the brushless motor 3, the controller 46 continues driving the brushless motor 3 under constant rotational speed control while repeatedly executing the determination in S303 until the trigger-off operation is performed.

Note that the maximum target rotational speed under constant rotational speed control is the rotational speed N1 in the first normal speed mode. Accordingly, when the operation amount of the trigger switch 23A is maximum (the maximum operation amount), the rotor 32 is driven to rotate at the rotational speed N1. When the operation amount is an amount other than the maximum rotation amount, the rotor 32 is driven to rotate at a rotational speed corresponding to that operation amount.

When the controller 46 determines in S303 that the trigger switch 23A is not in the ON state, i.e., when a trigger-off operation has been detected (S303: NO), the controller 46 stops constant rotational speed control to halt driving of the brushless motor 3. Subsequently, the controller 46 returns to S301 and repeats the process described above.

Note that if the control mode is changed from the first normal speed mode to another mode, the controller 46 halts drive control under the first normal speed mode and begins drive control under the mode of the change destination.

Next, the second normal speed mode and the second low speed mode will be described. The second normal speed mode and the second low speed mode are modes for driving the brushless motor 3 under soft start control. The final rotational speed under soft start control executed in the second normal speed mode is the rotational speed N1, and the final rotational speed under soft start control executed in the second low speed mode is the rotational speed N2. Further, the initial rotational speed under soft start control executed in the second normal speed mode is a rotational speed N3, which is slower than the rotational speed N1, and the initial rotational speed under soft start control executed in the second low speed mode is a rotational speed N4, which is slower than the rotational speed N2 and rotational speed N3. In the present embodiment, the rotational speed N3 is 200 rpm and the rotational speed N4 is 100 rpm. Each of the second normal speed mode and the second low speed mode is an example of the "second mode" in the present invention.

Figure 11:
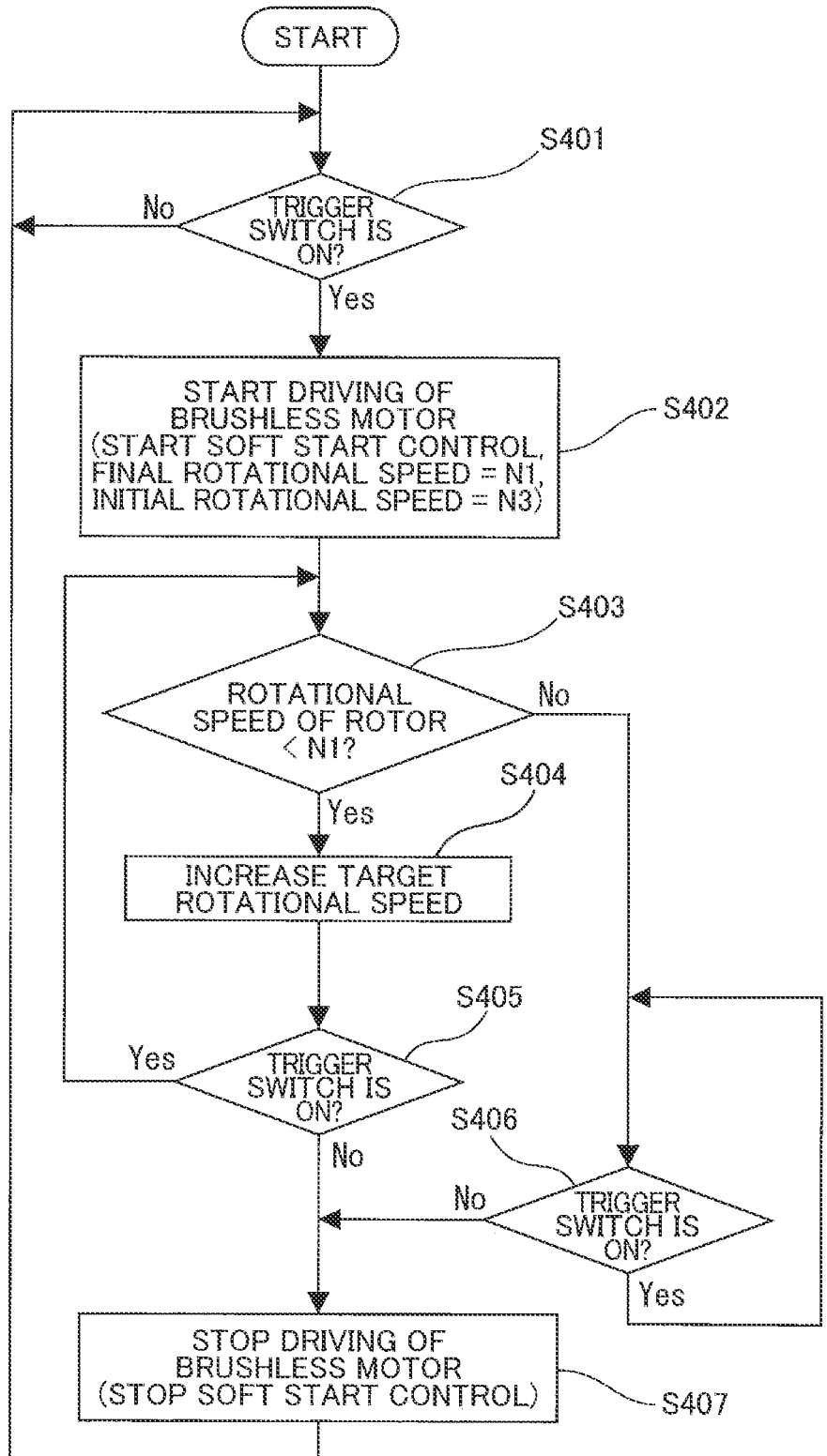
FIG. 11 is a flowchart illustrating drive control of the brushless motor under a second normal speed mode in the hammer drill according to the first embodiment of the present invention.

Here, drive control for the brushless motor 3 in the second normal speed mode will be described with reference to the flowchart in FIG. 11. Note that drive control under the second low speed mode and drive control under the second normal speed mode differ only in their initial rotational speeds and final rotational speeds and are identical in all other aspects of control. Accordingly, a detailed description of drive control in the second low speed mode has been omitted.

When the second normal speed mode is set as the control mode in the control mode setting and indicating process, the controller 46 begins drive control for the brushless motor 3 under the second normal speed mode. After starting drive control in the second normal speed mode, in S401 the controller 46 determines whether the trigger switch 23A is in the ON state.

The process performed when the controller 46 determines in S401 that the trigger switch 23A is not in the ON state (S401: NO) is identical to the process performed when the controller 46 determines in S301 that the trigger switch 23A is not in the ON state (S301: NO). Accordingly, a description of this process will be omitted.

When the controller 46 determines in S401 that the trigger switch 23A is in the ON state, i.e., when a trigger-on operation has been detected (S401: YES), in S402 the controller 46 starts soft start control to begin driving the brushless motor 3. The target rotational speed when beginning to drive the brushless motor 3 is the rotational speed N3 (i.e., the initial rotational speed under soft start control in the second normal speed mode).

After starting to drive the brushless motor 3 in S402, in S403 the controller 46 determines whether the rotational speed of the rotor 32 is less than the rotational speed N1 (the final rotational speed). The controller 46 makes this determination by calculating the rotational speed of the rotor 32 based on the rotated position signal and comparing the calculated rotational speed of the rotor 32 to the rotational speed N1.

When the controller 46 determines in S403 that the rotational speed of the rotor 32 is less than the rotational speed N1 (S303: YES), in 404 the controller 46 increases the target rotational speed and then determines in S405 whether the trigger switch 23A is in the ON state.

When the controller 46 determines in S405 that the trigger switch 23A is in the ON state (S405: YES), the controller 46 returns to S403 and again determines whether the trigger switch 23A is in the ON state. In other words, after starting to drive the brushless motor 3 and as long as the trigger switch 23A is in the ON state and the rotational speed of the rotor 32 is less than the rotational speed N1, the controller 46 repeatedly performs steps S403, S404, and S405 to continue driving the brushless motor 3 and to increase the target rotational speed from the rotational speed N3 (the initial rotational speed) toward the rotational speed N1 (the final rotational speed) at a prescribed rate of increase [rpm/s].

However, if the controller 46 determines in S403 that the rotational speed of the rotor 32 is not less than the rotational speed N1, i.e., if the controller 46 determines that the rotational speed of the rotor 32 has reached the final rotational speed (S403: NO), in S406 the controller 46 determines whether the trigger switch 23A is in the ON state.

If the controller 46 determines in S406 that the trigger switch 23A is in the ON state (406: YES), the controller 46 repeats the determination in S406. In other words, after the rotational speed of the rotor 32 has reached the rotational speed N1, the controller 46 continues to drive the brushless motor 3 with the target rotational speed fixed at the rotational speed N1 (the final rotational speed) while repeating the determination in S406 until a trigger-off operation has been performed.

When the controller 46 determines in S405 or S406 that the trigger switch 23A is not in the ON state, i.e., when a trigger-off operation has been detected (S405: NO or S406: NO), in S407 the controller 46 ends soft start control to halt driving of the brushless motor 3. Subsequently, the controller 46 returns to S401 and repeats the process described above. Note that if the control mode is changed from the second normal speed mode to another mode, the controller 46 ends drive control under the second normal speed mode and begins drive control under the mode of the change destination.

Next, the third normal speed mode and the third low speed mode will be described. The third normal speed mode and the third low speed mode are modes that execute auto-stop control while driving the brushless motor 3 under constant rotational speed control. The maximum target rotational speed under constant rotational speed control executed in the third normal speed mode is the rotational speed N1, and the maximum target rotational speed under constant rotational speed control executed in the third low speed mode is the rotational speed N2. Note that drive control in the third normal speed mode and drive control in the third low speed mode differ only in their maximum target rotational speeds and are identical in all other aspects of control. Accordingly, a detailed description of drive control in the third low speed mode has been omitted below. Each of the third normal speed mode and the third low speed mode is an example of the "first mode" in the present invention.

Under auto-stop control executed in the third normal speed mode, only a trigger-on/off operation that satisfies a first setting operation condition is treated as a setting operation, and a stop condition is set when a setting operation is performed.

The first setting operation condition is satisfied when the trigger-on/off operation executed in the third normal speed mode is the initial trigger-on/off operation performed in the third normal speed mode. In other words, only the first trigger-on/off operation in the third normal speed mode is treated as a setting operation, and the second and subsequent trigger-on/off operations in the third normal speed mode are not treated as setting operations.

Further, under auto-stop control executed in the third normal speed mode, the interval between the trigger-on operation and the trigger-off operation in the setting operation (i.e., in the initial trigger-on/off operation) is acquired as the stop condition information, and the stop condition is set using the acquired interval (i.e., using the stop condition information). Hereinafter, the interval from the trigger-on operation to the trigger-off operation in the setting operation will be called the "setting operation interval."

Figure 12:
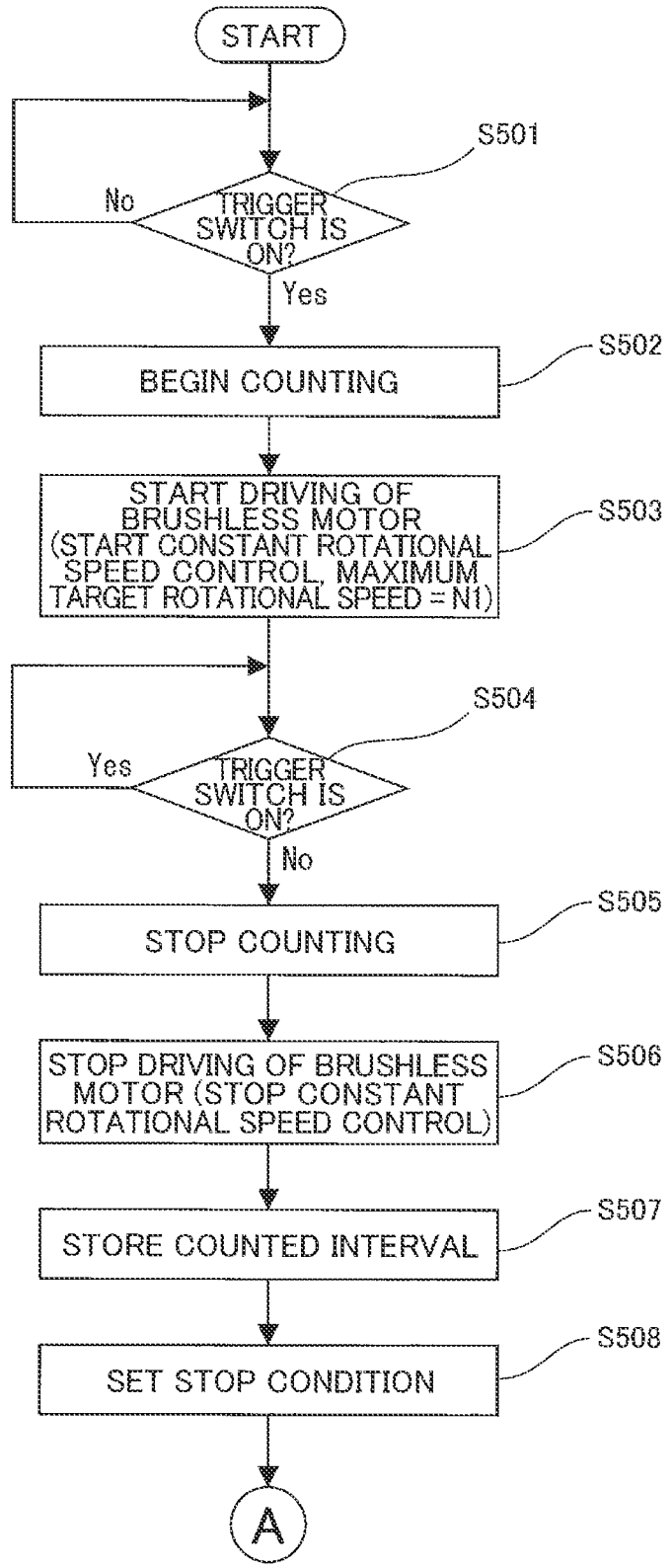
FIG. 12 is part of a flowchart illustrating drive control of the brushless motor under a third normal speed mode in the hammer drill according to the first embodiment of the present invention.

Here, drive control of the brushless motor 3 in the third normal speed mode will be described with reference to the flowcharts in FIGS. 12 and 13.

When the third normal speed mode is set as the control mode in the control mode setting and indicating process, the controller 46 begins drive control for the brushless motor 3 in the third normal speed mode. After starting drive control in the third normal speed mode, in S501 the controller 46 determines whether the trigger switch 23A is in the ON state, as illustrated in FIG. 12. The process performed when the controller 46 determines in S501 that the trigger switch 23A is not in the ON state (S501:NO) is identical to the process performed when the controller 46 determines in S301 that the trigger switch 23A is not in the ON state (S301: NO). Therefore, a description of this process has been omitted.

When the controller 46 determines in S501 that the trigger switch 23A is in the ON state, i.e., when a trigger-on operation has been detected (S501: YES), in S502 the controller 46 begins counting a time interval in order to measure the elapsed time from the moment that the trigger-on operation is performed. Here, the controller 46 counts the time interval using the timing unit 46D and resets the count value of the timing unit 46D to 0 just before beginning the count.

At the same time that the controller 46 begins counting the interval in S502, in S503 the controller 46 starts constant rotational speed control to begin driving the brushless motor 3. For convenience of description, the process in S502 and the process in S503 are indicated separately in FIG. 12, but the processes of S502 and S503 are simultaneously executed as described above.

After starting to drive the brushless motor 3 in S503, in S504 the controller 46 determines whether the trigger switch 23A is in the ON state. If the controller 46 determines in S504 that the trigger switch 23A is in the ON state (S504: YES), the controller 46 returns to S504 and again determines whether the trigger switch 23A is in the ON state. In other words, after starting to drive the brushless motor 3, the controller 46 continues driving the brushless motor 3 according to constant rotational speed control and continues the interval counting started in S502 while repeatedly performing the determination in S504 until a trigger-off operation is performed.

When the controller 46 determines in S504 that the trigger switch 23A is not in the ON state, i.e., when a trigger-off operation has been detected (S504: NO), in S505 the controller 46 stops counting the time interval and acquires the count value of the timing unit 46D at the moment the count is halted as the stop condition information.

Here, a description will be given for the trigger-on/off operation from the trigger-on operation detected in S501 to the trigger-off operation detected in S504, and the count value of the timing unit 46D at the moment counting is halted in 505.

The trigger-on/off operation from the trigger-on operation detected in S501 to the trigger-off operation detected in S504 is the trigger-on/off operation that is first performed in the third normal speed mode. Accordingly, this trigger-on/off operation satisfies the first setting operation condition and is the setting operation in the third normal speed mode.

Further, the interval specified by the count value of the timing unit 46D at the moment that counting is halted in S505 (the counted interval) is the interval from the trigger-on operation detected in S501 to the trigger-off operation detected in S504, i.e., the interval from the trigger-on operation to the trigger-off operation in the setting operation. Hence, the interval specified by this count value is the setting operation interval in the third normal speed mode. In other words, the controller 46 acquires the setting operation interval (i.e., information indicating the setting operation interval) in S505 as the stop condition information based on the setting operation from the trigger-on operation detected in S501 to the trigger-off operation detected in S504.

At the same time that the controller 46 stops counting in S505, in S506 the controller 46 ends constant rotational speed control to halt driving of the brushless motor 3. For convenience of description, the process in S505 and the process in S506 are indicated separately in FIG. 12, but the processes in S505 and S506 are simultaneously executed as described above.

After halting the drive of the brushless motor 3 in S506, in S507 the controller 46 stores the setting operation interval acquired in S505 (the counted interval) in the third storage unit 46C as the stop condition information.

After storing the setting operation interval (the counted interval) in the third storage unit 46C in S507, in S508 the controller 46 sets the stop condition. This stop condition is set using the setting operation interval stored in the third storage unit 46C as the stop condition information. Specifically, the stop condition is set to "the setting operation interval elapses from the timing that the trigger-on operation is performed."

Figure 13:
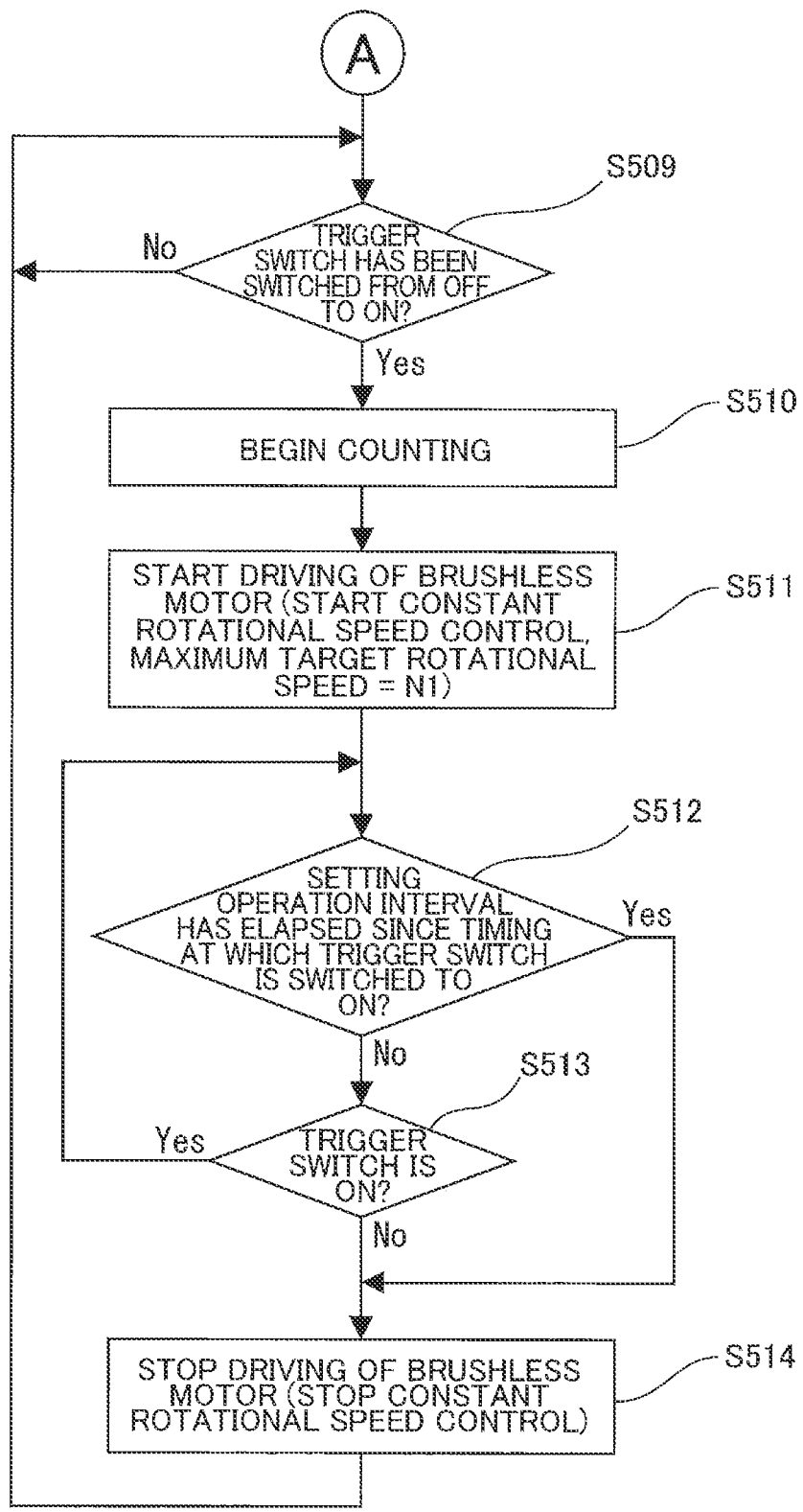
FIG. 13 is the other part of the flowchart illustrating drive control of the brushless motor under the third normal speed mode in the hammer drill according to the first embodiment of the present invention.

As illustrated in FIG. 13, after setting the stop condition in S508, in S509 the controller 46 determines whether a trigger-on operation has been performed, i.e., whether the trigger switch 23A has been switched from the ON state to the OFF state. The controller 46 makes this determination by determining whether the signal from the operation detection part 23B has changed from an OFF state signal to an ON state signal.

If the controller 46 determines in S509 that a trigger-on operation is not performed (509: NO), the controller 46 returns to S509. In other words, the controller 46 waits while repeating the determination in S509 until a trigger-on operation has been performed.

When the controller 46 determines in S509 that a trigger-on operation has been performed, i.e., when a trigger-on operation has been detected (S509: YES), in S510 the controller 46 resets the count value of the timing unit 46D to 0 and begins counting a time interval in order to measure the elapsed time from the moment the trigger-on operation is performed.

At the same time that the controller 46 begins counting the interval in S510, in S511 the controller 46 initiates constant rotational speed control to begin driving the brushless motor 3. For convenience of description, the process in S510 and the process in S511 are indicated separately in FIG. 13, but the processes of S510 and S511 are simultaneously executed as described above.

After beginning to drive the brushless motor 3 in S511, in S512 the controller 46 determines whether the setting operation interval has elapsed since the timing of the most recent trigger-on operation. In other words, the controller 46 determines in S512 whether the stop condition set in S508 has been satisfied. The controller 46 performs this determination by acquiring the count value of the timing unit 46D at the timing of executing S512 and compares the interval indicated by the acquired count value to the setting operation interval stored in the third storage unit 46C.

If the controller 46 determines in S512 that the setting operation interval has not elapsed since the timing of the most recent trigger-on operation, i.e., if the controller 46 determines that the stop condition has not been met (S512: NO), in S513 the controller 46 determines whether the trigger switch 23A is in the ON state.

If the controller 46 determines in S513 that the trigger switch 23A is in the ON state (S513: YES), the controller 46 returns to S512. In other words, the controller 46 continues driving the brushless motor 3 according to constant rotational speed control while repeating the determinations in S512 and S513 until the setting operation interval elapses from the timing of the most recent trigger-on operation (i.e., until the stop condition is satisfied) or until a trigger-off operation is performed.

Returning to the description of S512, if the controller 46 determines in S512 that the setting operation interval has elapsed since the timing of the most recent trigger-on operation, i.e., if the controller 46 determines that the stop condition set in S508 was met (S512: YES), in S514 the controller 46 ends constant rotational speed control to stop driving the brushless motor 3 even if the trigger switch 23A is in the ON state (i.e., even if a trigger-off operation has been performed).

Further, if the controller 46 determines in S513 that the trigger switch 23A is not in the ON state, i.e., when a trigger-off operation has been detected (S513: NO), in S514 the controller 46 stops driving the brushless motor 3 even if the setting operation interval has not elapsed since the timing of the most recent trigger-on operation. Note that since the trigger-on/off operation from the trigger-on operation detected in S509 to the trigger-off operation detected in S513 is not the first trigger-on/off operation performed in the third normal speed mode (since the first setting operation condition is not met), this operation is not a setting operation in the third normal speed mode. Accordingly, the controller 46 does not set the stop condition based on the trigger-on/off operation from the trigger-on operation detected in S509 to the trigger-off operation detected in S513.

After stopping the drive of the brushless motor 3 in S514, the controller 46 returns to S509 and again waits until a trigger-on operation is performed. If the control mode is modified from the third normal speed mode to another mode, the controller 46 ends drive control of the brushless motor 3 in the third normal speed mode, deletes the setting operation interval stored in the third storage unit 46C as the stop condition information, and returns the stop condition to an unset state.

Under drive control in the third normal speed mode described above, if the interval from the trigger-on operation to the trigger-off operation in the initial trigger-on/off operation (the setting operation) is t1 [s] and a drilling operation is begun simultaneously with the trigger-on operation and is ended simultaneously with the trigger-off operation, then when a subsequent drilling operation is begun by performing a trigger-on operation to drive the brushless motor 3, the drive of the brushless motor 3 is automatically halted and the drilling operation ended at the moment t1 [s] has elapsed after the trigger-on operation (drive start), even if the trigger switch 23A is maintained in the ON state.

In this way, the drive interval of the brushless motor 3 initiated by the setting operation (the initial trigger-on/off operation) is reproduced when driving the brushless motor 3 by the second and subsequent trigger-on operations under drive control in the third normal speed mode. In other words, the drilling operation performed with the hammer drill 1 for the setting operation is reproduced by trigger-on operations following the setting operation. Consequently, the depth of the drill hole formed in the workpiece by the drilling operation performed for the setting operation (the initial trigger-on/off operation) is approximately equal to the depth of drill holes formed in the workpiece through drilling operations performed in subsequent trigger-on operations in the third normal speed mode. Thus, when performing work to form a plurality of drill holes, the drill holes can be formed at substantially the same depth. Since a plurality of drill holes can be formed at a uniform depth in this way, usability can be improved.

Next, the fourth normal speed mode and the fourth low speed mode will be described. The fourth normal speed mode and the fourth low speed mode are modes that execute auto-stop control while driving the brushless motor 3 under soft start control. The final rotational speed under son start control executed in the fourth normal speed mode is the rotational speed N1, and the final rotational speed under soft start control executed in the fourth low speed mode is the rotational speed N2. Further, the initial rotational speed under soft start control executed in the fourth normal speed mode is the rotational speed N3, and the initial rotational speed under soft start control executed in the fourth low speed mode is the rotational speed N4. Note that drive control in the fourth normal speed mode and drive control in the fourth low speed mode differ only in their final rotational speeds and initial rotational speeds and are identical in all other aspects of control. Accordingly, a detailed description of drive control in the fourth low speed mode has been omitted below. Each of the fourth normal speed mode and the fourth low speed mode is an example of the "first mode" in the present invention.

Under auto-stop control executed in the fourth normal speed mode, only a trigger-on/off operation that satisfies a second setting operation condition is treated as a setting operation, and a stop condition is set in response to a setting operation being performed.

The second setting operation condition is satisfied when a trigger-off operation is performed in a trigger-on/off operation after the rotational speed of the brushless motor 3 (the rotor 32), whose drive is started by a trigger-on operation in the same trigger-on/off operation, reaches the final rotational speed. In other words, a trigger-on/off operation is treated as a setting operation in the fourth normal speed mode if the rotational speed of the brushless motor 3 reaches the final rotational speed in the interval from the trigger-on operation to the trigger-off operation of the trigger-on/off operation. However, a trigger-on/off operation is not treated as a setting operation if the rotational speed of the brushless motor 3 does not reach the final rotational speed in the interval from the trigger-on operation to the trigger-off operation of the trigger-on/off operation. Note that a trigger-on/off operation is not treated as a setting operation once the stop condition has been set, even if the trigger-on/off operation satisfies the second setting operation condition.

Further, as in auto-stop control for the third normal speed mode, in auto-stop control for the fourth normal speed mode the interval from the trigger-on operation to the trigger-off operation of the setting operation, i.e., the setting operation interval, is acquired as stop condition information, and the stop condition is set using the acquired setting operation interval (i.e., the stop condition information).

Figure 14:
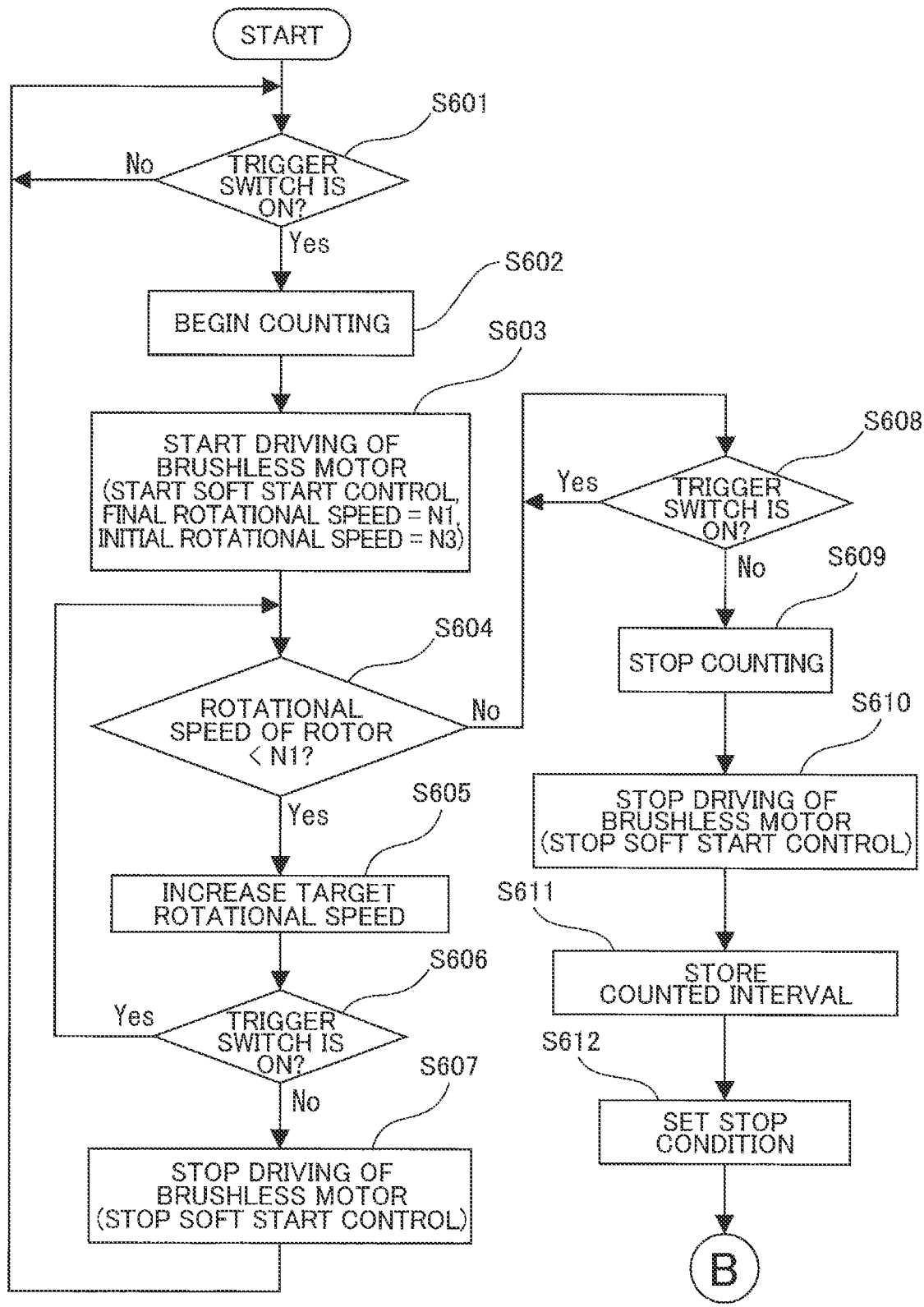
FIG. 14 is part of a flowchart illustrating drive control of the brushless motor under a fourth normal speed mode in the hammer drill according to the first embodiment of the present invention.

Here, drive control for the brushless motor 3 in the fourth normal speed mode will be described with reference to the flowcharts in FIGS. 14 and 15.

When the fourth normal speed mode is set as the control mode in the control mode setting and indicating process, the controller 46 starts drive control for the brushless motor 3 in the fourth normal speed mode. As illustrated in FIG. 14, after initiating drive control in the fourth normal speed mode, in S601 the controller 46 determines whether the trigger switch 23A is in the ON state. The process performed when the controller 46 determines in S601 that the trigger switch 23A is not in the ON state (S601: NO) is identical to the process performed when the controller 46 determines in S301 that the trigger switch 23A is not in the ON state (S301: NO). Therefore, a description of this process has been omitted.

If the controller 46 determines in S601 that the trigger switch 23A is in the ON state, i.e., when a trigger-on operation has been detected (S601: YES), in S602 the controller 46 starts counting a time interval in order to measure the time that elapses from the moment the trigger-on operation is performed with the trigger switch 23A.

At the same time that the controller 46 starts counting the interval in S602, in S603 the controller 46 begins soft start control to start driving the brushless motor 3. The target rotational speed when beginning driving of the brushless motor 3 is the rotational speed N3 (i.e., the initial rotational speed under soft start control in the fourth normal speed mode). For convenience of description, the process in S602 and the process in S603 are indicated separately in FIG. 14, but the processes in S602 and S603 are simultaneously performed as described above.

After starting to drive the brushless motor 3 in S603, in S604 the controller 46 determines whether the rotational speed of the rotor 32 is less than the rotational speed N1 (the final rotational speed). If the controller 46 determines in S604 that the rotational speed of the rotor 32 is less than the rotational speed N1 (S604: YES), in S605 the controller 46 increases the target rotational speed and then determines in S606 whether the trigger switch 23A is in the ON state.

If the controller 46 determines in S606 that the trigger switch 23A is in the ON state (S606: YES), the controller 46 returns to S604 and again determines whether the trigger switch 23A is in the ON state. In other words, as long as a trigger-off operation has not been performed after beginning to drive the brushless motor 3 and the rotational speed of the rotor 32 remains less than the rotational speed N1, the controller 46 repeats the process in S604, S605, and S606 to drive the brushless motor 3 and to continue the count initiated in S602 while increasing the target rotational speed from the rotational speed N3 (the initial rotational speed) toward the rotational speed N1 (the final rotational speed) at the prescribed rate of increase [rpm/s].

On the other hand, if the controller 46 determines in S606 that the trigger switch 23A is not in the ON state, i.e., when a trigger-off operation has been detected (S606: NO), in S607 the controller 46 ends soft start control to halt driving of the brushless motor 3, returns to S601, and waits for a trigger-on operation to be performed. Here, the trigger-off operation detected in S606 has been performed prior to the rotational speed of the brushless motor 3 reaching the final rotational speed (the rotational speed N1). Accordingly, the trigger-on/off operation from the trigger-on operation detected in S601 to the trigger-off operation detected in S606 does not satisfy the second setting operation condition and is not a setting operation in the fourth normal speed mode. Therefore, a stop condition is not set based on this trigger-on/off operation.

Returning to the description of S604, if the controller 46 determines in S604 that the rotational speed of the rotor 32 is not less than the rotational speed N1, i.e., if the controller 46 determines that the rotational speed of the rotor 32 has reached the final rotational speed (S604: NO), in S608 the controller 46 determines whether the trigger switch 23A is in the ON state.

If the controller 46 determines in S608 that the trigger switch 23A is in the ON state (S608: YES), the controller 46 repeats the determination in S608. In other words, after the rotational speed of the rotor 32 has reached the rotational speed N1, the controller 46 continues driving the brushless motor 3 with the target rotational speed fixed at the rotational speed N1 (the final rotational speed) and continues the count initiated in S602 while repeating the determination in S608 until a trigger-off operation is performed.

If the controller 46 determines in S608 that the trigger switch 23A is not in the ON state, i.e., when a trigger-off operation has been detected (S608: NO), in S609 the controller 46 stops counting the time interval and acquires the count value of the timing unit 46D at the moment the count is halted as stop condition information.

Here, a description will be given for the trigger-on/off operation from the trigger-on operation detected in S601 to the trigger-off operation detected in S608, and the count value of the timing unit 46D at the moment counting is halted in S609.

The trigger-off operation detected in S608 is performed after the rotational speed of the brushless motor 3 has reached the final rotational speed (the rotational speed N1). Accordingly, the trigger-on/off operation from the trigger-on operation detected in S601 to the trigger-off operation detected in S608 satisfies the second setting operation condition and is a setting operation in the fourth normal speed mode.

Additionally, the interval indicated by the count value of the timing unit 46D at the moment counting is halted in S609 (the counted interval) is the interval from the trigger-on operation detected in S601 to the trigger-off operation detected in S608, i.e., the interval from the trigger-on operation to the trigger-off operation of the setting operation. Therefore, the interval specified by this count value is the setting operation interval in the fourth normal speed mode. In other words, the controller 46 acquires the setting operation interval (i.e., information specifying the setting operation interval) in S609 as the stop condition information based on the setting operation from the trigger-on operation detected in S601 to the trigger-off operation detected in S608.

Further, at the same time that the controller 46 stops the count in S609, in S610 the controller 46 ends soft start control to halt driving of the brushless motor 3. For convenience of description, the process of S609 and the process of S610 are indicated separately in FIG. 14, but the processes in S609 and S610 are performed simultaneously as described above.

After halting driving of the brushless motor 3 in S610, in S611 the controller 46 stores the setting operation interval acquired in S609 (the counted interval) in the third storage unit 46C as the stop condition information.

After storing the setting operation interval in the third storage unit 46C in S611, in S612 the controller 46 sets the stop condition. The stop condition is set using the setting operation interval stored in the third storage unit 46C as the stop condition information. Specifically, the stop condition is set to "the setting operation interval elapses from the timing at which the trigger-on operation is performed."

Figure 15:
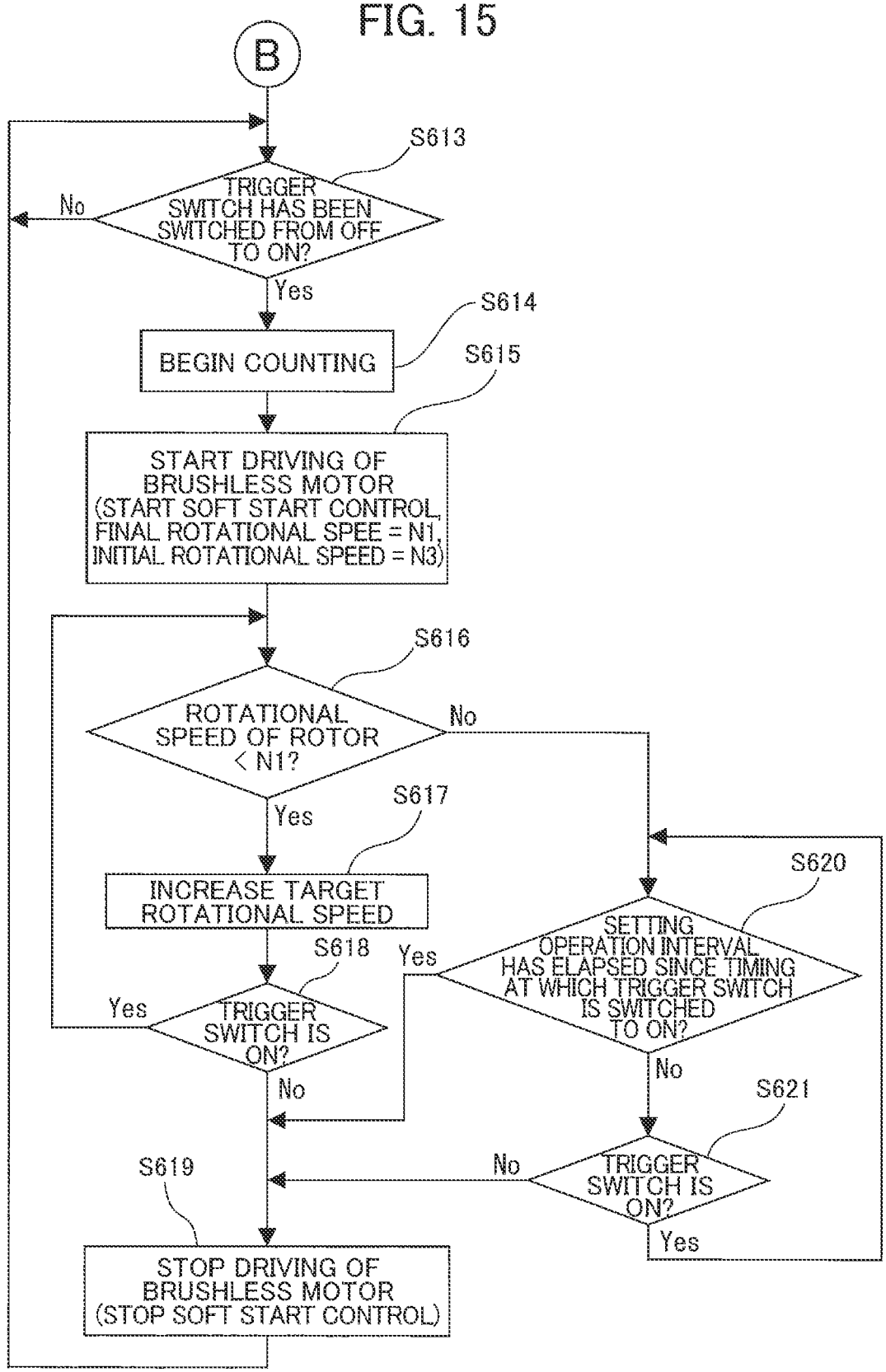
FIG. 15 is the other part of the flowchart illustrating drive control of the brushless motor under the fourth normal speed mode in the hammer drill according to the first embodiment of the present invention.

As illustrated in FIG. 15, after setting the stop condition in S612, in S613 the controller 46 determines whether a trigger-on operation has been performed, i.e., determines whether the trigger switch 23A has been switched from the ON state to the OFF state.

The process performed when the controller 46 determines in S613 that a trigger-on operation is not performed (S613: NO) is identical to the process performed when the controller 46 determines in S509 that a trigger-on operation is not performed (S509: NO). Therefore, a description of this process has been omitted.

If the controller 46 determines in S613 that a trigger-on operation has been performed, i.e., when a trigger-on operation has been detected (S613: YES), in S614 the controller 46 resets the count value of the timing unit 46D to 0 and begins counting a time interval in order to measure the elapsed time from the moment the trigger-on operation is performed.

Additionally, at the same time that the controller 46 starts counting the interval in S614, in S615 the controller 46 begins soft start control to start driving the brushless motor 3. For convenience of description, the process of S614 and the process of S615 are indicated separately in FIG. 15, but the processes in S614 and S615 are performed simultaneously as described above.

After starting to drive the brushless motor 3 in S615 and as long as a trigger-off operation has not been performed and the rotational speed of the rotor 32 remains less than the rotational speed N1, the controller 46 repeatedly performs S616, S617, and S618 to drive the brushless motor 3 and to continue the count initiated in S614 while increasing the target rotational speed from the rotational speed N3 (the initial rotational speed) toward the rotational speed N1 (the final rotational speed) at the prescribed rate of increase [rpm/s].

However, if the controller 46 determines in S618 that the trigger switch 23A is not in the ON state, i.e., that a trigger-off operation has been performed (S618: NO), in S619 the controller 46 ends soft start control to halt driving of the brushless motor 3, and subsequently returns to S613 to wait until another trigger-on operation is performed.

Returning to the description of S616, if the controller 46 determines in S616 that the rotational speed of the rotor 32 is not less than the rotational speed N1, i.e., when the controller 46 determines that the rotational speed of the rotor 32 has reached the final rotational speed (S616: NO), in S620 the controller 46 determines whether the setting operation interval has elapsed since the timing at which the most recent trigger-on operation is performed. In other words, in S620 the controller 46 determines whether the stop condition set in S612 has been satisfied.

If the controller 46 determines in S620 that the setting operation interval has not elapsed since the timing of the most recent trigger-on operation, i.e., if the controller 46 determines that the stop condition has not been met (S620: NO), in S621 the controller 46 determines whether the trigger switch 23A is in the ON state.

If the controller 46 determines in S621 that the trigger switch 23A is in the ON state (S621: YES), the controller 46 returns to S620 and repeats the determination in S620. In other words, the controller 46 continues driving the brushless motor 3 according to soft start control while repeating the determinations in S620 and S621 until either the setting operation interval elapses after the most recent trigger-on operation (i.e., until the stop condition is met) or a trigger-off operation is performed.

If the controller 46 determines in S620 that the setting operation interval has elapsed since the timing of the most recent trigger-on operation, i.e., if the controller 46 determines that the stop condition set in S612 has been met (620: YES), in S619 the controller 46 ends soft start control to halt driving of the brushless motor 3, even though the trigger switch 23A is in the ON state (i.e., despite a trigger-off operation not having been performed).

Further, if the controller 46 determines in S621 that the trigger switch 23A is not in the ON state, i.e., when a trigger-off operation has been detected (S621: NO), in S619 the controller 46 stops driving the brushless motor 3 even though the setting operation interval has not elapsed since the most recent trigger-on operation.

After halting driving of the brushless motor 3 in S619, the controller 46 returns to S613 and once again waits until a trigger-on operation is performed. Note that if the control mode has been changed from the fourth normal speed mode to another mode, the controller 46 ends drive control for the brushless motor 3 in the fourth normal speed mode, deletes the setting operation interval stored in the third storage unit 46C as the stop condition information, and returns the stop condition to an unset state.

Under drive control performed by the controller 46 in the fourth normal speed mode described above, a drilling operation performed by the hammer drill 1 when executing a setting operation is reproduced by trigger-on operations executed after this setting operation. Therefore, in work for forming a plurality of drill holes in the fourth normal speed mode, the depth of the plurality of drill holes can be made substantially uniform.

Further, when a trigger-off operation is performed during a trigger-on/off operation before the rotational speed of the brushless motor 3 has reached the final rotational speed (i.e., when the trigger-on/off operation does not satisfy the second setting operation condition), this trigger-on/off operation is not treated as a setting operation under drive control in the fourth normal speed mode, and a stop condition is not set based on this trigger-on/off operation. This ensures that only a properly performed drilling operation is reproduced and can therefore improve usability.

Specifically, if a trigger-off operation in a trigger-on/off operation is performed prior to the rotational speed of the brushless motor 3 reaching the final rotational speed, it is possible that the user has discontinued the drilling operation in the middle for whatever reason after having driven the brushless motor 3 with the trigger-on operation in the trigger-on/off operation. On the other hand, if a trigger-off operation in a trigger-on/off operation is performed after the rotational speed of the brushless motor 3 has reached the final rotational speed, i.e., when a setting operation (a trigger-on/off operation that satisfies the second setting operation condition) is performed, it is likely that the user has performed an appropriate drilling operation. In view of the foregoing, among trigger-on/off operations performed by the user under drive control in the fourth normal speed mode, only a trigger-on/off operation that satisfies the second setting operation condition in which the drilling operation has been likely performed properly is treated as a setting operation, and the stop condition is set based on this setting operation. This ensures that only a properly performed drilling operation is reproduced and can therefore further improve usability.

Thus, the hammer drill 1 described above is provided with the brushless motor 3 that generates a drive force; the bit attachment portion 9 to which the end bit E is attachable; the power transmission portion 8 that can apply a striking force and a rotational force to the end bit E attached to the bit attachment portion 9 by receiving the drive force; the trigger switch 23A that receives a setting operation for setting the stop condition to stop the brushless motor 3 and that can be switched between the ON state and the OFF state by a manual operation; and the controller 46 that can control the brushless motor 3. Further, the controller 46 can execute a process to set the stop condition based on the setting operation received by the trigger switch 23A; a process to start driving of the brushless motor 3; and a process to stop the brushless motor 3. Further, the controller 46 executes the process to start driving the brushless motor 3 in response to a trigger-on operation; the process to start driving the brushless motor 3 in response to a trigger-off operation. In a state where the stop condition is set, when the stop condition is met while the brushless motor 3 is being driven, the controller 46 executes the process to start driving the brushless motor 3 even if the trigger switch 23A is in the ON state.

With this configuration, when an operation to switch the trigger switch 23A from the OFF state to the ON state and to maintain the trigger switch 23A in the ON state is performed in a state where a stop condition is set by a setting operation being performed, the brushless motor 3 is driven and subsequently is halted automatically when the stop condition is met. In other words, in a state where a stop condition is set, a drilling operation performed once through the above actions is reproduced each time the above actions are repeated, provided that the work environment (the workpiece or work content) does not change drastically. Accordingly, by repeatedly performing drilling operations according to the above actions to form a plurality of drill holes, uniformity in the depth of the formed drill holes can be achieved. Moreover, the above control is implemented through a function of the controller 46 without requiring a special sensor, complex wiring, and the like. In this way, a plurality of drill holes can easily be formed at a uniform depth through a simple structure and at a low cost.

Additionally, the controller 46 in the hammer drill 1 according to the first embodiment has eight control modes for controlling the brushless motor 3 and can also implement a process for selectively setting one of the eight modes as the control mode. These eight modes include at least the third normal speed mode and the first normal speed mode. In the third normal speed mode, the controller 46 executes a process for setting a stop condition based on a setting operation when trigger switch 23A receives the setting operation. In the first normal speed mode, the controller 46 does not execute the process to for setting the stop condition.

According to the configuration described above, the controller 46 has the third normal speed mode for performing a process to set a stop condition based on a setting operation when the trigger switch 23A has received the setting operation, and the first normal speed mode for not performing the process to set a stop condition. Accordingly, the user can select an operation to form a plurality of drill holes at uniform depth and an operation to form a plurality of drill holes at desired depths that are individually different. This can improve work flexibility.

The trigger switch 23A in the present embodiment receives a setting operation for setting a stop condition to stop the brushless motor 3 and can be switched between the ON state and the OFF state through a manual operation. Further, in the third normal speed mode, the controller 46 executes a process to acquire stop condition information based on a setting operation when the trigger switch 23A has received the setting operation. In the process for setting a stop condition based on a setting operation, the controller 46 also sets the stop condition using the acquired stop condition information.

According to this configuration, the member that controls the drive start of the brushless motor 3 and the member that receives the setting operation are the same member. Accordingly, the number of members operated by the user can be reduced, thereby further improving usability without requiring the user to perform complex operations. This configuration can also reduce the number of parts, enabling the hammer drill 1 to be manufactured with a simpler construction and at a lower cost.

The setting operation on the hammer drill 1 is the trigger-on/off operation that is first performed in the third normal speed mode. In the process for acquiring stop condition information based on a setting operation, the controller 46 acquires the setting operation interval, which is the time interval from the trigger-on operation to the trigger-off operation in the setting operation, as the stop condition information. In the process for setting the stop condition, the controller 46 sets the stop condition to "the setting operation interval elapses from the timing of the trigger-on operation."

With the above configuration, the stop condition is set using the setting operation interval. Accordingly, a drilling operation performed during the setting operation can be more accurately reproduced and the user can perform operations more intuitively than when using a distance sensor and the like.

In the hammer drill 1 according to the present embodiment, the drive speed of the brushless motor 3 can be changed and enable/disable of the auto-stop control can be switched by operating the selector switch 211A. Hence, a common operation part can be used for changing the drive speed and for switching the control mode, thereby simplifying the structure of the hammer drill 1 and improving usability for the user.

The hammer drill 1 according to the present embodiment includes the third storage unit 46C, which is a nonvolatile storage medium for storing the mode set as the control mode; and the step-down circuit 43 capable of supplying power to the controller 46. Further, the controller 46 starts up when the step-down circuit 43 begins supplying power to the controller 46 and shuts down when the power supply from the step-down circuit 43 is interrupted. If the power supply to the controller 46 is interrupted and subsequently resumed, the controller 46 executes the process for setting the control mode to thereby set the control mode to the mode currently stored in the third storage unit 46C, preferably.

With this configuration, when the power supply to the controller 46 is resumed after being interrupted, the control mode is automatically set to the mode used prior to the power supply being interrupted. Therefore, a user that frequently uses a desired control mode need not reset the control mode to the desired mode each time power to the hammer drill 1 is switched off and on. Additionally, if the power supply to the hammer drill 1 is interrupted due to a power failure or the like and subsequently resumed by restoration of the power, the control mode is automatically set to the mode set prior to the power failure. Accordingly, the user need not reset the control mode to the mode set prior to the power failure. Hence, this configuration can further improve convenience and usability.

Next, a hammer drill according to a first variation of the first embodiment of the present invention will be described. The hammer drill according to the first variation can execute drive control for the brushless motor 3 in a fifth normal speed mode in place of the third normal speed mode used on the hammer drill 1. The hammer drill according to the first variation differs from the hammer drill 1 only in that the hammer drill according to the first variation has the capacity to execute drive control in the fifth normal speed mode in place of the third normal speed mode. The basic structure of the hammer drill according to the first variation and all other aspects of control are identical to those of the hammer drill 1. Further, structures and control of the hammer drill according to the first variation that are identical to those of the hammer drill 1 obtain the same effects as those obtained by the hammer drill 1.

The fifth normal speed mode is a mode for executing auto-stop control while driving the brushless motor 3 under constant rotational speed control. The maximum target rotational speed in constant rotational speed control executed in the fifth normal speed mode is the rotational speed N1. The fifth normal speed mode is an example of the "first mode" in the present invention.

Under auto-stop control executed in the fifth normal speed mode, only a trigger-on/off operation that satisfies a third setting operation condition is treated as a setting operation, and a stop condition is set in response to a setting operation being performed.

The third setting operation condition is satisfied when the interval from a trigger-on operation of a trigger-on/off operation performed in the fifth normal speed mode to a trigger-off operation of the same trigger-on/off operation (hereinafter called the "operation interval of the trigger-on/off operation") is greater than or equal to a lower limit interval Dp and less than an upper limit interval Up. In other words, a trigger-on/off operation in the fifth normal speed mode is not treated as a setting operation when the operation interval of the trigger-on/off operation is less than the lower limit interval Dp or greater than or equal to the upper limit interval Up. Note that a trigger-on/off operation is not treated as a setting operation when a stop condition has already been set, even if the trigger-on/off operation satisfies the third setting operation condition.

As under auto-stop control performed in the third normal speed mode and the fourth normal speed mode, the interval from the trigger-on operation to the trigger-off operation of the setting operation, i.e., the setting operation interval, is acquired as the stop condition information under auto-stop control in the fifth normal speed mode, and the acquired setting operation interval (i.e., the stop condition information) is used to set the stop condition.

Here, drive control for the brushless motor 3 in the fifth normal speed mode will be described with reference to the flowchart in FIG. 16.

Figure 16:
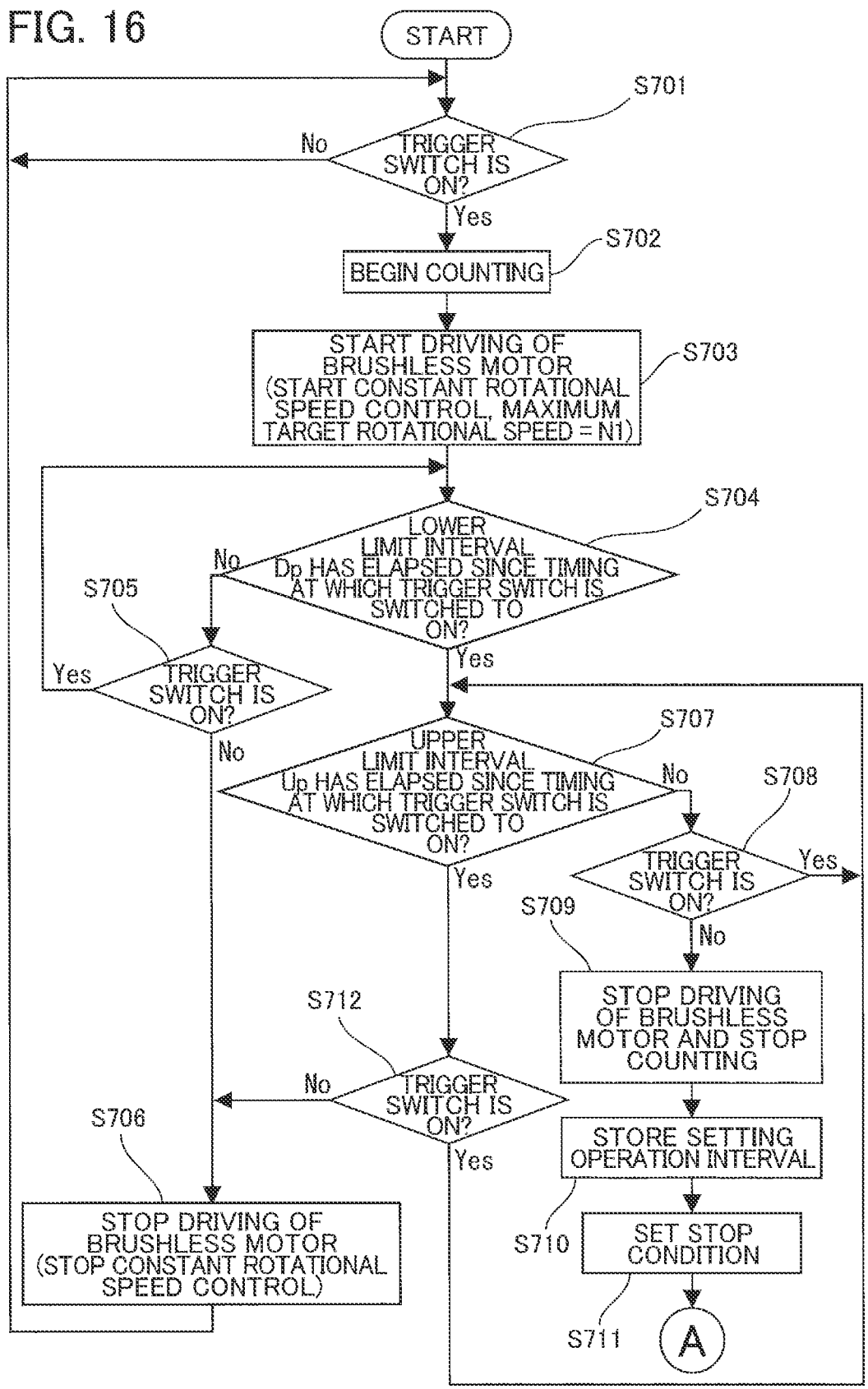
FIG. 16 is a flowchart illustrating drive control of a brushless motor under a fifth normal speed mode in a hammer drill according to a first variation of the first embodiment of the present invention.

When starting drive control in the fifth normal speed mode, the controller 46 in this variation performs the processes in S701-S703 shown in FIG. 16. Since these processes are identical to the processes in S501-S503 for drive control performed by the controller 46 of the hammer drill 1 in the third normal speed mode, a description of these processes has been omitted.

After the controller 46 starts counting a time interval in S703 and begins driving the brushless motor 3 in S703, in S704 the controller 46 determines whether the lower limit interval Dp has elapsed since the timing of the most recent trigger-on operation.

If the controller 46 determines in S704 that the lower limit interval Dp has not elapsed since the timing of the most recent trigger-on operation (S704: NO), in S705 the controller 46 determines whether the trigger switch 23A is in the ON state. If the controller 46 determines in S705 that the trigger switch 23A is in the ON state (S705: YES), the controller 46 returns to S704 and repeats the determination in S704. In other words, the controller 46 continues driving the brushless motor 3 and continues the counting that is started in S702 while repeating the determinations in S704 and S705 until the lower limit interval Dp elapses after the most recent trigger-on operation.

On the other hand, if the controller 46 determines in S705 that the trigger switch 23A is not in the ON state, i.e. when a trigger-off operation has been detected (S705: NO), in S706 the controller 46 ends constant rotational speed control to halt driving of the brushless motor 3, returns to S701, and waits until another trigger-on operation is performed. Here, the operation interval for the trigger-on/off operation from the trigger-on operation detected in S701 to the trigger-off operation detected in S706 is less than the lower limit interval Dp. Accordingly, the trigger-on/off operation does not meet the third setting operation condition and is not a setting operation in the fifth normal speed mode. Therefore, the stop condition is not set based on this trigger-on/off operation.

Returning to the description of S704, if the controller 46 determines in S704 that the lower limit interval Dp has elapsed since the timing of the most recent trigger-on operation (S704: YES), in S707 the controller 46 determines whether the upper limit interval Up has elapsed since the timing of the most recent trigger-on operation.

If the controller 46 determines in S707 that the upper limit interval Up has not elapsed since the timing of the most recent trigger-on operation, in S708 the controller 46 determines whether the trigger switch 23A is in the ON state. If the controller 46 determines in S708 that the trigger switch 23A is in the ON state (S708: YES), the controller 46 returns to S707. In other words, the controller 46 continues driving the brushless motor 3 and continues the count started in S702 while repeating the determinations in S707 and S708 after the lower limit interval Dp has elapsed since the most recent trigger-on operation and until the upper limit interval Up elapses.

However, if the controller 46 determines in S708 that the trigger switch 23A is not in the ON state, i.e., when a trigger-off operation has been detected (S708: NO), in S708 the controller 46 stops driving the brushless motor 3 and stops counting the interval and acquires the count value of the timing unit 46D at the timing that counting is halted.

Here, descriptions will be given for the trigger-on/off operation from the trigger-on operation detected in S701 to the trigger-off operation detected in S708, and the count value of the timing unit 46D at the timing that the count is halted in S709.

The trigger-off operation detected in S708 is performed after the lower limit interval Dp has elapsed since the timing of the most recent trigger-on operation and prior to the upper limit interval Up elapsing. Accordingly, the operation interval of the trigger-on/off operation from the trigger-on operation detected in S701 to the trigger-off operation detected in S708 is greater than or equal to the lower limit interval Dp and less than the upper limit interval Up. Hence, this trigger-on/off operation satisfies the third setting operation condition and is a setting operation in the fifth normal speed mode.

Further, the interval specified by the count value of the timing unit 46D at the timing that counting is stopped in S709 is the operation interval of the trigger-on/off operation from the trigger-on operation detected in S701 to the trigger-off operation detected in S708, i.e., the interval from the trigger-on operation to the trigger-off operation of the setting operation. Accordingly, the interval specified by the count value is the setting operation interval in the fifth normal speed mode. In other words, the controller 46 acquires the setting operation interval (i.e., information specifying the setting operation interval) in S709 as the stop condition information based on the setting operation from the trigger-on operation detected in S701 to the trigger-off operation detected in S708.

After acquiring the setting operation interval in S709, in S710 the controller 46 stores the acquired setting operation interval in the third storage unit 46C as the stop condition information.

After storing the setting operation interval in the third storage unit 46C in S710, in S711 the controller 46 sets the stop condition. The stop condition is set using the setting operation interval stored in the third storage unit 46C as the stop condition information. Specifically, this stop condition is set to "the setting operation interval elapses from the timing at which the trigger-on operation is performed."

The process performed after the stop condition is set in S711 is identical to the process in S509-S514 under drive control in the third normal speed mode.

Returning to the description in S707, if the controller 46 determines in S707 that the upper limit interval Up has elapsed since the timing of the most recent trigger-on operation (S707: YES), in S712 the controller 46 determines whether the trigger switch 23A is in the ON state. If the controller 46 determines in S712 that the trigger switch 23A is in the ON state (S712: YES), the controller 46 repeats the determination in S707. In other words, the controller 46 continues driving the brushless motor 3 and continues the count started in S702 while repeatedly performing the determinations in S707 and S712 after the upper limit interval Up has elapsed since the timing at which the most recent trigger-on operation is performed.

However, if the controller 46 determines in S712 that the trigger switch 23A is not in the ON state, i.e., when a trigger-off operation has been detected (S712: NO), in S706 the controller 46 halts driving of the brushless motor 3, returns to S701, and waits until another trigger-on operation is performed. Here, the operation interval of the trigger-on/off operation from the trigger-on operation detected in S701 to the trigger-off operation detected in S712 is greater than or equal to the upper limit interval Up. Accordingly, this trigger-on/off operation does not satisfy the third setting operation condition and is not a setting operation in the fifth normal speed mode. Hence, a stop condition is not set based on this trigger-on/off operation.

If the control mode is changed from the fifth normal speed mode to another mode, the controller 46 according to the first variation ends drive control for the brushless motor 3 in the fifth normal speed mode, deletes the setting operation interval stored in the third storage unit 46C as the stop condition information, and restores the stop condition to an unset state.

Under drive control in the fifth normal speed mode according to the first variation described above, the drilling operation performed by the hammer drill 1 during the setting operation is replicated through trigger-on operations executed after the setting operation. Accordingly, in operations for forming a plurality of drill holes, the depth of the plurality of drill holes can be made substantially uniform in the fifth normal speed mode.

Further, when the operation interval of a trigger-on/off operation under drive control in the fifth normal speed mode is less than the lower limit interval Dp or greater than or equal to the upper limit interval Up, the trigger-on/off operation is not treated as a setting operation, and a stop condition is not set based on this trigger-on/off operation. This ensures that only a properly performed drilling operation is reproduced and can therefore improve usability.

Specifically, when the operation interval of a trigger-on/off operation is less than the lower limit interval Dp, it is possible that the user has performed a trigger-on operation to drive the brushless motor 3 in a trigger-on/off operation, but subsequently has discontinued the drilling operation before completion for some reason. Further, if the operation interval of a trigger-on/off operation is greater than or equal to the upper limit interval Up, it is likely that the user has delayed starting the drilling operation for some reason after driving the brushless motor 3 with the trigger-on operation of the trigger-on/off operation. On the other hand, when the operation interval of a trigger-on/off operation is greater than or equal to the lower limit interval Dp and less than the upper limit interval Up, i.e., when the trigger-on/off operation satisfies the third setting operation condition, it is possible that the user has performed the drilling operation properly. In view of the foregoing, only a trigger-on/off operation that satisfies the third setting operation condition in which the drilling operation is likely to have been performed properly is treated as a setting operation under drive control in the fifth normal speed mode, and a stop condition is set based on this setting operation. This ensures that only a properly performed drilling operation is reproduced and can therefore further improve usability.

Next, a hammer drill according to a second variation of the first embodiment of the present invention will be described. The hammer drill according to the second variation can execute drive control for the brushless motor 3 in a sixth normal speed mode in place of the third normal speed mode used on the hammer drill 1. The hammer drill according to the second variation differs from the hammer drill 1 only in that the hammer drill according to the second variation can execute drive control under the sixth normal speed mode instead of the third normal speed mode and is identical to the hammer drill 1 in its basic structure and all other aspects of control. Further, structures and control for the hammer drill according to the second variation that are identical to those of the hammer drill 1 obtain the same effects as those obtained by the hammer drill 1.

The sixth normal speed mode is a mode for executing auto-stop control while driving the brushless motor 3 under constant rotational speed control. The maximum target rotational speed under constant rotational speed control executed in the sixth normal speed mode is the rotational speed N1. The sixth normal speed mode is an example of the "first mode" in the present invention.

Under auto-stop control executed in the sixth normal speed mode, only a trigger-on/off operation that satisfies a fourth setting operation condition is treated as a setting operation, and a stop condition is set in response to a setting operation being performed.

The fourth setting operation condition is satisfied when the operation amount of the trigger switch 23A during the operation interval of a trigger-on/off operation performed in the sixth normal speed mode becomes greater than or equal to an operation amount threshold L3. In other words, a trigger-on/off operation is not treated as a setting operation when the operation amount of the trigger switch 23A during the operation interval of the trigger-on/off operation does not reach the operation amount threshold L3. The operation amount threshold L3 is smaller than the maximum operation amount described above, i.e., the prescribed amount L1, and larger than the prescribed amount L2. Note that a trigger-on/off operation is not considered a setting operation when the stop condition has already been set, even if the trigger-on/off operation satisfies the fourth setting operation condition.

Further, under auto-stop control in the sixth normal speed mode, the interval from the moment that the operation amount of the trigger switch 23A becomes greater than or equal to the operation amount threshold L3 in a setting operation until a trigger-off operation is performed in the setting operation (hereinafter called the "second setting operation interval") is acquired as stop condition information, and a stop condition is set using the acquired second setting operation interval (i.e., the stop condition information). The stop condition is set to "the second setting operation interval elapses from the timing at which the operation amount of the trigger switch 23A becomes greater than or equal to the operation amount threshold L3."

Here, drive control for the brushless motor 3 in the sixth normal speed mode will be described with reference to the flowcharts in FIGS. 17-20.

Figure 17:
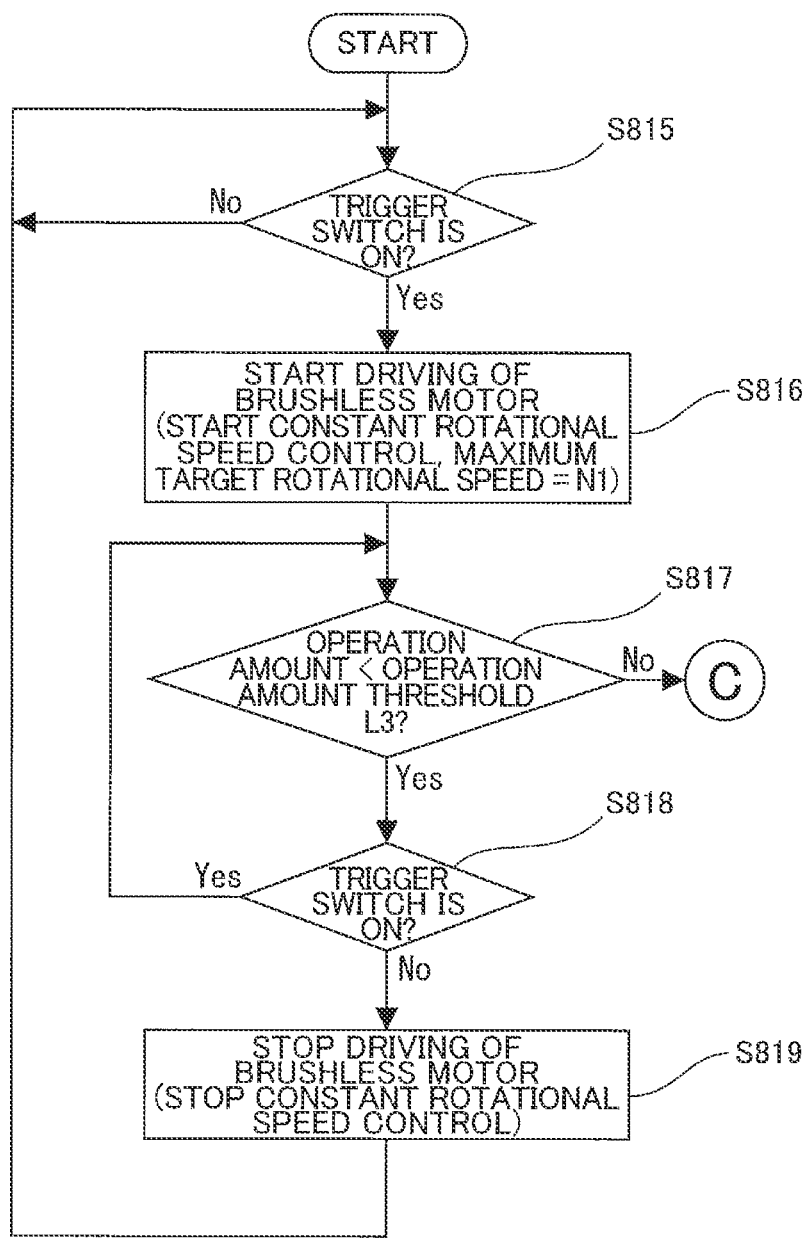
FIG. 17 is part of a flowchart illustrating drive control of a brushless motor under a sixth normal speed mode in a hammer drill according to a second variation of the first embodiment of the present invention.
Figure 18:
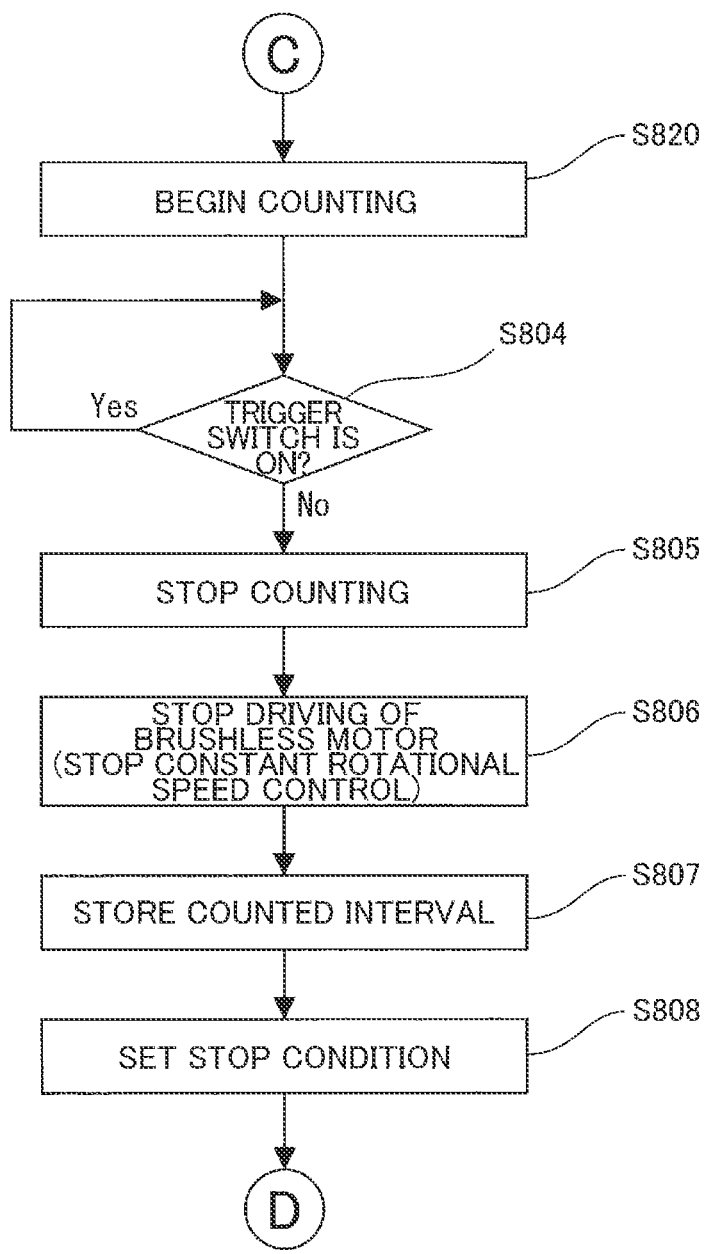
FIG. 18 is another part of the flowchart illustrating drive control of the brushless motor under the sixth normal speed mode in the hammer drill according to the second variation of the first embodiment of the present invention.

As illustrated in FIG. 17, after starting drive control in the sixth normal speed mode, in S815 the controller 46 of this variation determines whether the trigger switch 23A is in the ON state. The process performed when the controller 46 determines in S815 that the trigger switch 23A is not in the ON state (S815: NO) is identical to the process performed when the controller 46 determines in S301 that the trigger switch 23A is not in the ON state. Therefore, a description of this process has been omitted.

When the controller 46 determines in S815 that the trigger switch 23A is in the ON state, i.e., when a trigger-on operation has been detected (S815: YES), in S816 the controller 46 starts constant rotational speed control and begins driving the brushless motor 3.

After beginning to drive the brushless motor 3 in S816, in S817 the controller 46 determines whether the operation amount of the trigger switch 23A is less than the operation amount threshold L3. If the controller 46 determines in S817 that the operation amount of the trigger switch 23A is less than the operation amount threshold L3 (S817: YES), in S818 the controller 46 determines whether the trigger switch 23A is in the ON state.

If the controller 46 determines in S818 that the trigger switch 23A is in the ON state (S818: YES), the controller 46 repeats the determination in S817. In other words, after starting to drive the brushless motor 3 in S816, the controller 46 continues driving the brushless motor 3 while repeating the determinations in S817 and S818 as long as the trigger switch 23A is in the ON state and the operation amount of the trigger switch 23A is less than the operation amount threshold L3.

However, if the controller 46 determines in S818 that the trigger switch 23A is not in the ON state, i.e., when a trigger-off operation has been detected (S818: NO), in S819 the controller 46 ends constant rotational speed control to halt driving of the brushless motor 3, returns to S815, and waits until another trigger-on operation is performed. Note that the trigger-off operation detected in S818 is performed before the operation amount of the trigger switch 23A becomes greater than or equal to the operation amount threshold L3. In other words, the operation amount of the trigger switch 23A does not reach the operation amount threshold L3 during the operation interval of the trigger-on/off operation from the trigger-on operation detected in S815 to the trigger-off operation detected in S818. Accordingly, this trigger-on/off operation does not satisfy the fourth setting operation condition and is not a setting operation in the sixth normal speed mode. Therefore, a stop condition is not set based on this trigger-on/off operation.

If the controller 46 determines in S817 that the operation amount of the trigger switch 23A is not less than the operation amount threshold L3 (is greater than or equal to the operation amount threshold L3; S817: NO), in S820 of FIG. 18 the controller 46 begins counting a time interval in order to measure the amount of elapsed time from the timing at which the operation amount of the trigger switch 23A becomes greater than or equal to the operation amount threshold L3. In other words, after driving of the brushless motor 3 is started, the controller 46 begins counting when the operation amount of the trigger switch 23A becomes greater than or equal to the operation amount threshold L3 while a trigger-off operation has not been performed. Here, the timing at which the operation amount of the trigger switch 23A becomes greater than or equal to the operation amount threshold L3 is the timing that the fourth setting operation condition is met.

After beginning to count the interval in S820, in S804 the controller 46 determines whether the trigger switch 23A is in the ON state. If the controller 46 determines in S804 that the trigger switch 23A is in the ON state (S804: YES), the controller 46 returns to S804. That is, after the trigger switch 23A has reached the operation amount threshold L3, the controller 46 continues driving the brushless motor 3 under constant rotational speed control and continues the count initiated in S820 while repeating the determination in S804 until a trigger-off operation is performed.

If the controller 46 determines in S804 that the trigger switch 23A is not in the ON state, i.e., when a trigger-off operation has been detected (S804: NO), in S805 the controller 46 stops counting the time interval and acquires the count value of the timing unit 46D at the moment that counting is halted.

Here, descriptions will be given for the trigger-on/off operation from the trigger-on operation detected in S815 to the trigger-off operation detected in S804, and the count value of the timing unit 46D at the moment that counting is halted in S805.

The trigger-off operation detected in S804 is performed after the operation amount of the trigger switch 23A becomes greater than or equal to the operation amount threshold L3. In other words, the operation amount of the trigger switch 23A reaches an amount greater than or equal to the operation amount threshold L3 during the operation interval of the trigger-on/off operation from the trigger-on operation detected in S815 to the trigger-off operation detected in S804. Accordingly, this trigger-on/off operation satisfies the fourth setting operation condition and is a setting operation in the sixth normal speed mode.

Further, the interval specified by the count value of the timing unit 46D at the timing that counting is halted in S805 is the interval from the moment that the operation amount of the trigger switch 23A reaches the operation amount threshold L3 in the setting operation to the trigger-off operation of the setting operation detected in S804. Hence, the interval specified by this count value is the second setting operation interval in the sixth normal speed mode. In other words, the controller 46 acquires the second setting operation interval (i.e., information specifying this setting operation interval) in S805 as the stop condition information based on the setting operation from the trigger-on operation detected in S815 to the trigger-off operation detected in S804.

Further, at the same time that the count is stopped in S805, in S806 the controller 46 ends constant rotational speed control to stop driving the brushless motor 3. For convenience of description, the process in S805 and the process in S806 are indicated separately in FIG. 18, but the processes in S805 and S806 are performed simultaneously as described above.

After halting driving of the brushless motor 3 in S806, in S807 the controller 46 stores the second setting operation interval acquired in S805 in the third storage unit 46C as stop condition information.

After storing the second setting operation interval in the third storage unit 46C in S807, in S808 the controller 46 sets a stop condition. The stop condition is set using the second setting operation interval stored in the third storage unit 46C as the stop condition information. Specifically, the stop condition is set to "the second setting operation interval elapses from the timing at which the operation amount of the trigger switch 23A becomes greater than or equal to the operation amount threshold L3."

Figure 19:
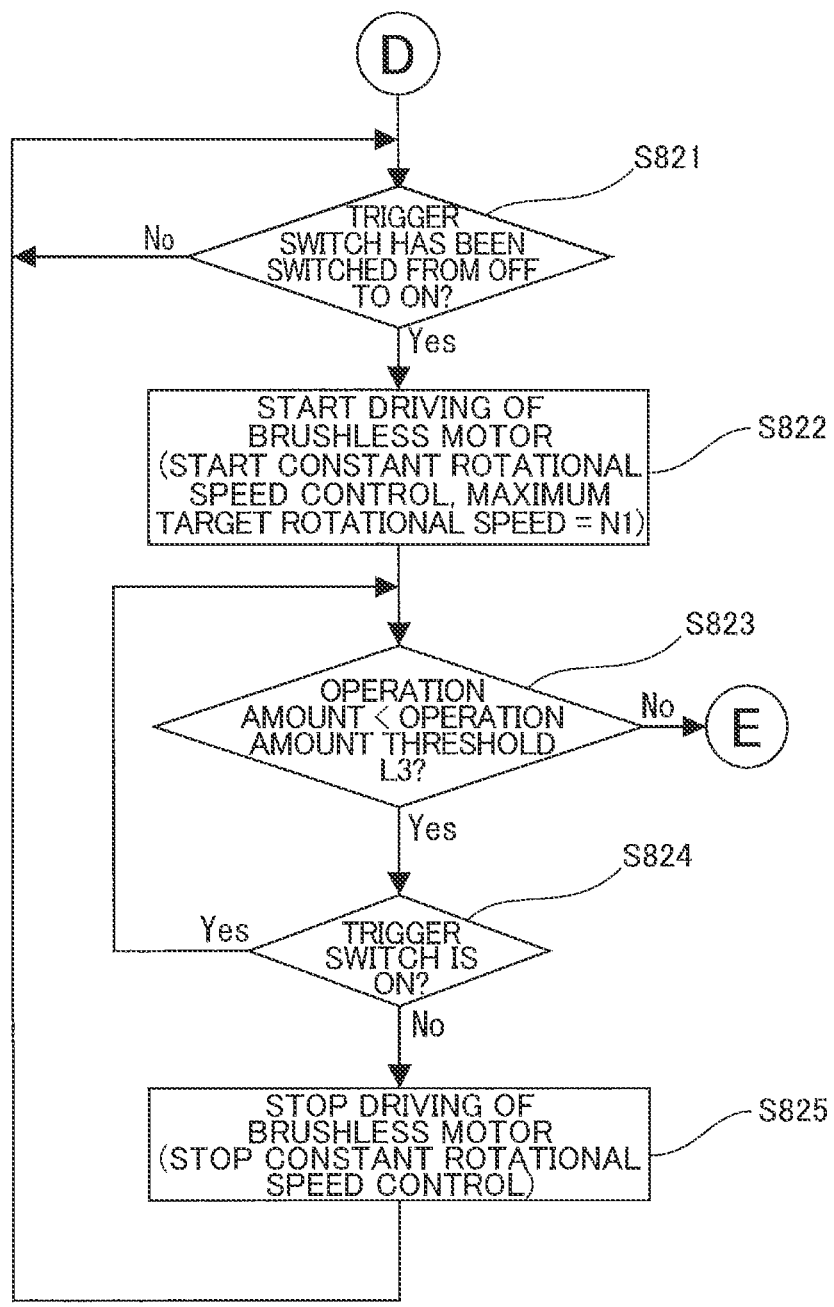
FIG. 19 is still another part of the flowchart illustrating drive control of the brushless motor under the sixth normal speed mode in the hammer drill according to the second variation of the first embodiment of the present invention.
Figure 20:
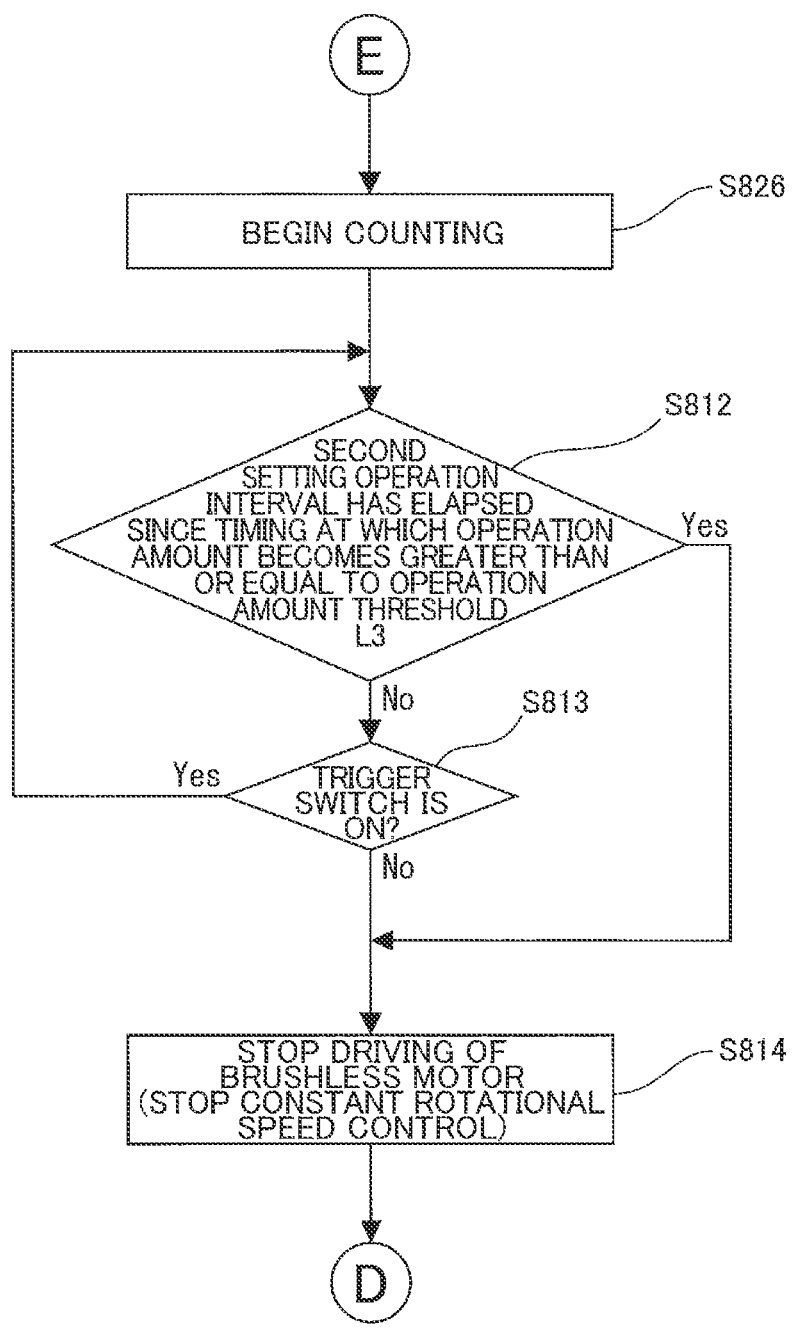
FIG. 20 is the other part of the flowchart illustrating drive control of the brushless motor under the sixth normal speed mode in the hammer drill according to the second variation of the first embodiment of the present invention.

As illustrated in FIG. 19, after setting the stop condition in S808, in S821 the controller 46 determines whether a trigger-on operation has been performed. If the controller 46 determines in S821 that a trigger-on operation has been performed (S821: YES), the controller 46 performs the processes in S822-S825. However, since these processes are identical to the processes in S816-S819, a description of these processes has been omitted.

If the controller 46 determines in S823 that the operation amount of the trigger switch 23A is not less than the operation amount threshold L3 (is greater than or equal to the operation amount threshold L3; S823: NO), in S826 of FIG. 20 the controller 46 begins counting a time interval in order to measure the time that elapses from the moment that the operation amount of the trigger switch 23A becomes greater than or equal to the operation amount threshold L3. In other words, even while driving the brushless motor 3 according to a trigger-on operation performed after the stop condition has been set, the controller 46 begins counting when the operation amount of the trigger switch 23A has become greater than or equal to the operation amount threshold L3.

After counting is started in S826, in S812 the controller 46 determines whether the second setting operation interval has elapsed since the timing at which the operation amount of the trigger switch 23A after the most recent trigger-on operation is performed becomes greater than or equal to the operation amount threshold L3 (i.e., from the timing when counting is started in S826). In other words, the controller 46 determines in S812 whether the stop condition set in S808 has been satisfied.

If the controller 46 determines in S812 that the second setting operation interval has not elapsed since the timing at which the operation amount of the trigger switch 23A following the most recent trigger-on operation becomes greater than or equal to the operation amount threshold L3 (i.e., from the moment the count is started in S826), i.e., if the controller 46 determines in S812 that the stop condition has not been satisfied (S812: NO), in S813 the controller 46 determines whether the trigger switch 23A is in the ON state.

If the controller 46 determines in S813 that the trigger switch 23A is in the ON state (S813: YES), the controller 46 returns to S812. Hence, the controller 46 continues to drive the brushless motor 3 under constant rotational speed control while repeating the determinations in S812 and S813 until the second setting operation interval elapses after the moment that the operation amount of the trigger switch 23A following the most recent trigger-on operation has become greater than or equal to the operation amount threshold L3 (i.e., until the stop condition is satisfied) or until a trigger-off operation has been performed.

If the controller 46 determines in S812 that the second setting operation interval has elapsed after the timing at which the operation amount of the trigger switch 23A following the most recent trigger-on operation becomes greater than or equal to the operation amount threshold L3, i.e., if the stop condition set in S808 has been met (S812: YES), in S814 the controller 46 ends constant rotational speed control to halt driving of the brushless motor 3, despite the trigger switch 23A being in the ON state (i.e., even though a trigger-off operation has not been performed).

Further, if the controller 46 determines in S813 that the trigger switch 23A is not in the ON state, i.e., if the controller 46 determines in S813 that a trigger-off operation has been performed (S813: NO), in S814 the controller 46 halts driving of the brushless motor 3 even though the second setting operation interval has not elapsed since the timing at which the operation amount of the trigger switch 23A following the most recent trigger-on operation becomes greater than or equal to the operation amount threshold L3.

After halting driving of the brushless motor 3 in S814, the controller 46 returns to S821 and waits until another trigger-on operation is performed. Note that if the control mode is modified from the sixth normal speed mode to another mode, the controller 46 according to the second variation ends drive control for the brushless motor 3 in the sixth normal speed mode, deletes the second setting operation interval stored in the third storage unit 46C as the stop condition information, and restores the stop condition to an unset state.

Under drive control in the sixth normal speed mode according to the second variation described above, the drilling operation performed with the hammer drill 1 during a setting operation is reproduced by trigger-on operations following the setting operation. Therefore, when performing operations to form a plurality of drill holes in the sixth normal speed mode, the depth of the plurality of drill holes can be made substantially uniform.

Further, under drive control in the sixth normal speed mode, if the trigger-off operation in a trigger-on/off operation is performed prior to the operation amount of the trigger switch 23A becoming greater than or equal to the operation amount threshold L3 in the same trigger-on/off operation, the trigger-on/off operation is not treated as a setting operation, and a stop condition is not set based on this trigger-on/off operation. This ensures that only a properly performed drilling operation is reproduced and can therefore improve usability.

Specifically, when the trigger-off operation of a trigger-on/off operation is performed prior to the operation amount of the trigger switch 23A becoming greater than or equal to the operation amount threshold L3 in the same trigger-on/off operation, it is possible that the user has discontinued the drilling operation for some reason in the midst of aligning the end bit E with a work position (the location at which the drill hole is to be formed) while only half-depressing the trigger switch 23A. In view of the foregoing, only a trigger-on/off operation that satisfies the fourth setting operation condition in which the drilling operation has likely been performed properly is treated as a setting operation under drive control in the sixth normal speed mode, and a stop condition is set based on this setting operation. This ensures that only a properly performed drilling operation is reproduced and can therefore further improve usability.

Further, under drive control in the sixth normal speed mode, the stop condition is set using the interval from the moment that the operation amount of the trigger switch 23A in the setting operation becomes greater than or equal to the operation amount threshold L3 until a trigger-off operation is performed in the setting operation (i.e., the second setting operation interval) as the stop condition information, and the stop condition is set to "the second setting operation interval elapses from the timing at which the operation amount of the trigger switch 23A becomes greater than or equal to the operation amount threshold L3." This method enables the actual drilling interval during a drilling operation performed for the setting operation to be reproduced faithfully, thereby further improving usability.

Specifically, the actual operating conditions corresponding to the timing in the setting operation at which the operation amount of the trigger switch 23A has become greater than or equal to the operation amount threshold L3 is likely the timing at which the user completes the process of aligning the end bit E with the work position and increases the operation amount of the trigger switch 23A from the semi-depressed state to begin drilling the work position. Therefore, the second setting operation interval, i.e., the interval in the setting operation from the timing at which the operation amount of the trigger switch 23A becomes greater than or equal to the operation amount threshold L3 to the trigger-off operation is likely the actual drilling interval within a drilling operation performed for the setting operation.

In view of the foregoing, the second setting operation interval is used for the stop condition under drive control in the sixth normal speed mode since the second setting operation interval is likely the actual drilling interval within the operating interval of the trigger-on/off operation performed by the user. This method can faithfully reproduce the actual drilling interval in the drilling operation performed for the setting operation, thereby further improving usability. While the operation amount threshold L3 in this variation is 6 mm, the operation amount threshold L3 is not limited to this value, but may be a value corresponding to the actual operation amount at which the user likely begins drilling with the end bit E. Further, the value of the operation amount threshold L3 is preferably set through investigations of the user's usage of the hammer drill, experimentation, and the like.

Next, a hammer drill according to a third variation of the first embodiment of the present invention will be described. The hammer drill according to the third variation can execute drive control for the brushless motor 3 in a seventh normal speed mode in place of the third normal speed mode used on the hammer drill 1. The hammer drill according to the second variation differs from the hammer drill 1 only in that the hammer drill according to the third variation can execute drive control in the seventh normal speed mode in place of the third normal speed mode and is identical to the hammer drill 1 in its basic structure and all other aspects of control. Further, structures and control for the hammer drill according to the third variation that are identical to those of the hammer drill 1 obtain the same effects as those obtained by the hammer drill 1.

The seventh normal speed mode is a mode for executing auto-stop control while driving the brushless motor 3 under constant rotational speed control. The maximum target rotational speed in constant rotational speed control executed in the seventh normal speed mode is the rotational speed N1. The seventh normal speed mode is an example of the "first mode" in the present invention.

Under auto-stop control executed in the seventh normal speed mode, as in the third normal speed mode, only a trigger-on/off operation that satisfies the first setting operation condition is treated as a setting operation, and a stop condition is set in response to a setting operation being performed.

Further, under auto-stop control executed in the seventh normal speed mode, drive information related to driving of the brushless motor 3 during the interval from the trigger-on operation to the trigger-off operation in the setting operation is acquired as stop condition information, and a stop condition is set using this acquired drive information.

More specifically, in the seventh normal speed mode the rotation amount of the brushless motor 3 (the number of rotations) serves as drive information related to driving of the brushless motor 3 and is acquired as the stop condition information. The stop condition is set using the acquired rotation amount (i.e., the stop condition information). Hereinafter, the rotation amount during the interval from the trigger-on operation to the trigger-off operation in the setting operation will be called the "setting rotation amount."

Here, drive control for the brushless motor 3 in the seventh normal speed mode will be described with reference to the flowcharts in FIGS. 21 and 22. Processes identical to those in the third normal speed mode performed by the hammer drill 1 are given the same step numbers, and a description of these processes will be omitted. Only processes that differ from those in the third normal speed mode will be described.

Figure 21:
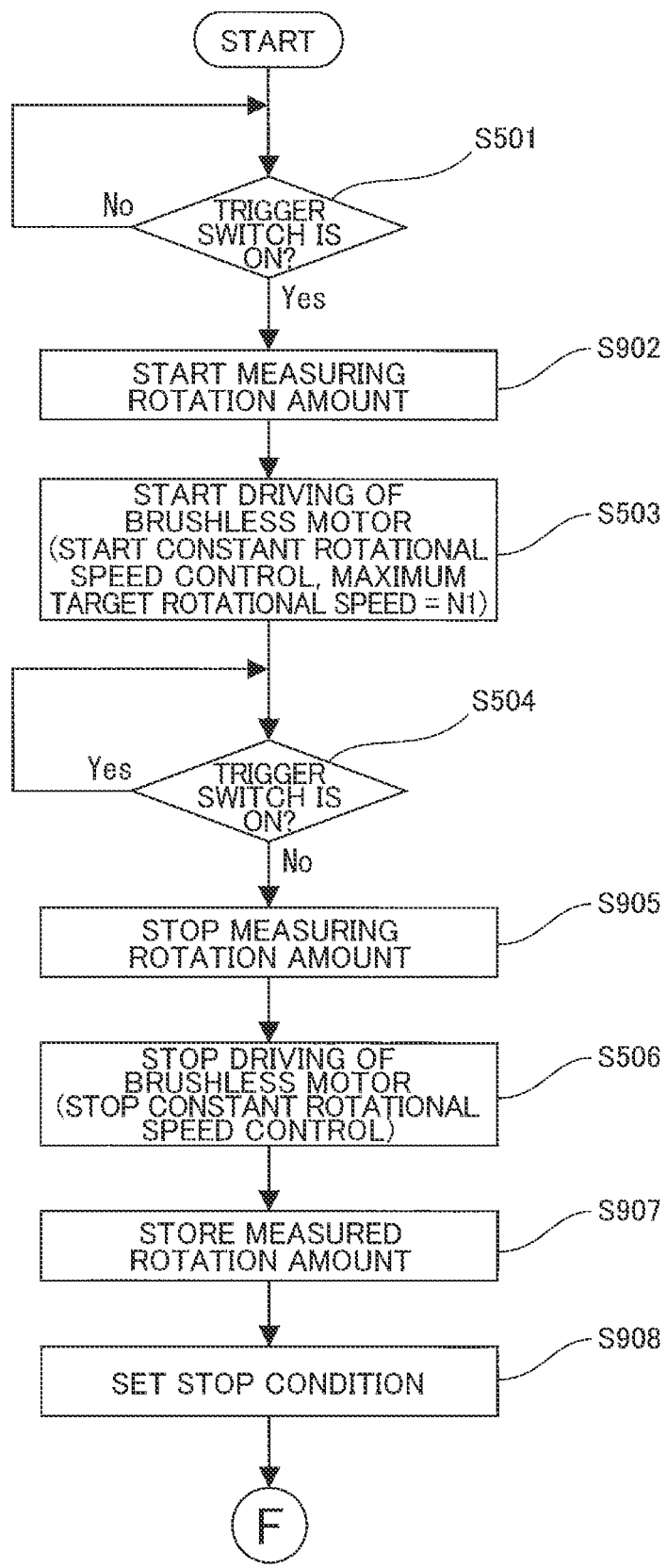
FIG. 21 is part of a flowchart illustrating drive control of a brushless motor under a seventh normal speed mode in a hammer drill according to a third variation of the first embodiment of the present invention.
Figure 22:
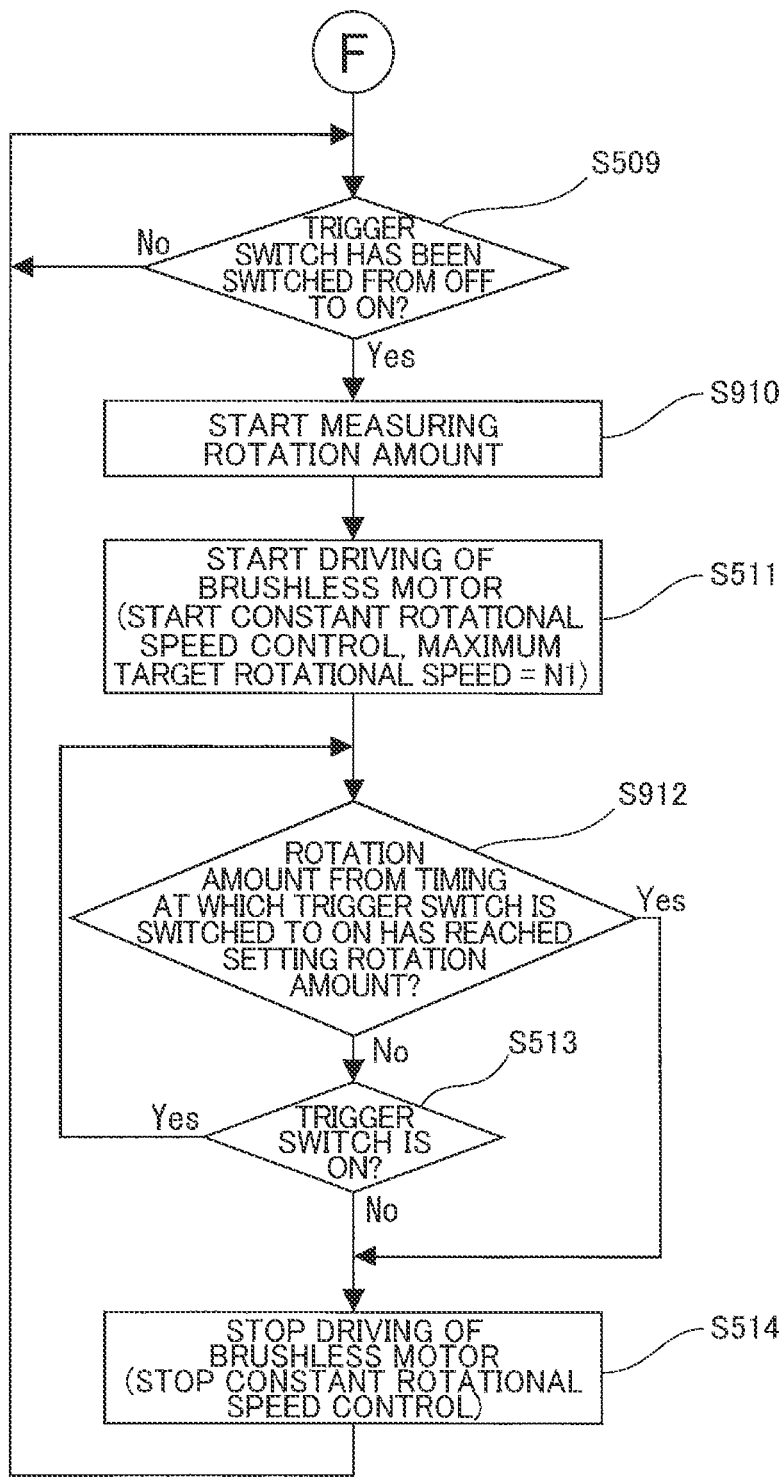
FIG. 22 is the other part of the flowchart illustrating drive control of the brushless motor under the seventh normal speed mode in the hammer drill according to the third variation of the first embodiment of the present invention.
Figure 23:
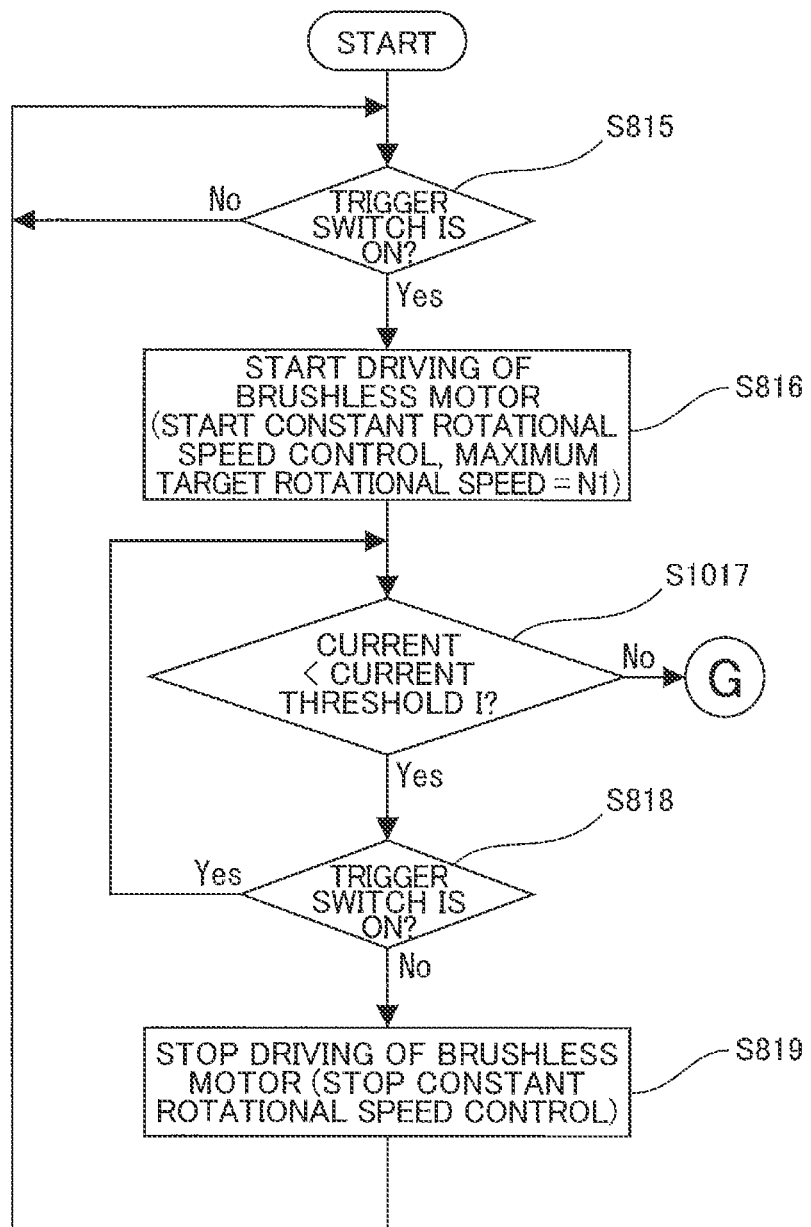
FIG. 23 is part of a flowchart illustrating drive control of a brushless motor under an eighth normal speed mode in a hammer drill according to a fourth variation of the first embodiment of the present invention.
Figure 24:
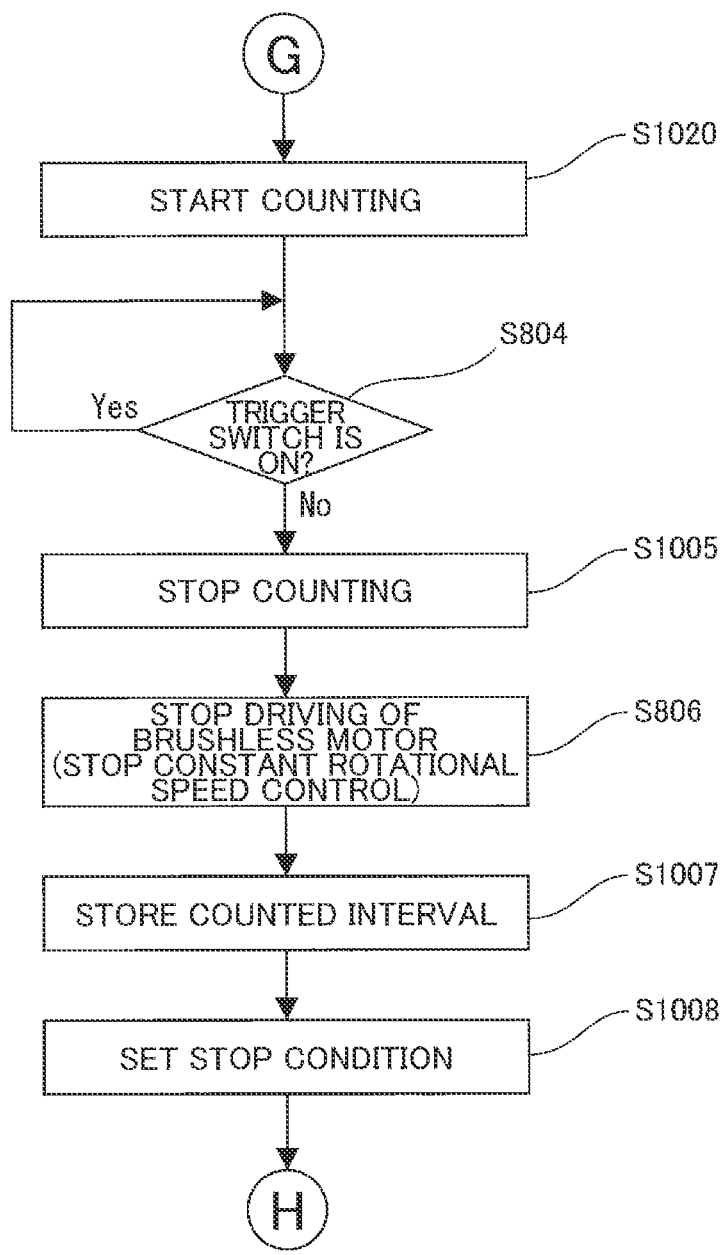
FIG. 24 is another part of the flowchart illustrating drive control of the brushless motor under the eighth normal speed mode in the hammer drill according to the fourth variation of the first embodiment of the present invention.
Figure 25:
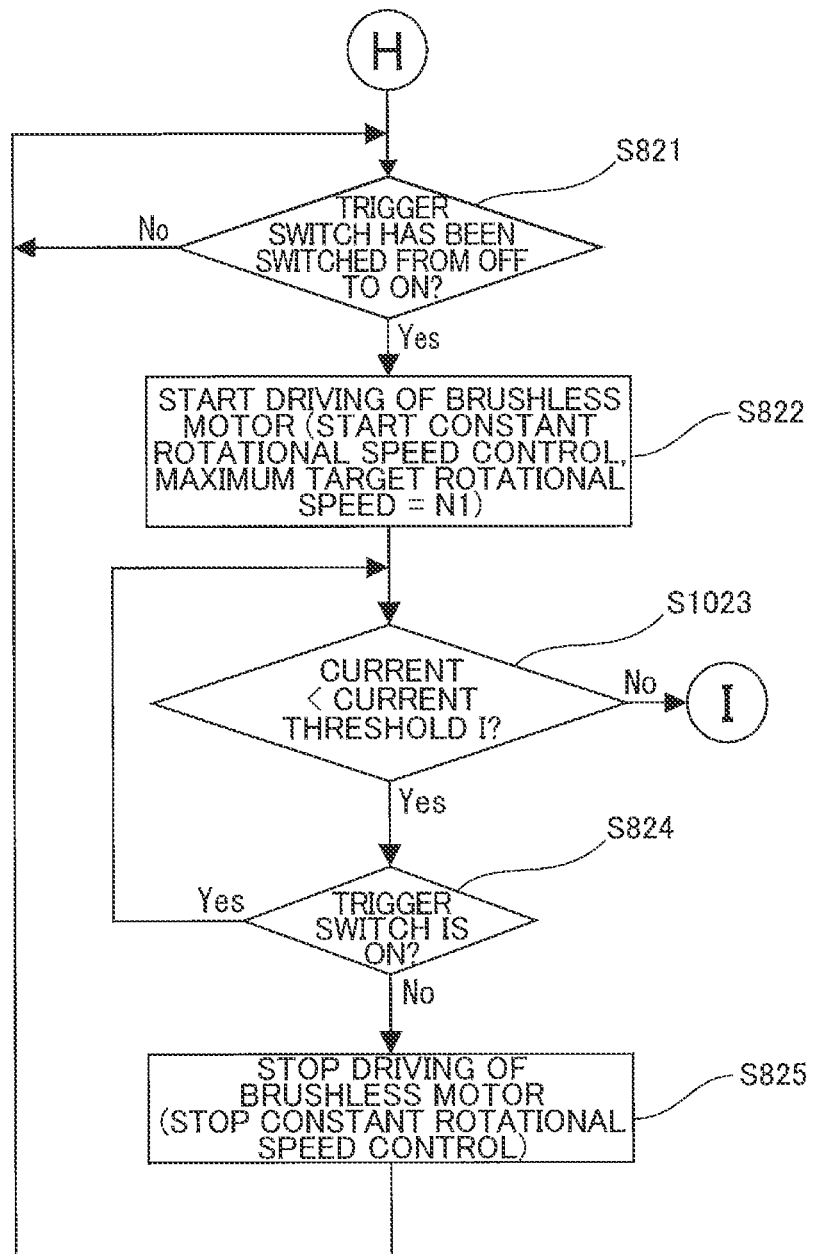
FIG. 25 is still another part of the flowchart illustrating drive control of the brushless motor under the eighth normal speed mode in the hammer drill according to the fourth variation of the first embodiment of the present invention.
Figure 26:
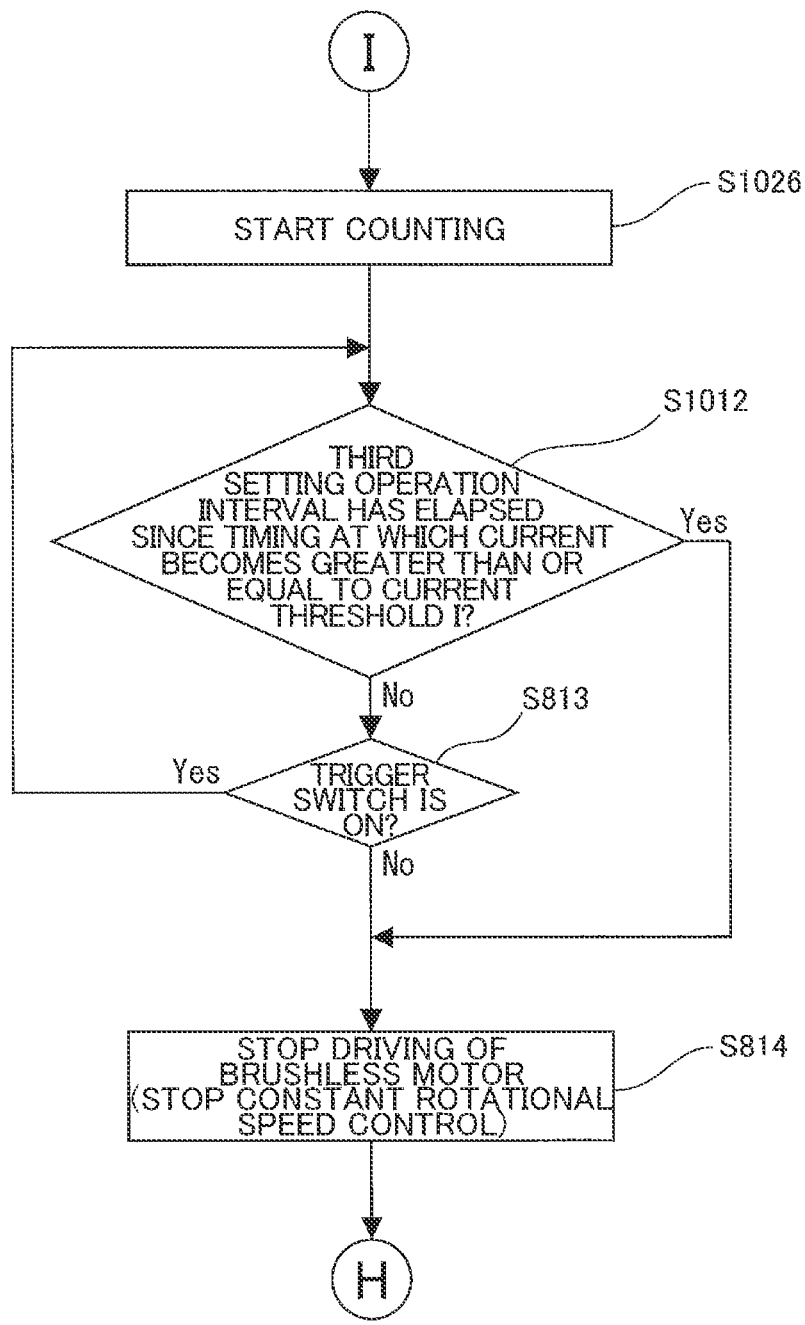
FIG. 26 is the other part of the flowchart illustrating drive control of the brushless motor under the eighth normal speed mode in the hammer drill according to the fourth variation of the first embodiment of the present invention.

As indicated in FIGS. 21 and 22, steps S902, S905, S907, S908, S910, and S912 are executed in the seventh normal speed mode on the hammer drill according to this variation in place of steps S502, S505, S507, S508, S510, and S512 in the third normal speed mode.

In S902 the controller 46 in the hammer drill according to this variation begins measuring the rotation amount of the brushless motor 3 from the moment that the trigger-on operation is detected in S501. The controller 46 measures the rotation amount of the brushless motor 3 based on the rotated position signals outputted from the Hall IC signal detecting circuit 44.

In S905 the controller 46 stops measuring of the rotation amount that is initiated in S902 and acquires the rotation amount at the time that measuring is halted as stop condition information. The rotation amount at the timing that measuring is halted is the setting rotation amount.

In S907 the controller 46 stores the setting rotation amount (the counted rotation amount) acquired in S905 in the third storage unit 46C and subsequently sets the stop condition in S908. The stop condition is set using the setting rotation amount stored in the third storage unit 46C as the stop condition information. Specifically, the stop condition is set to "the rotation amount of the brushless motor 3 from the timing of the trigger-on operation is performed reaches the setting rotation amount."

In S910 the controller 46 begins measuring the rotation amount of the brushless motor 3 in order to measure the rotation amount from the moment that the most recent trigger-on operation is performed.

In S912 the controller 46 determines whether the rotation amount of the brushless motor 3 from the timing of the most recent trigger-on operation has reached the setting rotation amount, i.e., whether the stop condition set in S908 has been satisfied. The controller 46 performs this determination by comparing the measurement results for the rotation amount at the timing that step S912 is executed with the setting rotation amount stored in the third storage unit 46C.

Thus, under drive control according to the seventh normal speed mode, the rotation amount of the brushless motor 3 whose drive is started by the setting operation (the first trigger-on/off operation) is reproduced in driving of the brushless motor 3 according to second and subsequent trigger-on/off operations. In other words, under drive control in the seventh normal speed mode, a drilling operation performed for the setting operation is reproduced by trigger-on/off operations following the setting operation. This method enables the depth of the plurality of drill holes to be made uniform, thereby improving usability. Under auto-stop control executed in the seventh normal speed mode, the rotation amount of the brushless motor 3 is used as drive information related to driving of the brushless motor 3. However, the information used as drive information in the auto-stop control is not limited to the rotation amount of the brushless motor 3, provided that the information can be acquired based on the setting operation (the drive interval of the brushless motor 3 or the power consumed by the brushless motor 3, for example).

Thus, the setting operation in the seventh normal speed mode is the first trigger-on/off operation in the seventh normal speed mode. Further, in the process to acquire stop condition information based on a setting operation, the controller 46 of the hammer drill according to the fourth variation of the embodiment acquires drive information related to driving of the brushless motor 3 (the rotation amount) in the interval from the trigger-on operation to the trigger-off operation of the setting operation as the stop condition information, and sets the stop condition using the acquired drive information.

According to this configuration, since the stop condition is set using drive information (the rotation amount), a drilling operation performed for the setting operation can be replicated more accurately than when using a distance sensor and the like.

Next, a hammer drill according to a fourth variation of the present embodiment will be described. The hammer drill according to the fourth variation can execute drive control for the brushless motor 3 in an eighth normal speed mode in place of the third normal speed mode used on the hammer drill 1. The hammer drill according to the fourth variation differs from the hammer drill 1 only in that the hammer drill according to the fourth variation can execute drive control in the eighth normal speed mode instead of the third normal speed mode and is identical to the hammer drill 1 in its basic structure and all other aspects of control. Further, structures and control for the hammer drill according to the fourth variation that are identical to those for the hammer drill 1 obtain the same effects as those obtained by the hammer drill 1.

The eighth normal speed mode is a mode for executing auto-stop control while driving the brushless motor 3 under constant rotational speed control. The maximum target rotational speed in constant rotational speed control executed in the eighth normal speed mode is the rotational speed N1. The eighth normal speed mode is an example of the "first mode" in the present invention.

Under auto-stop control executed in the eighth normal speed mode, only a trigger-on/off operation that satisfies a fifth setting operation condition is treated as a setting operation, and a stop condition is set in response to a setting operation being performed.

The fifth setting operation condition is satisfied when electric current flowing to the brushless motor 3 becomes greater than or equal to an electric current threshold I during the operation interval of a trigger-on/off operation performed in the eighth normal speed mode. In other words, a trigger-on/off operation is not treated as a setting operation when the electric current flowing to the brushless motor 3 does not reach the electric current threshold I during the operation interval of the trigger-on/off operation. Note that a trigger-on/off operation is not treated as a setting operation when a stop condition has already been set, even if the trigger-on/off operation satisfies the fifth setting operation condition.

Further, under auto-stop control in the eighth normal speed mode, the interval from the timing that electric current flowing to the brushless motor 3 in the setting operation becomes greater than or equal to the electric current threshold I to the timing that the trigger-off operation in the setting operation is performed (hereinafter called the "third setting operation interval") is acquired as stop condition information, and a stop condition is set using the acquired third setting operation interval (i.e., the stop condition information). The stop condition is set to "the third setting operation interval elapses from the timing at which electric current flowing to the brushless motor 3 becomes greater than or equal to the electric current threshold I."

Here, drive control for the brushless motor 3 in the eighth normal speed mode will be described with reference to the flowcharts in FIGS. 23-26. Steps identical to those in the sixth normal speed mode performed on the hammer drill according to the second variation of the first embodiment are designated with the same step numbers, and a description of these steps will be omitted. Only differing steps will be described.

As indicated in FIGS. 23-26, steps S1017, S1020, S1005, S1007, S1008, S1023, S1026, and S1012 are executed in the eighth normal speed mode on the hammer drill according to this variation in place of steps S817, S820, S805, S807, S808, S823, S826, and S812 in the sixth normal speed mode.

In S1017 the controller 46 in the hammer drill according to this variation determines whether the electric current flowing to the brushless motor 3 is less than the electric current threshold I. If the controller 46 determines in S1017 that the electric current flowing to the brushless motor 3 is less than the electric current threshold I (S1017: YES), the controller 46 repeats the determinations in S1017 and S818 until the electric current becomes greater than or equal to the electric current threshold I or a trigger-off operation has been performed. The controller 46 detects electric current flowing to the brushless motor 3 based on the electric current value signals outputted from the current detecting circuit 42.

In S1020 the controller 46 begins counting a time interval in order to measure the time that elapses from the moment that the electric current flowing to the brushless motor 3 becomes greater than or equal to the electric current threshold I. In other words, after starting to drive the brushless motor 3, the controller 46 begins counting when the electric current flowing to the brushless motor 3 becomes greater than or equal to the electric current threshold I while a trigger-off operation has not been performed. The timing at which the electric current flowing to the brushless motor 3 becomes greater than or equal to the electric current threshold I is the timing that the fifth setting operation condition is satisfied.

In S1005 the controller 46 stops counting the time interval and acquires the count value of the timing unit 46D at the moment that counting is halted. Since the electric current flowing to the brushless motor 3 has become greater than or equal to the electric current threshold I during the operation interval of a trigger-on/off operation from the trigger-on operation detected in S815 to the trigger-off operation detected in S804, this trigger-on/off operation satisfies the fifth setting operation condition and is a setting operation in the eighth normal speed mode. Further, the interval specified by the count value of the timing unit 46D at the timing that counting is halted in S1005 is the third setting operation interval in the eighth normal speed mode. In other words, the controller 46 acquires the third setting operation interval (i.e., information specifying the setting operation interval) in S1005 as the stop condition information based on the setting operation from the trigger-on operation detected in S815 to the trigger-off operation detected in S804.

In S1007 the controller 46 stores the third setting operation interval acquired in S1005 in the third storage unit 46C as the stop condition information. Subsequently, the controller 46 sets a stop condition in S1008. The stop condition is set using the third setting operation interval stored in the third storage unit 46C as the stop condition information. Specifically, the stop condition is set to "the third setting operation interval elapses from the timing at which the electric current flowing to the brushless motor 3 becomes greater than or equal to the electric current threshold."

In S1023 the controller 46 performs the same process performed in S1017. If the controller 46 determines in S1023 that the electric current flowing to the brushless motor 3 is not less than the electric current threshold I (is greater than or equal to the electric current threshold I; S1023: NO), in S1026 of FIG. 26 the controller 46 starts counting a time interval in order to measure the amount of time that elapses from the moment that the electric current flowing to the brushless motor 3 becomes greater than or equal to the electric current threshold I. In this way, the controller 46 begins counting when the electric current flowing to the brushless motor 3 becomes greater than or equal to the electric current threshold I, even when the brushless motor 3 is driven according to a trigger-on operation performed after the stop condition has been set.

After starting the count in S1026, in S1012 the controller 46 determines whether the third setting operation interval has elapsed from the timing at which the electric current flowing to the brushless motor 3 has become greater than or equal to the electric current threshold I following the most recent trigger operation (i.e., from when the count is started in S1026). In other words, the controller 46 determines in S1012 whether the stop condition set in S1008 has been met.

Under drive control in the eighth normal speed mode according to the fourth variation described above, the drilling operation performed with the hammer drill 1 during a setting operation is reproduced by trigger-on operations following the setting operation. Therefore, when performing work to form a plurality of drill holes in the eighth normal speed mode, the depth of the plurality of drill holes can be made substantially uniform.

Further, if the trigger-off operation in a trigger-on/off operation is performed before the electric current flowing to the brushless motor 3 has become greater than or equal to the electric current threshold I, the trigger-on/off operation is not treated as a setting operation, and a stop condition is not set based on this trigger-on/off operation for the same reason that a trigger-off operation that does not satisfy the fourth setting operation condition is not treated as a setting operation in the sixth normal speed mode. This ensures that only a properly performed drilling operation is reproduced and can therefore improve usability.

Further, under drive control in the eighth normal speed mode, the stop condition is set using the interval from the moment that electric current flowing to the brushless motor 3 in a setting operation has become greater than or equal to the electric current threshold I until the trigger-off operation is performed in the same setting operation (i.e., the third setting operation interval) as the stop condition information, and the stop condition is set to "the third setting operation interval elapses from the timing at which the electric current flowing to the brushless motor 3 becomes greater than or equal to the electric current threshold I." The reasoning for this is the same as the reasoning for which the stop condition is set to "the second setting operation interval elapses from the timing at which the operation amount of the trigger switch 23A becomes greater than or equal to the operation amount threshold L3" in the sixth normal speed mode. This method enables the actual drilling interval during a drilling operation performed for the setting operation to be reproduced faithfully, thereby further improving usability. Note that the value of the electric current threshold I is preferably set through investigations of the user's usage of the hammer drill, experimentation, and the like.

Since the setting operation in the first embodiment and its variations is a trigger-on/off operation that satisfies a prescribed condition, the stop condition is set based solely on an operation satisfying the prescribed condition. Consequently, setting a stop condition based on an operation not intended to be used for setting the stop condition (an operation of aligning the end bit E or the like) can be prevented, thereby further improving usability.

Figure 27:
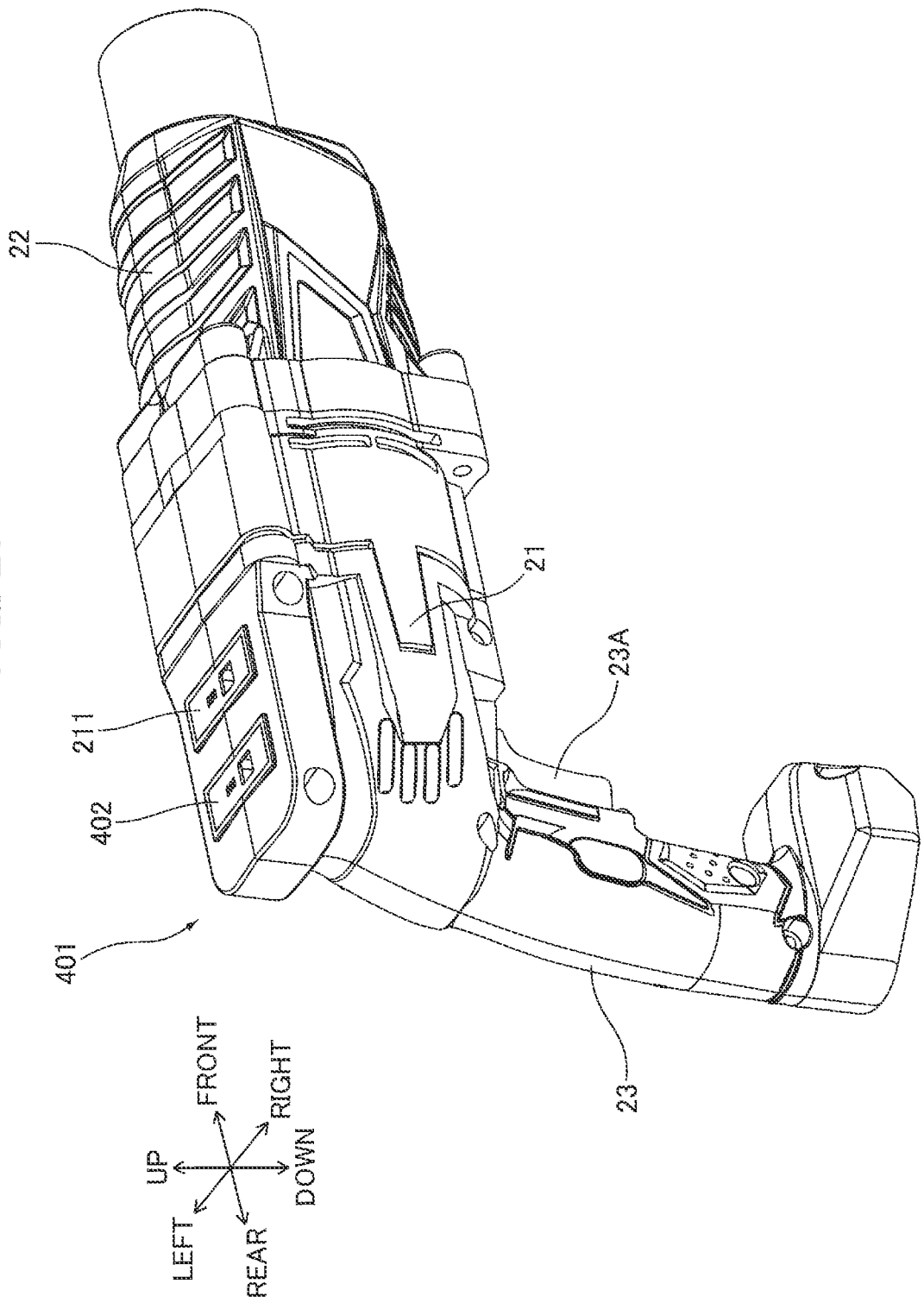
FIG. 27 is a perspective view illustrating the appearance of a hammer drill according to a second embodiment of the present invention.

Next, a hammer drill 401 as an example of the drilling tool according to a second embodiment of the present invention will be described with reference to FIG. 27. The hammer drill 401 differs from the hammer drill 1 in that the hammer drill 401 has a stop condition setting part 402 for setting the stop condition but is identical to the hammer drill 1 in other aspects. Further, structures and control for the hammer drill 401 according to the second embodiment that are identical to those for the hammer drill 1 obtain the same effects as the effects obtained by the hammer drill 1.

The stop condition setting part 402 is disposed on the top surface of the motor housing 21 to the rear of the first indication setting part 211 and is configured for setting a plurality of stop conditions. Specifically, by operating the stop condition setting part 402, the user can selectively set a threshold value related to the number of rotations of the brushless motor 3 from among a first rotation number threshold, a second rotation number threshold, and a third rotation number threshold. When the brushless motor 3 is driven after one of these three threshold values has been set as the stop condition, the brushless motor 3 is halted if the number of rotations of the brushless motor 3 exceeds the selected threshold value, even if the trigger switch 23A is in the ON state.

Thus, the hammer drill 401 according to the second embodiment of the present invention includes the brushless motor 3 that generates a drive force; the bit attachment portion 9 to which the end bit E is attachable; the power transmission portion 8 that can apply a striking force and a rotational force to the end bit E attached to the bit attachment portion 9 by receiving the drive force; the stop condition setting part 402 that receives a setting operation (an operation to select one of the three threshold values) for setting the stop condition to stop the brushless motor 3; the trigger switch 23A that can be switched between the ON state and the OFF state by a manual operation; and the controller 46 that can control the brushless motor 3. Further, the controller 46 can execute a process to set the stop condition based on the setting operation received by the trigger switch 23A; a process to start driving the brushless motor 3; and a process to stop the brushless motor 3. Further, the controller 46 executes a process to start driving the brushless motor 3 in response to a trigger-on operation; a process to start driving of the brushless motor 3 in response to a trigger-off operation; and a process to start driving the brushless motor 3 when the stop condition is met while the brushless motor 3 is being driven in a state where a stop condition is set, even if the trigger switch 23A is in the ON state. Note that the first indication setting part 211 in the first embodiment may be also provided with the function of the stop condition setting part 402 in addition to the selector switch 211A and indicator portion 211B.

With this configuration, in a state where a stop condition is set by performing a setting operation (an operation to set one of the three threshold values), if an operation to switch the trigger switch 23A from the OFF state to the ON state and to maintain the trigger switch 23A in the ON state is performed, the brushless motor 3 is driven and subsequently halted automatically when the stop condition is met. In this way, the hammer drill 401 can obtain the same effects as the hammer drill 1 according to the first embodiment of the present invention.

While the first embodiment of the present invention and its variation and the second embodiment of the present invention have been described above, the drilling tool according to the present invention is not limited to the above embodiments and variations and can be modified in various ways without departing from the spirit of the invention recited in the attached claims.

For example, the hammer drill 1 may store the average electric current during a trigger-on/off operation that has been received as a setting operation. When driving the brushless motor 3 according to a trigger-on operation subsequent to the stop condition being set, the hammer drill 1 may perform further control to halt driving of the brushless motor 3 when the electric current flowing to the brushless motor 3 falls outside the range of ±20% this average electric current, even if the trigger switch 23A is in the ON state.

With the above configuration, the brushless motor 3 is automatically halted when the operation content during a setting operation differs greatly from operation content according to a trigger-on operation following the setting operation. For example, if the drilling operation for a setting operation is performed in a hard workpiece such as concrete and then a drilling operation is performed in a relatively soft workpiece such as wood by a trigger-on operation following the setting operation, driving of the brushless motor 3 is halted. If the materials of workpieces differ in this way, the drilling depth varies greatly even when driving the brushless motor 3 under the same conditions, making it difficult to achieve uniform depth of drilling holes even when performing auto-stop control. Consequently, the effects obtained by performing auto-stop control are diminished. However, according to the configuration described above, auto-stop control is not performed when the effects obtained by performing auto-stop control is likely to be diminished. This configuration can improve usability by eliminating the user's time and effort for switching modes and the like.

In the second variation of the first embodiment of the present invention, when the operation amount of the trigger switch 23A during the operation interval for a trigger-on/off operation in the sixth normal speed mode becomes greater than or equal to the operation amount threshold L3, the trigger-on/off operation is considered a setting operation. Alternatively, for example, when the operation amount of the trigger switch 23A during the operation interval of a trigger-on/off operation becomes the maximum operation amount, the trigger-on/off operation may be considered a setting operation. With this configuration, a trigger-on/off operation is not treated as a setting operation when the operation amount of the trigger switch 23A in the trigger-on/off operation is increased or decreased without reaching the maximum operation amount. Therefore, operations such as aligning the end bit with the workpiece can be excluded from setting operations, thereby achieving uniform drilling depth with greater accuracy.

In the first embodiment of the invention, the brushless motor 3 is employed as a drive source for the hammer drill 1. However, the drive source of the hammer drill 1 is not limited to the brushless motor 3. Various other drive sources, such as a universal motor, an air motor, or an internal combustion engine, may be used.

The first embodiment, its variations, and the second embodiment describe examples that apply the present invention to a drilling tool having a plurality of drive transmission modes. However, the present invention can be applied to a wide variety of drilling tools and not just a drilling tool having a plurality of drive transmission modes.

Further, the control and processes described above are not limited to the combinations described in the present specification and attached drawings. It should be evident that the control and processes exhibit technical utility either independently or in various combinations.

REFERENCE SIGNS LIST 1, 401: hammer drill, 3: brushless motor, 8: power transmission portion, 9: bit attachment portion; 23A: trigger switch, 46: controller

The invention claimed is:

1. A drilling tool comprising:
a drive source for generating a drive force;
a bit attachment portion to which an end bit is attachable;
a power transmission portion configured to apply a motive force the end bit attached to the bit attachment portion by receiving the drive force;
an operation portion switchable between an ON-state and an OFF-state by a manual operation, the operation portion being configured to receive a setting operation, the setting operation being a manual operation of the operation portion for defining a stop condition to indicate when to stop the drive source; and
a controller configured to perform:
a setting process to set the stop condition based on the setting operation received by the operation portion;
a driving start process to start driving of the drive source;
a driving stop process to stop driving of the drive source; and
an acquiring process to acquire stop condition information based on the setting operation,
wherein the setting operation is a series of operations from a first switching operation to a second switching operation that meets a setting operation condition,
wherein the controller performs the driving start process in response to the first switching operation, the first switching operation being an operation to switch the operation portion from the OFF-state to the ON-state,
wherein the controller performs the driving stop process in response to the second switching operation, the second switching operation being an operation to switch the operation portion from the ON-state to the OFF-state, wherein, in the setting process, the controller sets the stop condition using the stop condition information acquired in the acquiring process, and
wherein, in a state where the stop condition is set, even when the operation portion is in the ON-state, the controller performs the driving stop process in response to the stop condition being met while the drive source is being driven.

2. The drilling tool according to claim 1, wherein the controller is provided with a plurality of modes as a control mode for controlling the drive source, the plurality of modes including at least a first mode and a second mode,
wherein the controller is configured to further perform a mode setting process to selectively set one of the plurality of modes as the control mode,
wherein, under the first mode, the controller performs the setting process in response to the setting operation being received by the operation portion, and
wherein, under the second mode, the controller does not perform the setting process.

3. The drilling tool according to claim 2, wherein the setting operation condition is the series of operations that is performed first in the first mode.

4. The drilling tool according to claim 2, wherein the controller is configured to further perform a speed setting process to selectively set one of a plurality of speeds as a drive speed of the drive source.

5. The drilling tool according to claim 4, wherein the controller is configured to further perform:
a set speed drive control to drive the drive source at a speed set in the speed setting process; and
a soft start control to increase the drive speed of the drive source up to a speed set in the speed setting process over a prescribed period of time from a start timing of driving of the drive source and to drive the drive source at the set speed after the drive speed reaches the set speed.

6. The drilling tool according to claim 4, further comprising a selector switch operable by a manual operation for changing the drive speed and the control mode,
wherein, in response to a short push operation being received by the selector switch, the controller performs a speed changing process to switch the drive speed among the plurality of speeds and to set a speed of a switching destination as the drive speed, and
wherein, in response to a long push operation being received by the selector switch, the controller performs the mode setting process to switch the control mode among the plurality of modes and to set a mode of a switching destination as the control mode.

7. The drilling tool according to claim 2, further comprising an indicator portion configured to indicate the mode set as the control mode.

8. The drilling tool according to claim 2, further comprising:
a nonvolatile storage medium for storing the mode set as the control mode in the mode setting process; and
a power supply circuit configured to perform power supply to the controller,
wherein the controller starts up when the power supply from the power supply circuit is started and shuts down when the power supply from the power supply circuit is interrupted, and
wherein, in response to the power supply being resumed after the power supply is interrupted, the controller performs the mode setting process to set the control mode to the mode stored as the control mode in the nonvolatile storage medium.

9. The drilling tool according to claim 1, wherein, in the acquiring process, the controller acquires a setting operation interval as the stop condition information, the setting operation interval being a time interval from the first switching operation to the second switching operation that are performed in the setting operation, and
wherein, in the setting process, the controller sets the stop condition to a condition that the setting operation interval elapses from the first switching operation.

10. The drilling tool according to claim 1, wherein the setting operation condition is met when a time interval from the first switching operation to the second switching operation in the series of operations is greater than a lower limit interval.

11. The drilling tool according to claim 1, further comprising a current detecting portion for detecting electric current flowing to the drive source,
wherein the setting operation condition is met when the electric current reaches an electric current threshold during the series of operations,
wherein, in the acquiring process, the controller acquires a second setting operation interval as the stop condition information, the second setting operation interval being a time interval from a timing at which the electric current reaches the electric current threshold in the setting operation to the second switching operation in the setting operation, and wherein, in the setting process, the controller sets the stop condition to a condition that the second setting operation interval elapses from a timing at which the electric current reaches the electric current threshold after the first switching operation.

12. The drilling tool according to claim 1, wherein the setting operation condition is met when an operation amount of the operation portion becomes greater than or equal to an operation amount threshold during the series of operations, wherein, in the acquiring process, the controller acquires a second setting operation interval as the stop condition information, the second setting operation interval being a time interval from a timing at which the operation amount becomes greater than or equal to the operation amount threshold in the setting operation to the second switching operation in the setting operation, and wherein, in the setting process, the controller sets the stop condition to a condition that the second setting operation interval elapses from a timing at which the operation amount becomes greater than or equal to the operation amount threshold.

13. The drilling tool according to claim 1, wherein the power transmission portion is configured to apply, to the end bit attached to the bit attachment portion, a striking force and a rotational force as the motive force, and wherein the drilling tool further comprises a switching portion for switching a power transmission state of the power transmission portion among:

a rotational force transmission state in which the power transmission portion is capable of applying only the rotational force to the end bit attached to the bit attachment portion;

a striking force transmission state in which the power transmission portion is capable of applying only the striking force to the end bit attached to the bit attachment portion; and a rotational striking force transmission state in which the power transmission portion is capable of applying both the rotational force and the striking force to the end bit attached to the bit attachment portion.

* * * * *